United States Patent
Risan et al.

(10) Patent No.: US 8,132,263 B2
(45) Date of Patent: *Mar. 6, 2012

(54) METHOD AND SYSTEM FOR SELECTIVELY CONTROLLING ACCESS TO PROTECTED MEDIA ON A MEDIA STORAGE DEVICE

(75) Inventors: Hank Risan, Santa Cruz, CA (US); Edward Vincent Fitzgerald, Santa Cruz, CA (US)

(73) Assignee: Music Public Broadcasting, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/914,350

(22) Filed: Oct. 28, 2010

(65) Prior Publication Data

US 2011/0099640 A1 Apr. 28, 2011

Related U.S. Application Data

(63) Continuation of application No. 10/771,809, filed on Feb. 3, 2004, now Pat. No. 7,904,964.

(51) Int. Cl.
*H04L 9/00* (2006.01)
(52) U.S. Cl. .......................................................... 726/27
(58) Field of Classification Search .......... 726/7, 26–30; 713/165, 167, 189, 193; 380/201
See application file for complete search history.

(56) References Cited

U.S. PATENT DOCUMENTS

| 6,081,897 A | 6/2000 | Bersson et al. |
| 6,920,567 B1 | 7/2005 | Doherty et al. |
| 2002/0108050 A1* | 8/2002 | Raley et al. .................. 713/193 |
| 2005/0192815 A1 | 9/2005 | Clyde |

FOREIGN PATENT DOCUMENTS

| WO | WO 01/46952 | 6/2001 |
| WO | WO-03/096340 | 11/2003 |

* cited by examiner

*Primary Examiner* — Beemnet Dada

(57) ABSTRACT

A method of preventing unauthorized reproduction of media disposed on a media storage device according to one embodiment is described. The method comprises installing a compliance mechanism on the computer system. The compliance mechanism is communicatively coupled with the computer system when installed thereon. The compliance mechanism is for enforcing compliance with a usage restriction applicable to the media. The method further includes obtaining control of a data input pathway operable on the computer system. The method further includes accessing data that is disposed on the media storage device that is associated with the usage restriction. The method further includes preventing the computer system from accessing the media digitally via the data pathway while enabling presentation of the protected media.

15 Claims, 18 Drawing Sheets

METHOD AND SYSTEM FOR SELECTIVELY CONTROLLING ACCESS TO PROTECTED MEDIA ON A MEDIA STORAGE DEVICE

CROSS REFERENCE TO RELATED APPLICATIONS

The present patent application is a continuation of U.S. patent application Ser. No. 10/771,809, filed Feb. 3, 2004 now U.S. Pat. No. 7,904,964, entitled "Method And System For Selectively Controlling Access To Protected Media On A Media Storage Device," by Hank Risan et al., assigned to the assignee of the present application and incorporated in its entirety herein.

FIELD OF THE INVENTION

The present invention relates to electronic media. More particularly, the present invention relates to preventing unauthorized recording of electronic media disposed on a media storage device.

BACKGROUND OF THE INVENTION

One of the problems faced in attempting to effectively control media files on a media storage device, e.g., a compact disk (CD), in a secure and controlled manner is that current media storage devices need to be compatible with both home media storage device players, e.g., a CD, digital versatile disk (DVD) or other player, and media storage device drives which may be connected to a computer system. Many of these players/drives were designed in 1982, and the media storage device needs to be backwards compatible with those players/drives.

Media storage device drives are essentially data transducers, meaning they convert bit stream data into electronic waveform that is output, e.g., as an analog waveform, harmonic waveform, to speakers and/or other devices to render sound.

A computer system is more problematic because in addition to its transducing abilities, it may also be: A) a morphogenic system, meaning that a user can take data, reorganize the data, and morph it into other forms on the computer; and/or B) a replicator system, meaning that it can also copy or capture or store or reproduce the data. As a result, if a user can digitally access media stored on a CD using a computer, they reorganize the data and/or reproduce and distribute unauthorized copies of the data. This is especially problematic for owners of copyright protected media such as music, computer software programs, multimedia presentations such as movies, etc.

The data format of a media storage device, e.g., a CD, was designed in 1982 and it was not designed with any security in mind. This is because it was designed to be effective media for data transduction, and as such, did not include provisions for effective copyright protection or Digital Rights Management (DRM).

Some companies that have attempted to provide copyright protection are doing so in a way that is designed to exploit inefficiencies or discrepancies between the home player and the media storage device drive connected to a computer system. To provide media files for both players/drives, those companies do multisession tracks. The media storage device, e.g., CD/DVD, delivers two sets of data. In one example, a plus sign may be used to indicate that the CD/DVD is a mixed disc, having both data for the computer and music for the home machine Double clicking on the icon initiates autoplay of the CD/DVD, which in one example, activates a player provided by the CD/DVD.

One set of streaming data is for the media storage device drive connected to a computer system (generally requested by a proprietary player and delivered in a highly compressed bit form to the computer/user) that may have some kind of digital rights management. For example, when a media storage device is inserted into a device drive connected to a computer system, the user may be presented with a proprietary player having a bit rate of approximately 128 Kbps, which can present a highly compressed version of the original to the user so they will be able to experience the media file.

Disadvantageously, a data stream of 128 Kbps is severely degraded from the original media. In many instances, common compression ratios of original waveforms are approximately a ten to one compression ratio. A ten to one compression ratio typically results in degradation that is readily audible. Thus, the user would be experiencing poor quality sound.

The other set of data stored by a CD/DVD is an audio file that is accessed by a home music or video system and the user is able to experience the media file. Inserting the media storage device into the home audio/video device enables the user to experience the media file in an uncompressed high quality manner, replicating the original form of the media file.

In many instances, all that is needed is a click of the mouse to strip the DRM protection off the media storage device, and the media file becomes available for reproduction and distribution. Alternative means to defeat copyright protection of media files can be as easy as using a magic marker technique. In this technique, a user marks the outer track on a media storage device, e.g., a CD, with a permanent marker, e.g., a Sharpie. When the computer tries to read the first track, it fails, and by default, then reads the next track, usually where the music begins.

Additionally, the media file copyright holders are being sold on the premise that a degraded media file is better than the original because you can't control the original on the computer. Therefore, users may be less likely to use a computer to record/capture/reproduce a poor quality version. Once the user does capture the media file, it is a mediocre sounding copy. This fundamental concept of recording companies giving a less than ideal data version on the CD is in the hope that the lack of sound quality will deter users from recording, copying, etc., the media files.

Alternative methods to provide protection and DRM include the use of time clock inefficiencies. For example, one method is to indicate to the computer system that a media file begins further back than where it actually does, which can introduce a series of numerous errors.

Home machines, e.g., CD/DVD players coupled with stereos, in comparison to CD/DVD drives coupled with a computer system, are extremely tolerant of errors. Home CD/DVD players are designed to read from CDs and DVDs that have been mistreated, e.g., scratched, left out of their jewel case, etc. The home players have substantial error correcting capabilities. Thus, if a CD/DVD has data that was given a negative start time, the home players detects that there is no such thing as a negative start time, and then the home player commences playback.

However, computers are more "gullible," meaning that they believe what you tell them. So if the CD/DVD indicates a negative start time, then the media storage device drive connected to a the computer system may not be able to play a particular media file.

There are also legacy issues and compatibility issues. The consumer is being given a faulty product. In many instances, a disclaimer commonly found on current CDs and DVDs says that if the CD/DVD does not function, return the CD/DVD for exchange. Many users may find this intermittent functionality unacceptable and having to return CD/DVD may cause the user to postpone or, more severely, cancel future CD/DVD purchases.

Applications are readily available via the Internet for the express purpose of producing an exact audio copy of media files on a media storage device. One example is Exact Audio Copy, a freeware software program freely available on the Internet which produces an exact audio copy in .wav file format. Using Exact Audio Copy, circumventing existing protection can be accomplished without modification to the existing technology. The Exact Audio Copy application bypasses the multisession data tracks and goes directly to the audio tracks. This can be accomplished by loading the Exact Audio Copy onto a computer, inserting a CD, and pressing a button or two to copy the audio tracks.

Additionally, there are "ripping" applications, readily available via the Internet, that read the redbook, which enables the ripping application to access the table of contents, and the ripping application goes to the audio tracks where it can "rip" the audio or video file.

Further, DRM protection methods implemented as a stand alone device, meaning that the DRM and copy protection resides in software that resides on the disk are also problematic. This is because when circumvention of the DRM on the media storage device occurs, little if anything can be done because the DRM controls are also bypassed. There may not be any communication with the computer or the Internet.

Software DRM solutions are additionally problematic for CDs and DVDs because they frequently do not provide DRM compliance, and it is foreseen that software solutions will not provide DRM protection in the future, particularly with the introduction of new computer operating systems and new media formats. These types of software DRM solutions are difficult to morph into a secure format once operating systems change.

In many instances, demo media files are being copied and released prior to release of the actual media file. In other instances, unauthorized copies of protected media files, e.g., CDs and/or DVDs are being released before the release of the music and/or the movies. In some instances, unauthorized copies of protected media files are outselling legally produced media files.

Further, many of the media player/recorder applications are designed to capture and record incoming media files in a manner that circumvents controls implemented by a media player application inherent to an operating system, e.g., QuickTime for Apple, MediaPlayer for Windows™, etc., or downloadable from the Internet, e.g., RealPlayer, LiquidAudio, or those provided by webcasters, e.g., PressPlay, for controlling unauthorized recording of media files. Also, many digital recording devices, e.g., mini-disc recorders, MP3 recorders, and the like, can be coupled to a digital output of a computer system, e.g., a USB port, a S/Pdif out, and the like, to capture the media file.

Thus, once the data on the media storage device is digitally accessed and/or stored by a computer system, the likelihood of defeating existing DRM protection methods is greatly increased because the data can be stored for an indefinite period of time. While the copyright holders want to distribute their material to the widest possible audience, they may also want to prevent digitally accessing the material because, given enough time, any method for providing DRM protection can be circumvented. Therefore, it is desired to prevent a computer system from digitally accessing a copyright protected media file to prevent unauthorized storage, transformation, and/or distribution of the media while still allowing a user to use and enjoy the media.

It is also desired to prevent recording applications, such as Total Recorder, Sound Forge, and numerous others, that are adapted to establish a connection with a kernel level driver operable within an operating system to capture and redirect the media file to create an unauthorized reproduction of a media file. It is also desired to prevent recording applications, such as Total Recorder, Sound Forge, and numerous others, that are adapted to establish a connection with a kernel level driver operable within an operating system to capture and redirect the media file to create an unauthorized reproduction of a media file. It is also desired to prevent recording applications from accessing a kernel-mode media device driver and making unauthorized copies of copyrighted material through some available network, e.g., wireline, wireless, P2P, etc., or through a communicative coupling. It is further desirable to prevent access to a kernel based media device driver by a recording application for the purpose of making unauthorized copies of media files from or to alternative sources, e.g., CD players, DVD players, removable hard drives, personal electronic and/or recording devices, e.g., MP3 recorders, and the like. Finally, it is desirable to allow presentation of copyrighted material while preventing a computer system from digitally accessing the copyrighted material.

Current methods of preventing unauthorized reproduction of protected medial files on media storage device are inadequate.

SUMMARY OF THE INVENTION

Accordingly, a need exists for a method and system that controls unauthorized reproduction of protected media files disposed on a media storage device. Embodiments of the present invention satisfy the above mentioned needs.

A method of preventing unauthorized reproduction of media disposed on a media storage device according to one embodiment is described. The method comprises installing a compliance mechanism on the computer system. The compliance mechanism is communicatively coupled with the computer system when installed thereon. The compliance mechanism is for enforcing compliance with a usage restriction applicable to the media. The method further includes obtaining control of a data input pathway operable on the computer system. The method further includes accessing data that is disposed on the media storage device that is associated with the usage restriction. The method further includes preventing the computer system from accessing the media digitally via the data pathway while enabling presentation of the protected media.

In another embodiment, a system for selectively controlling access to protected media on a media storage device is described. In one embodiment, the system is comprised of a compliance mechanism disposed on the media storage device. The compliance mechanism is configured to be installed on and communicatively coupled with a computer system. The compliance mechanism is for complying with a usage restriction applicable to the protected media. The system further includes a device drive coupled with the computer system for accessing the media storage device. The device drive is communicatively coupled with an analog sound rendering device coupled with the computer system. The system further includes the compliance mechanism being configured to prevent accessing the protected media via a digital data pathway on the computer system while presenting the protected media via the analog sound rendering device.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
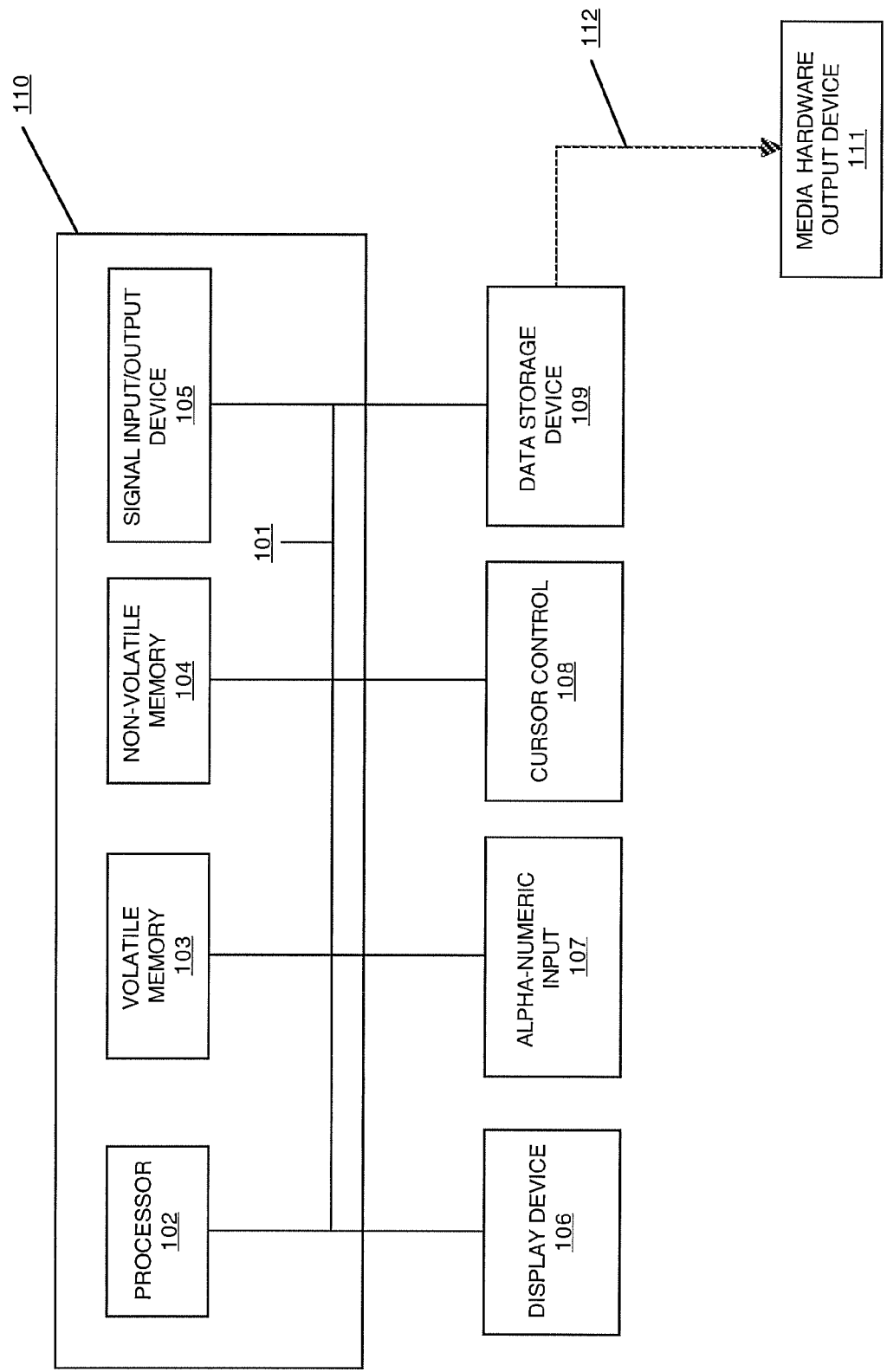
FIG. 1 is a block diagram of an exemplary computer system that can be utilized in accordance with an embodiment of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, to one of ordinary skill in the art, the present invention may be practiced without these specific details. In other instances, well known methods, procedures, components, and circuits have not been described in detail as not to unnecessarily obscure aspects of the present invention.

Some portions of the detailed description which follows are presented in terms of procedures, logic blocks, processing, and other symbolic representations of operations on data bits within a computing system or digital memory system. These descriptions and representations are the means used by those skilled in the data processing art to most effectively convey the substance of their work to others skilled in the art. A procedure, logic block, process, etc., is herein, and generally, conceived to be a self-consistent sequence of steps or instructions leading to a desired result. The steps are those involving physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like, with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that discussions of the present invention refer to actions and processes of a computing system, or similar electronic computing device that manipulates and transforms data. The data is represented as physical (electronic) quantities within the computing system's registers and memories and is transformed into other data similarly represented as physical quantities within the computing system's memories or registers, or other such information storage, transmission, or display devices.

In the following description, for purposes of explanation, numerous specific details are set forth in order to provide a thorough understanding of the present invention. To one skilled in the art, the present invention may be practiced without these specific details. In other instances, well-known structures and devices are shown in block diagram form in order to avoid obscuring the present invention.

Embodiments of the present invention are discussed primarily in the context of a network of computer systems such as a network of desktop, workstation, laptop, handheld, and/or other portable electronic device. For purposes of the present application, the term "portable electronic device" is not intended to be limited solely to conventional handheld or portable computers. Instead, the term "portable electronic device" is also intended to include many mobile electronic devices. Such mobile devices include, but are not limited to, portable CD players, MP3 players, mobile phones, portable recording devices, satellite radios, portable video playback devices (digital projectors), personal video eyewear, and other personal digital devices. Additionally, embodiments of the present invention are also well suited for implementation with theater presentation systems for public and/or private presentation in theaters, auditoriums, convention centers, etc.

FIG. 1 is a block diagram illustrating an exemplary computer system 100 that can be used in accordance with embodiments of the present invention. It is noted that computer system 100 can be nearly any type of computing system or electronic computing device including, but not limited to, a server computer, a desktop computer, a laptop computer, or other portable electronic device. Within the context of embodiments of the present invention, certain discussed processes, procedures, and operations can be realized as a series of instructions (e.g., a software program) that reside within computer system memory units of computer system 100 and are executed by a processor(s) of computer system 100. When executed, the instructions cause computer system 100 to perform specific actions and exhibit specific behavior which is described in detail herein.

Computer system 100 of FIG. 1 comprises an address/data bus 101 for communicating information, one or more central processors 102 coupled to bus 101 for processing information and instructions. Central processor(s) 102 can be a microprocessor or any alternative type of processor. Computer system 100 also includes a computer usable volatile memory 103, e.g., random access memory (RAM), static RAM (SRAM), dynamic RAM (DRAM), synchronous dynamic RAM (SDRAM), double data rate RAM (DDR RAM), etc., coupled to bus 101 for storing information and instructions for processor(s) 102. Computer system 100 further includes a computer usable non-volatile memory 104, e.g., read only memory (ROM), programmable ROM (PROM), electronically programmable ROM (EPROM), electrically erasable PROM (EEPROM), flash memory (a type of EEPROM), etc., coupled to bus 101 for storing static information and instructions for processor(s) 102. In one embodiment, non-volatile memory 104 can be removable.

System 100 also includes one or more signal generating and receiving devices, e.g., signal input/output device(s) 105 coupled to bus 101 for enabling computer 100 to interface with other electronic devices. Communication interface 105 can include wired and/or wireless communication functionality. For example, in one embodiment, communication interface 105 is a serial communication port, but can alternatively be one of a number of well known communication standards and protocols, e.g., a parallel port, an Ethernet adapter, a FireWire (IEEE 1394) interface, a Universal Serial Bus (USB), a small computer system interface (SCSI), an infrared (IR) communication port, a Bluetooth wireless communication adapter, a broadband connection, a satellite link, an Internet feed, a cable modem, and the like. In another embodiment, a digital subscriber line (DSL) can be implemented as signal input/output device 105. In such an instance, communication interface 105 may include a DSL modem. In embodiments of the present invention, these components are disposed on a circuit board 110 which is contained within a cover assembly.

System 100 can also include an optional display device 106 coupled to bus 101 for displaying video, graphics, and/or alphanumeric characters. It is noted that display device 106 can be a CRT (cathode ray tube), a thin CRT (TCRT), a liquid crystal display (LCD), a plasma display, a field emission display (FED), video eyewear, a projection device (e.g., an LCD, a digital light projector (DLP), a movie theater projection system, and the like.), or any other display device suitable for displaying video, graphics, and alphanumeric characters recognizable to a user.

Computer system 100 of FIG. 1 further includes an optional alphanumeric input device 107 coupled to bus 101 for communicating information and command selections to processor(s) 102, in one embodiment. Alphanumeric input device 107 is coupled to bus 101 and includes alphanumeric and function keys. Computer 100 can also include an optional cursor control device 108 coupled to bus 101 for communicating user input information and command selections to processor(s) 102. Cursor control device 108 can be implemented using a number of well-known devices such as a mouse, a trackball, a track pad, a joy stick, a optical tracking device, a touch screen, etc. It is noted that a cursor can be directed and/or activated via input from alphanumeric input device 107 using special keys and key sequence commands. It is further noted that directing and/or activating the cursor can be accomplished by alternative means, e.g., voice activated commands, provided computer system 100 is configured with such functionality.

Computer 100 of FIG. 1 can also include one or more computer usable data storage device(s) 109 coupled to bus 101 for storing instructions and information, in one embodiment of the present invention. In one embodiment, data storage device 109 can be a magnetic storage device, e.g., a hard disk drive, a floppy disk drive, a zip drive, or other magnetic storage device. In another embodiment, data storage device 109 can be an optical storage device, e.g., a CD (compact disc), a DVD (digital versatile disc), or other alternative optical storage device. Alternatively, any combination of magnetic, optical, and alternative storage devices can be implemented, e.g., a RAID (random array of independent disks or random array of inexpensive discs) configuration. It is noted that data storage device 109 can be located internal and/or external of system 100 and communicatively coupled with system 100 utilizing wired and/or wireless communication technology, thereby providing expanded storage and functionality to system 100. It is further noted that nearly any portable electronic device (not shown) can also be communicatively coupled with system 100 via utilization of wired and/or wireless technology, thereby expanding the functionality of system 100.

Computer 100 of FIG. 1 also includes an analog sound rendering device 111 (e.g., a sound card) that is communicatively coupled with data storage device 109 via signal path 112. In an embodiment of the present invention, data storage device 109 is a CD/DVD device drive. Typically, CD/DVD device drives have a connector (not shown) that allows coupling a device drive directly with an audio card (e.g., analog sound rendering device 111) using a cable (e.g., signal path 112). When the device drive is playing an audio CD, the device drive emits the audio data out of the connector via signal path 112 to the sound card. In an embodiment of the present invention, the data is sent as an analog signal directly to device 111 via signal path 112. As a result, the data bypasses data bus 101 and cannot be accessed by processor 102. It is appreciated that analog sound rendering device 111 may be a sound rendering module that is disposed integrally on circuit board 110 in embodiments of the present invention.

Figure 2:
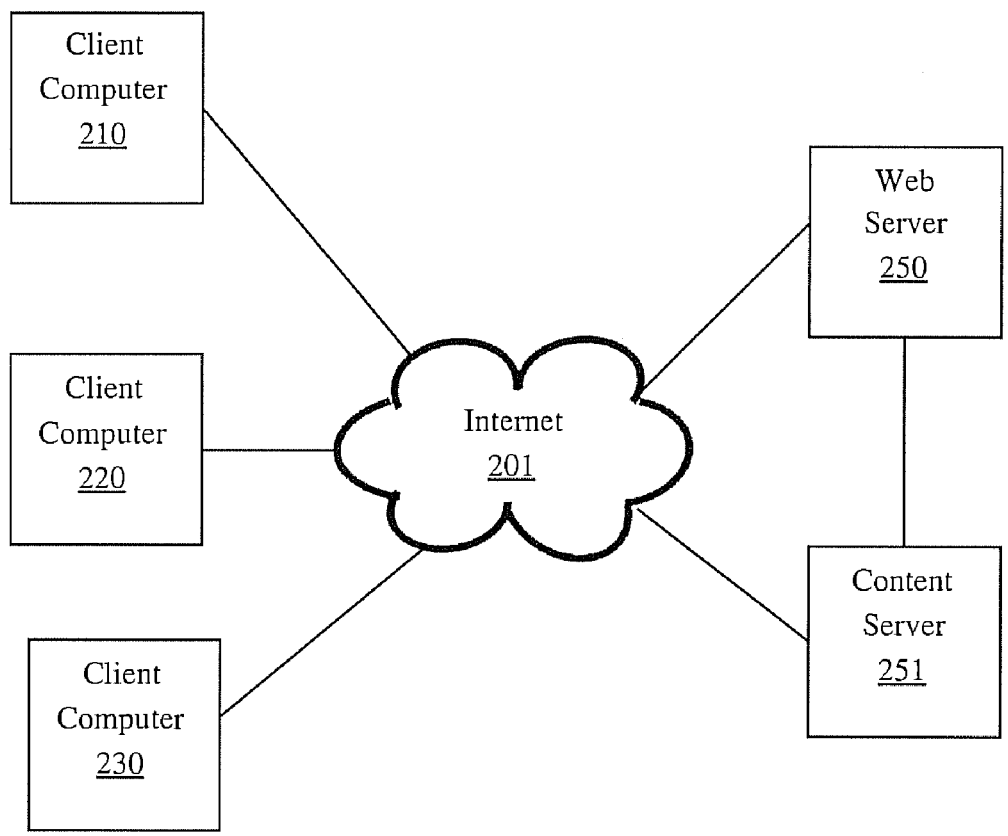
FIG. 2 is a block diagram of an exemplary network environment that can be utilized in accordance with an embodiment of the present invention.

FIG. 2 is a block diagram of an exemplary network 200 in which embodiments of the present invention may be implemented. In one embodiment, network 200 enables one or more authorized client computer systems (e.g., 210, 220, and 230), each of which are coupled to Internet 201, to receive media content from a media content server, e.g., 251, via the Internet 201 while preventing unauthorized client computer systems from accessing media stored in a database of content server 251.

Network 200 includes a web server 250 and a content server 251 which are communicatively coupled to Internet 201. Further, web server 250 and content server 251 can be communicatively coupled without utilizing Internet 201, as shown. Web server 250, content server 251, and client computers 210, 220, and 230 can communicate with each other. It is noted that computers and servers of network 200 are well suited to be communicatively coupled in various implementations. For example, web server 250, content server 251, and client computer systems 210, 220, and 230 of network 200 can be communicatively coupled via wired communication technology, (e.g., twisted pair cabling, fiber optics, coaxial cable, etc.), or wireless communication technology, or a combination of wired and wireless communication technology.

Still referring to FIG. 2, it is noted that web server 250, content server 251, and client computer systems 210, 220 and 230 can, in one embodiment, be each implemented in a manner similar to computer system 100 of FIG. 1. However, the server and computer systems in network 200 are not limited to such implementation. Additionally, web server 250 and content server 251 can perform various functionalities within network 200. It is also noted that, in one embodiment, web server 250 and content server 251 can both be disposed on a single or a plurality of physical computer systems.

Further, it is noted that network 200 can operate with and deliver any type of media content, (e.g., audio, video, multimedia, graphics, information, data, software programs, etc.) in any format. In one embodiment, content server 251 can provide audio and video files to client computers 210-230 via Internet 201.

Figure 3:
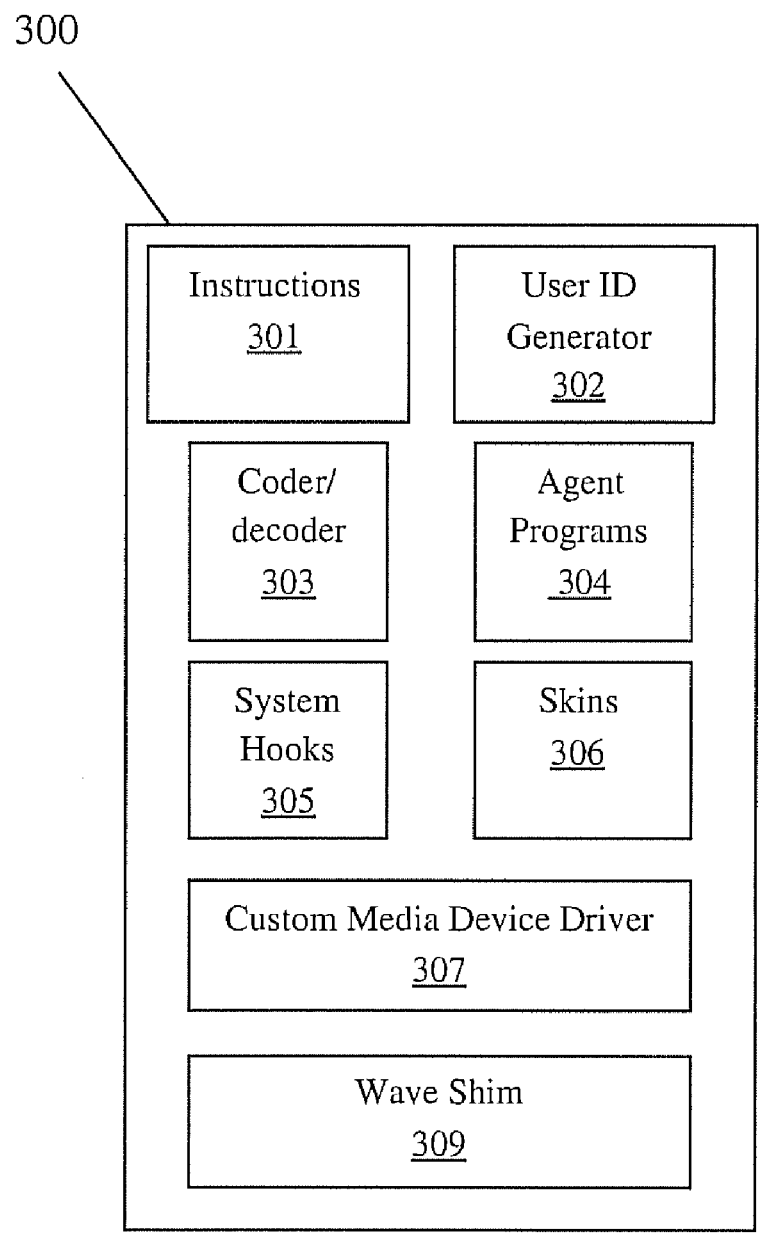
FIG. 3 is a block diagram of a copyright compliance mechanism in accordance with an embodiment of the present invention.

FIG. 3 is a block diagram of an exemplary copyright compliance mechanism (CCM) 300, for controlling distribution of, access to, and/or copyright compliance of media files, in accordance with an embodiment of the present invention. In one embodiment, CCM 300 contains one or more software components and instructions for enabling compliance with DMCA (digital millennium copyright act) restrictions and/or RIAA (recording industry association of America) licensing agreements regarding media files. Additionally, CCM 300's software components and instructions further enable compliance with international recording restrictions such as those defined by the IFPI (international federation of phonographic industry), the ISRC (international standard recording industry), other foreign or international recording associations, and/or foreign or international licensing restrictions. In one embodiment, CCM 300 may be integrated into existing and/or newly developed media player and recorder applications. In another embodiment, CCM 300 may be implemented as a stand-alone mechanism but in conjunction with existing media player/recorder applications, such that CCM 300 is communicatively coupled to existing media player/recorder applications. Alternatively, CCM 300 can be installed as a stand-alone mechanism within a client computer system 210. Additionally, CCM 300 can be installed as a stand-alone mechanism and/or as part of a bundled application from a media storage device, e.g., a CD, a DVD, an SD (secure digital card), and/or as part of an installation package. In another embodiment, CCM 300 can be installed in conjunction with a presentation of desired media content, e.g., listening to an audio file on a music CD, reading a document, viewing a video, etc. It is noted that, in one embodiment, CCM 300 may be installed on client system 210 in a clandestine manner, relative to a user.

There are currently two types of copyright licenses recognized by the digital millennium copyright act (DMCA) for the protection of broadcasted copyrighted material. One of the broadcast copyright licenses is a compulsory license, also referred to as a statutory license. A statutory license is defined as a non-interactive license, meaning the user cannot select the song. Further, a caveat of this type of broadcast license is that a user must not be able to select a particular music file for the purpose of recording it to the user's computer system or other storage device. Another caveat of a statutory license is that a media file is not available more than once for a given period of time. In one example, the period of time can be three hours.

The other type of broadcast license recognized by the DMCA is an interactive licensing agreement. An interactive licensing agreement is commonly with the copyright holder, (e.g., a record company, the artist, etc.), wherein the copyright holder grants permission for a server, (e.g., web server 250 and/or content server 251) to broadcast copyrighted material. Under an interactive licensing agreement, there are a variety of ways that copyrighted material, (e.g., music files) can be broadcast. For example, one manner in which music files can be broadcast is to allow the user to select and listen to a particular sound recording, but without the user enabled to make a sound recording. This is commonly referred to as an interactive with "no save" license, meaning that the end user is unable to save or store the media content file in a relatively permanent manner. Additionally, another manner in which music files can be broadcast is to allow a user to not only select and listen to a particular music file, but additionally allow the user to save that particularly music file to disc and/or burn the music file to a CD, MP3 player, or other portable electronic device. This is commonly referred to as an interactive with "save" license, meaning that the end user is enabled to save, store, or burn to CD, the media content file.

It is noted that the DMCA allows for the "perfect" reproduction of the sound recording. A perfect copy of a sound recording is a one-to-one mapping of the original sound recording into a digitized form, such that the perfect copy is virtually indistinguishable and/or has no audible differences from the original recording.

In one embodiment, CCM (copyright compliance mechanism) 300 can be stored in web server 250 and/or content server 251 of network 200 and is configured to be installed into each client computer system, e.g., 210, 220 and 230, enabled to access the media files stored within content server 251 and/or web server 250. Alternatively, copyright compliance mechanism 300 can be externally disposed and communicatively coupled with a client computer system 200 via, e.g., a portable media device (not shown). In yet another embodiment, CCM 300 can be configured to be operable from a media storage device (e.g., 108) upon which media files may be disposed.

Copyright compliance mechanism 300 is configured to be operable while having portions of components, entire components, combinations of components, disposed within one or more memory units and/or data storage devices of a computer system, e.g., 210, 220, and/or 230.

Additionally, CCM 300 can be readily updated, (e.g., via Internet 201), to reflect changes or developments in the DMCA, copyright restrictions and/or licensing agreements pertaining to any media file, changes in current media player applications and/or the development of new media player applications, or to counteract subversive and/or hacker-like attempts to unlawfully obtain one or more media files. It is noted that updating CCM 300 can include, but is not limited to, updating portions of components, entire components and/or combinations of components of CCM 300.

Referring to FIG. 3, CCM 300 can include instructions 301 for enabling client computer system 210 to interact with web server 250 and content server 251 of network 200. Instructions 301 enable client computer system 210 to interact with servers, (e.g., 250 and 251) in a network, (e.g., 200).

The copyright compliance mechanism 300 also includes, in one embodiment, a user ID generator 302, for generating a user ID or user key, and one or more cookie(s) which contain(s) information specific to the user and the user's computer system, e.g., 210. In one embodiment, the user ID and the cookie(s) are installed in computer system 210 prior to installation of the remaining components of the CCM 300. It is noted that the presence of a valid cookie(s) and a valid user ID/user key are verified by web server 250 before the remaining components of a CCM 300 can be installed, within one embodiment of the present invention. Additionally, the user ID/user key can contain, but is not limited to, the user's name, the user's address, the user's credit card number, an online payment account number, a verified email address, and an identity (username) and password selected by the user.

Furthermore, the cookie can contain, but is not limited to, information specific to the user, information regarding the user's computer system 210, (e.g., types of media applications operational therewithin), a unique identifier associated with computer system 210, e.g., a MAC address, an IP address, and/or the serial number of the central processing unit (CPU) operable on computer system 210 and other information specific to the computer system and its user.

Additionally, in another embodiment, user biometrics may be combined with computer system 210 data and user data and incorporated into the generation of a user ID. Alternatively, biometric data may be used in a stand-alone implementation in the generation of the user ID. Types of biometric data that may be utilized to provide a user ID and/or authorization may include, but is not limited to, fingerprint data, retinal scan data, handprint data, facial recognition data, and the like.

It is noted that the information regarding the client computer system, e.g., 210, the user of system 210, and an access key described herein can be collectively referred to as authorization data.

Advantageously, with information regarding the user and the user's computer system, e.g., 210, web server 250 can determine when a user of one computer system, e.g., 210, has given their username and password to another user using another computer system, e.g., 220. Because the username, password, and the user's computer system 210 are closely associated, web server 250 can prevent unauthorized access to copyrighted media content, in one embodiment. It is noted that if web server 250 detects unauthorized sharing of usernames and passwords, it can block the user of computer system 210, as well as other users who unlawfully obtained the username and password, from future access to copyrighted media content available through web server 250. Web server 250 can invoke blocking for any specified period of time, e.g., for a matter of minutes, hours, months, years, or longer or permanently.

Still referring to FIG. 3, copyright compliance mechanism 300 further includes a coder/decoder (codec) 303 that, in one embodiment, is adapted to perform, but is not limited to, encoding/decoding of media files, compressing/decompressing of media files, and detecting that delivered media files are encrypted as prescribed by CCM 300. In the present embodiment, coder/decoder 303 can also extract key fields from a header attached to each media content file for, in part, verification that the file originated from a content server, e.g., 251. It is noted that CCM can include one or more codecs similar to codec 303.

In the present embodiment, coder/decoder 303 can also perform a periodic and repeated check of the media file, while the media file is passed to the media player application, (e.g., in a frame by frame basis or in a buffer by buffer basis), to ensure that CCM 300 rules are being enforced at any particular moment during media playback. It is noted that differing coder/decoders 303 can be utilized in conjunction with various types of copyrighted media content including, but not limited to, audio files, video files, graphical files, alphanumeric files and the like, such that any type of media content file can be protected in accordance with embodiments of the present invention.

Within FIG. 3, copyright compliance mechanism 300 also includes one or more agent programs 304 which are configured to engage in dialogs and negotiate and coordinate transfer of information between a computer system, (e.g., 210, 220, or 230), a server, (e.g., web server 250 and/or content server 251), and/or media player applications, with or without recording functionality, that are operable within a client computer system, in one embodiment. In the present embodiment, agent program 304 can also be configured to maintain system state, verify that other components are being utilized simultaneously, to be autonomously functional without knowledge of the client, and can also present messages, (e.g., error messages, media information, advertising, etc.), via a display window or electronic mail. This enables detection of proper skin implementation and detection of those applications that are running It is noted that agent programs are well known in the art and can be implemented in a variety of ways in accordance with the present embodiment.

Copyright compliance mechanism 300 also includes one or more system hooks 305, in one embodiment of the present invention. A system hook 305 is, in one embodiment, a library that is installed in a computer system, e.g., 210, that intercepts system wide events. For example, a system hook 305, in conjunction with skins 306, can govern certain properties and/or functionalities of media player applications operating within the client computer system, e.g., 210, including, but not limited to, mouse click shortcuts, keyboard shortcuts, standard system accelerators, progress bars, save functions, pause functions, rewind functions, skip track functions, forward track preview, copying to CD, copying to a portable electronic device, and the like.

It is noted that the term govern or governing, for purposes of the present invention, can refer to a disabling, deactivating, enabling, activating, etc., of a property or function. Governing can also refer to an exclusion of that function or property, such that a function or property may be operable but unable to perform in the manner originally intended. For example, during the playing of a media file, the progress bar may be selected and moved from one location on the progress line to another without having an effect on the play of the media file.

Within FIG. 3 it is further noted that codec 303 compares the information for the media player application operating on client computer system, e.g., 210, with a list of "signatures" associated with known media recording applications. In one embodiment, the signature can be, but is not limited to being, a unique identifier of a media player application and which can consist of the window class of the application along with a product name string which is part of the window title for the application. Advantageously, when new media player applications are developed, their signatures can be readily added to the signature list via an update of CCM 300 described herein.

The following C++ source code is an exemplary implementation of the portion of a codec 303 for performing media player application detection, in accordance with an embodiment of the present invention. In another embodiment, the following source code can be modified to detect kernel streaming mechanisms operable within a client system, (e.g., 210).

ance mechanism 300. In one embodiment, this can be performed within a driver shim, (e.g., wave driver shim 309 of FIGS. 5A, 5B, 5C, and 5D).

A driver shim can be utilized for nearly any software output device, such as a standard Windows™ waveform output device, (e.g., Windows™ Media Player), or hardware output device, (e.g., speakers or headphones). Client computer system 210 is configured such that the driver shim (e.g., 309) appears as the default waveform media device to client level application programs. Thus, requests for processing of waveform media input and/or output will pass through the driver shim prior to being forwarded to the actual waveform audio driver, (e.g., media device driver 505 of FIGS. 5A-5D). Such waveform input/output suppression can be triggered by other

```
int
IsRecorderPresent(TCHAR * szAppClass,
                  TCHAR * szProdName)
{
        TCHAR     szWndText[_MAX_PATH]; /* buffer to receive title string for window */
        HWND      hWnd;         /* handle to target window for operation */
        int       nRetVal;      /* return value for operation */
        /* initialize variables */
        nRetVal = 0;
        if ( _tcscmp(szAppClass, _T("#32770"))
           == 0)
        {
                /* attempt to locate dialog box with specified window title */
                if ( FindWindow((TCHAR *) 32770, szProdName)
                   != (HWND) 0)
                {
                        /* indicate application found */
                        nRetVal = 1;
                }
        }
        else
        {
                /* attempt to locate window with specified class */
                if ( (hWnd = FindWindow(szAppClass, (LPCTSTR) 0))
                   != (HWND) 0)
                {
                        /* attempt to retrive title string for window */
                        if ( GetWindowText(hWnd,
                                    szWndText,
                                    _MAX_PATH)
                           != 0)
                        {
                                /* attempt to locate product name within title string */
                                if ( _tcsstr(szWndText, szProdName)
                                   != (TCHAR *) 0)
                                {
                                        /* indicate application found */
                                        nRetVal = 1;
                                }
                        }
                }
        }
        /* return to caller */
        return nRetVal;
}
```

Within FIG. 3 it is further noted that codec 303 can also selectively suppress waveform input/output operations to prevent recording of copyrighted media on a client computer system (e.g., 210). For example, codec 303, subsequent to detection of bundled media player applications operational in a client computer system, (e.g., 210), can stop or disrupt the playing of a media content file. This can be accomplished, in one embodiment, by redirecting and/or diverting certain data pathways that are commonly used for recording, such that the utilized data pathway is governed by the copyright complicomponents, (e.g., agent 304), of CCM 300, to be active when a recording operation is initiated by a client computer system, e.g., 210, during the play back of media files which are subject to the DMCA.

It is noted that alternative driver shims can be implemented for nearly any waveform output device including, but not limited to, a Windows™ Media Player. It is further noted that the driver shim can be implemented for nearly any media in nearly any format including, but not limited to, audio media files, audio input and output devices, video, graphic and/or alphanumeric media files and video input and output devices.

The following C++ source code is an exemplary implementation of a portion of a codec 303 and/or a custom media device driver 307 for diverting and/or redirecting certain data pathways that are commonly used for recording of media content, in accordance with an embodiment of the present invention.

```
DWORD
__stdcall
widMessage(UINT         uDevId,
           UINT         uMsg,
           DWORD dwUser,
           DWORD dwParam1,
           DWORD dwParam2)
{
        BOOL       bSkip;       /* flag indicating operation to be skipped */
        HWND       hWndMon;     /* handle to main window for monitor */
        DWORD      dwRetVal;    /* return value for operation */
        /* initialize variables */
        bSkip = FALSE;
        dwRetVal = (DWORD) MMSYSERR_NOTSUPPORTED;
        if (uMsg == WIDM_START)
        {
                /* attempt to locate window for monitor application */
                if ( (hWndMon = FindMonitorWindow( ))
                    != (HWND) 0)
                {
                        /* obtain setting for driver */
                        bDrvEnabled = ( SendMessage(hWndMon,
                                                    uiRegMsg,
                                                    0,
                                                    0)
                                      == 0)
                                      ? FALSE : TRUE;
                }
                if (bDrvEnabled == TRUE)
                {
                        /* indicate error in operation */
                        dwRetVal = MMSYSERR_NOMEM;
                        /* indicate operation to be skipped */
                        bSkip = TRUE;
                }
        }
        if (bSkip == FALSE)
        {
                /* invoke entry point for original driver */
                dwRetVal = CallWidMessage(uDevId, uMsg, dwUser, dwParam1, dwParam2);
        }
        /* return to caller */
        return dwRetVal;
}
```

It is noted that when properly configured, system hook 305 can govern nearly any function or property within nearly any media player application that may be operational within a client computer system, (e.g., 210). In one embodiment, system hook 305 is a DLL (dynamic link library) file. It is further noted that system hooks are well known in the art, and are a standard facility in a Microsoft Windows™ operating environment, and accordingly can be implemented in a variety of ways. However, it is also noted that system hook 305 can be readily adapted for implementation in alternative operating systems, e.g., Apple™ operating systems, Sun Solaris™ operating systems, Linux operating systems, and nearly any other operating system.

In FIG. 3, copyright compliance mechanism 300 also includes one or more skins 306, which can be designed to be installed in a client computer system, (e.g., 210, 220, and 230). In one embodiment, skins 306 are utilized to assist in client side compliance with the DMCA (digital millennium copyright act) regarding copyrighted media content. Skins 306 are customizable interfaces that, in one embodiment, are displayed on a display device (e.g., 106) of computer system 210 and provide functionalities for user interaction of delivered media content. Additionally, skins 306 can also provide a display of information relative to the media content file including, but not limited to, song title, artist name, album title, artist biography, and other features such as purchase inquiries, advertising, and the like.

Furthermore, when system hook 305 is unable to govern a function of the media player application operable on a client computer system, e.g., 210, such that client computer system could be in non-compliance with DMCA and/or RIAA restrictions, a skin 306 can be implemented to provide compliance.

Differing skins 306 can be implemented depending upon the restrictions applicable, (e.g., DMCA and/or RIAA), to each media content file. For example, in one embodiment, a skin 306*a* may be configured for utilization with a media content file protected under a non-interactive agreement (DMCA), such that skin 306*a* may not include a pause function, a stop function, a selector function, and/or a save function, etc. Another skin, e g , skin 306*b* may, in one embodiment, be configured to be utilized with a media content file protected under an interactive with "no save" agreement (DMCA), such that skin 306*b* may include a pause function, a stop function, a selector function, and for those media files having an interactive with "save" agreement, a save or a burn to CD function.

Still referring to FIG. 3, it is further noted that in the present embodiment, each skin 306 can have a unique name and signature. In one embodiment, skin 306 can be implemented, in part, through the utilization of an MD (message digest) 5 hash table or similar algorithm. An MD5 hash table can, in one implementation, be a check-sum algorithm. It is well known in the art that a skin, e.g., skin 306, can be renamed and/or modified to incorporate additional features and/or functionalities in an unauthorized manner. Since modification of the skin would change the check sum and/or MD5 hash, without knowledge of the MD5 hash table, changing the name or modification of the skin may simply serve to disable the skin, in accordance with one embodiment of the present invention. Since copyright compliance mechanism (CCM) 300 verifies skin 306, MD5 hash tables advantageously provide a deterrent against modifications made to the skin 306.

In one embodiment, CCM 300 also includes one or more custom media device driver(s) 307 for providing an even greater measure of control over the media stream while increasing compliance reliability. A client computer system, (e.g., 210), can be configured to utilize a custom media device application, (e.g., custom media device 310 of FIG. 5B, 5C, and 5D), to control unauthorized recording of media content files. A custom media device application can be, but is not limited to, a custom media audio device application for media files having sound content, a custom video device application for media files having graphical and/or alphanumeric content, etc. In one embodiment, custom media device 310 of FIG. 5B is an emulation of the custom media device driver 307. With reference to audio media, the emulation is performed in a waveform audio driver associated with custom media device 310. Driver 307 is configured to receive a media file being outputted by system 210 prior to the media file being sent to a media output device, (e.g., media output device 570), and/or a media output application, (e.g., recording application 502). Examples of a media output device includes, but is not limited to, a video card for video files, a sound card for audio files, etc. Examples of a recording application can include, but is not limited to, CD burner applications for writing to another CDs, ripper applications which capture the media file and change the format of the media file, e.g., from a CD audio file to an .mpeg audio file, and/or a .wav file, and/or an ogg vorbis file, and various other media formats. In one embodiment, client computer system 210 is configured with a custom media device driver 307 emulating custom media device 310, and which is system 210's default device driver for media file output. In one embodiment, an existing GUI (graphical user interface) can be utilized or a GUI can be provided, e.g., by utilization of skin 306 or a custom web based player application or as part of a CCM 300 installation bundle, for forcing or requiring system 210 to have driver 307 as the default driver.

Therefore, when a media content file is received by system 210 from server 251, the media content file is playable, provided the media content file passes through the custom media device application (e.g., 310 of FIG. 5B), emulated from custom media device driver 307, prior to being outputted. However, if an alternative media player application is selected, delivered media files from server 251 will not play on system 210.

Thus, secured media player applications would issue a media request to the driver, (e.g., 307), for the custom media device 310 which then performs necessary media input suppression, (e.g., waveform suppression for audio files), prior to forwarding the request to the default Windows™ media driver, (e.g., waveform audio driver for audio files).

Within FIG. 3 it is noted that requests for non-restricted media files can pass directly through custom media device driver 307 to a Windows™ waveform audio driver operable on system 210, thus reducing instances of incompatibilities with existing media player applications that utilize waveform media, (e.g., audio, video, etc.). Additionally, media player applications that do not support secured media would be unaffected. It is further noted that for either secured media or non-restricted media, (e.g., audio media files), waveform input suppression can be triggered by other components of CCM 300, (e.g., agents 304, system hooks 305, and skins 306), or a combination thereof, to be active when a recording operation is initiated simultaneously with playback of secured media files, (e.g., audio files). Custom device drivers are well known and can be coded and implemented in a variety of ways including, but not limited to, those found at developers network web sites, (e.g., a Microsoft™ or alternative OS (operating system) developer web sites).

Advantageously, by virtue of system 210 being configured with a custom media device as the default device driver (e.g., 310 of FIGS. 5B, 5C, and 5D), that is an emulation of a custom media device driver 307, those media player applications that require their particular device driver to be the default driver, e.g., Total Recorder, etc., are rendered non-functional for secured media. Further advantageous is that an emulated custom media device provides no native support for those media player applications used as a recording mechanism, e.g., DirectSound capture, (direct sound 504 of FIGS. 5A, 5B, 5C, and 5D) etc., that are able to bypass user-mode drivers for most media devices. Additionally, by virtue of the media content being sent through device driver 307, thus effectively disabling unauthorized saving/recording of media files, in one embodiment, media files that are delivered in a secured delivery system do not have to be encrypted, although, in another embodiment, they still may be encrypted. By virtue of non-encrypted media files utilizing less storage space and network resources than encrypted media files, networks having limited resources can utilize the functionalities of driver 307 of CCM 300 to provide compliance with copyright restrictions and/or licensing agreements applicable with a media content file without having the processing overhead of encrypted media files.

Figure 4:
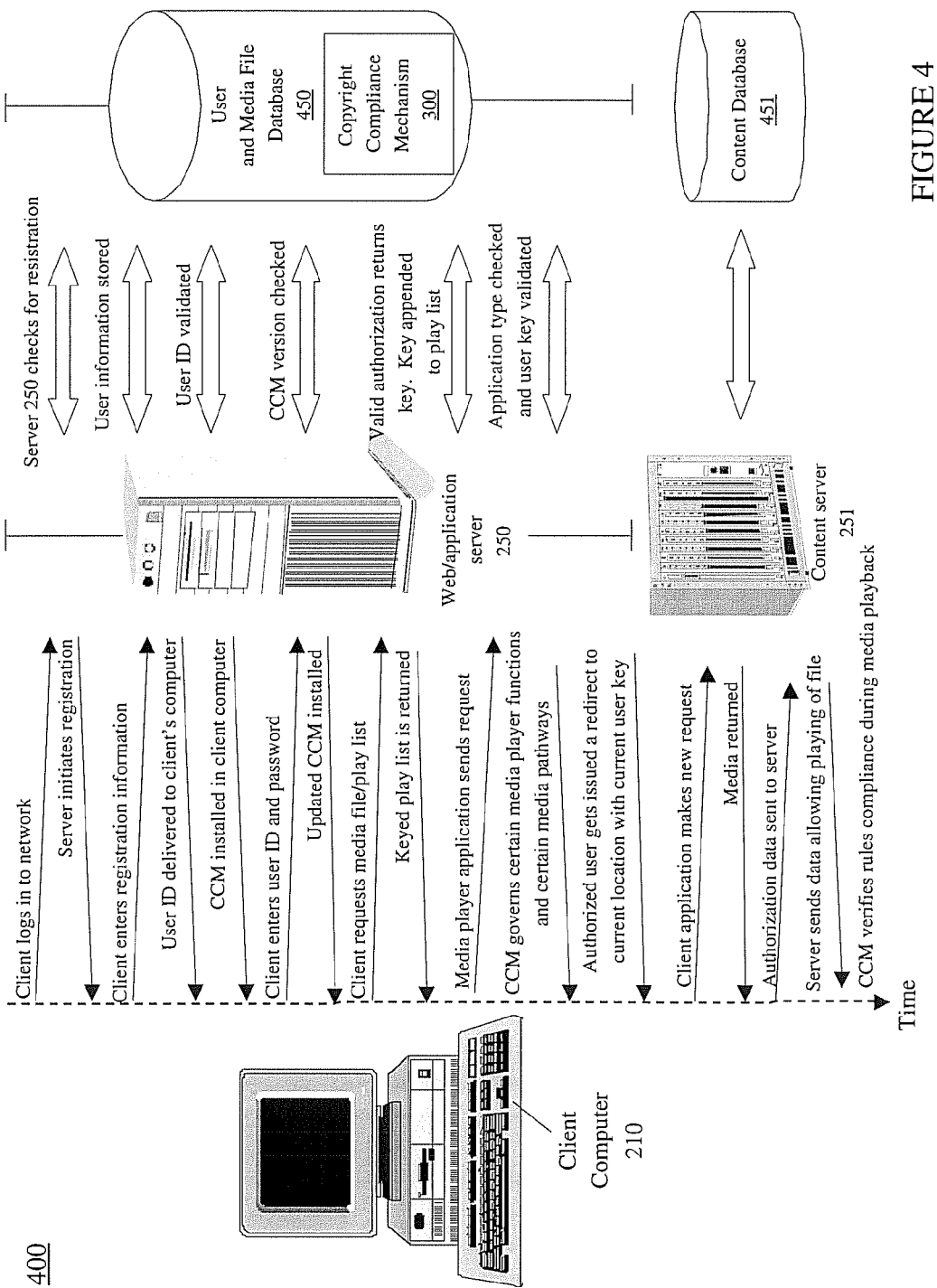
FIG. 4 is an exemplary system for implementing a copyright compliance mechanism in accordance with an embodiment of the present invention.

FIG. 4 is an illustration of an exemplary system 400 for implementing a copyright compliance mechanism in accordance with an embodiment of the present invention. Specifically, system 400 illustrates web server 250, content server 251, or a combination of web server 250 and content server 251 installing a copyright compliance mechanism (e.g., 300) in a client's computer system (e.g., 210) for controlling media file distribution and controlling user access and interaction of copyrighted media files, in one embodiment of the present invention.

Client computer system 210 can communicatively couple with a network (e.g., 200) to request a media file, a list of available media files, or a play list of audio files, e.g., MP3 files, etc. In response, web server 250 determines if the request originates from a registered user authorized to receive media files associated with the request. If the user is not registered with the network, web server 250 can initiate a registration process with the requesting client 210. Client registration can be accomplished in a variety of ways. For example, web server 250 may deliver to a client 210 a registration form having various text entry fields into which the user can enter required information. A variety of information can be requested from the user by web server 250 including, but not limited to, user's name, address, phone number, credit card number, online payment account number, biometric identification (e.g., fingerprint, retinal scan, etc.),verifiable email address, and the like. In addition, registration can, in one embodiment, include the user selecting a username and password.

Still referring to FIG. 4, web server 250 can, in one embodiment, detect information related to the client's computer system 210 and store that information in a user/media database 450. For example, web server 250 can detect a unique identifier of client computer system 210. In one embodiment, the unique identifier can be the MAC address of a NIC (network interface card) of client computer system 210 or the MAC address of the network interface adapter integrated on the motherboard of system 210. It is understood that a NIC enables a client computer system 210 to access web server 250 via a network such as Internet 201. It is well known that each NIC typically has a unique identifying number MAC address. Further, web server 250 can, in one embodiment, detect and store (also in database 450) information regarding the types(s) of media player application(s), e.g., Windows Media Player™, Real Player™, iTunes player™ (Apple), Live 365™ player, and those media player applications having recording functionality, (e.g., Total Recorder, Cool Edit 2000, Sound Forge, Sound Recorder, Super MP3 Recorder, and the like), that are present and operable in client computer system 210. In one embodiment, the client information is verified for accuracy and is then stored in a user database (e.g., 450) within web server 250.

Subsequent to registration completion, creation of the user ID and password, and obtaining information regarding client computer system 210, all or part of this information can be installed in client computer system 210. In one embodiment, client computer system 210 information can be in the form of a cookie. Web server 250 then verifies that the user and client computer system 210 data is properly installed therein and that their integrity has not been compromised. Subsequently, web server 250 installs a copyright compliance mechanism (e.g., 300) into the client's computer system, e.g., 210, in one embodiment of the present invention. It is noted that web server 250 may not initiate installation of CCM 300 until the user ID, password, and client computer system 210 information is verified. A variety of common techniques can be employed to install an entire CCM 300, portions of its components, entire components, and/or combinations or a function of its components. For example, copyright compliance mechanism 300 can be installed in a hidden directory within client computer system 210, thereby preventing unauthorized access to it. In one embodiment, it is noted that unless CCM 300 is installed in client computer system 210, its user will not be able to request, access, or have delivered thereto, media files stored by web server 250 and/or content server 251.

Referring still to FIG. 4, upon completion of client registration and installation of CCM 300, client computer system 210 can then request a media play list or a plurality of play lists, etc. In response, web server 250 determines whether the user of client computer system 210 is authorized to receive the media play list associated with the request. In one embodiment, web server 250 can request the user's username and password. Alternatively, web server 250 can utilize user database 450 to verify that computer 210 is authorized to receive a media play list. If client computer 210 is not authorized, web server 250 can initiate client registration, as described herein. Additionally, web server 250 can disconnect computer 210 or redirect it to an alternative web site. Regardless, if the user and client computer system 210 are not authorized, web server 250 will not provide the requested play list to client computer system 210.

However, if client computer system 210 is authorized, web server 210 can check copyright compliance mechanism 300 within data base 450 to determine if it, or any of the components therein, have been updated since the last time client computer system 210 logged in to web server 250. If a component of CCM 300 has been updated, web server 250 can install the updated component and/or a more current version of CCM 300 into client computer system 210, e.g., via Internet 201. If CCM 300 has not been updated, web server 250 can then deliver the requested media play list to system 210 via Internet 201 along with an appended user key or user identification (ID). It is noted that user database 450 can also include data for one or more media play lists that can be utilized to provide a media play list to client computer system 210. Subsequently, the user of client computer system 210 can utilize the received media play list in combination with the media player application operating on system 210 to transmit a delivery request for one or more desired pieces of media content from web server 250. It is noted that the delivery request contains the user key for validation purposes.

Still referring to FIG. 4, upon receiving the media content delivery request, web server 250 can then check the validity of the requesting media application and the attached user key. In one embodiment, web server 250 can utilize user database 450 to check their validity. If either or both are invalid, web server 250, in one embodiment, can redirect unauthorized client computer system 210 to an alternative destination to prevent abuse of the system. However, if both the requesting media application and the user key are valid, CCM 300 verifies that skins 306 are installed in client computer system 210. Additionally, CCM 300 further verifies that system hook(s) 305 have been run or are running to govern certain functions of those media player applications operable within client computer system 210 that are known to provide non-compliance with one or more restricted use standards such as the DMCA and/or the RIAA. Additionally, CCM 300 further diverts and/or redirects certain pathways that are commonly used for recording, e.g., driver 307 of FIG. 5A, device 310 of FIG. 5B, device 570 of FIG. 5C, and driver 505 of FIG. 5D. Once CCM 300 has performed the above described functions, web server 250 then, in one embodiment, issues to the client computer 210 a redirect command to the current address location of the desired media file content along with an optional time sensitive access key, e.g., for that hour, day, or other defined timeframe.

In response to the client computer system 210 receiving the redirect command from web server 250, the media player application operating on client computer system 210 automatically transmits a new request and the time sensitive access key to content server 251 for delivery of one or more desired pieces of media content. The validity of the time sensitive access key is checked by content server 251. If invalid, unauthorized client computer 210 is redirected by content server 250 to protect against abuse of the system and unauthorized access to content server 251. If the time sensitive access key is valid, content server 251 retrieves the desired media content from content database 451 and delivers it to client computer system 210. It is noted that, in one embodiment, the delivered media content can be stored in hidden directories and/or custom file systems that may be hidden within client computer system 210 thereby preventing future unauthorized distribution. In one embodiment, an HTTP (hypertext transfer protocol) file delivery system is used to deliver the requested media files, meaning that the media files are delivered in their entirety to client computer system 210, as compared to streaming media which delivers small portions of the media file.

Still referring to FIG. 4, it is noted that each media file has had, in one embodiment, a header attached therewith prior to delivery of the media file. In one embodiment, the header can contain information relating to the media file, e.g., title or media ID, media data such as size, type of data, and the like.

The header can also contain a sequence or key that is recognizable to copyright compliance mechanism 300 that identifies the media file as originating from a content server 251. In one embodiment, the header sequence/key can also contain instructions for invoking the licensing agreements and/or copyright restrictions that are applicable to that particular media file.

Additionally, if licensing agreements and/or copyright restrictions are changed, developed, or created, or if new media player applications, with or without recording functionality, are developed, CCM 300 has appropriate modifications made to portions of components, entire components, combinations of components, and/or the entire CCM 300 to enable continued compliance with licensing agreements and/or copyright restrictions. Furthermore, subsequent to modification of copyright compliance mechanism 300, modified portions of, or the entire updated CCM 300 can be installed in client computer system 210 in a variety of ways. For example, the updated CCM 300 can be installed during client interaction with web server 250, during user log-in, and/or while client computer system 210 is receiving the keyed play list.

Referring still to FIG. 4, it is further noted that, in one embodiment, the media files and attached headers can be encrypted prior to being stored within content server 251. In one embodiment, the media files can be encrypted utilizing randomly generated keys. Alternatively, variable length keys can be utilized for encryption. It is noted that the key to decrypt the encrypted media files can be stored in database 450, content database 451 or in some combination of databases 450 and 451. It is further noted that the messages being passed back and forth between client computer system 210 and web server 250 can also be encrypted, thereby protecting the media files and the data being exchanged from unauthorized use or access. There are a variety of encryption mechanisms and programs that can be implemented to encrypt this data including, but not limited to, exclusive OR, shifting with adds, public domain encryption programs such as Blowfish, and non-public domain encryption mechanisms. It is also noted that each media file can be uniquely encrypted, such that if the encryption code is cracked for one media file, it is not applicable to other media files. Alternatively, groups of media files can be similarly encrypted. Furthermore, in another embodiment, the media files may not be encrypted when being delivered to a webcaster known to utilize a proprietary media player application, e.g., custom media device driver 307.

Subsequent to media file decryption, the media file may be passed through CCM 300, (e.g., coder/decoder 303), to a media player application operating on client computer system 210, e.g. playback application 501 of FIGS. 5A, 5B, 5C, 5D, and 6), which can then access and utilize the delivered high fidelity media content, enabling its user(s) to experience the media content, e.g., listen to it, watch it, view it, or the like. In one embodiment of the present invention, a specialized or custom media player may or may not be required to experience the media content, (e.g., skin 306 of FIG. 3). A skin 306 may be necessary when CCM 300 cannot modify an industry standard media player application to comply with copyright restrictions and/or licensing agreements in accordance with the DMCA. Alternatively, an industry standard media player can be utilized by client computer system 210 to experience the media content. Typically, many media player applications are available and can include, but are not limited to, Windows™ Media Player™ for PCs (personal computers), iTunes™ Player or QuickTime™ for Apple computers, and XMMS player for computers utilizing a Linux operating system. Regardless of the media player application utilized, while the media file is passed to the media player application, e.g., in a frame by frame basis or in a buffer, coder/decoder 303 will repeatedly ensure that CCM 300 rules are being enforced at any particular moment during media playback, shown as step 750 of FIG. 7C.

As the media file content is delivered to the media player application, periodically, (e.g., after a specified number of frames, after a defined period of time, or any desired time or data period), coder/decoder 303 repeatedly determines whether or not all the rules, as defined by CCM 300, are enforced. If the rules are not enforced, (e.g., a user opening up a recording application such as Total Recorder or an alternative application, the presentation of the media content is, in one embodiment, suspended or halted. In another embodiment, the presentation of the media content can be modified to output the media content in a non-audibly, (e.g., silence). In yet another embodiment, the media content may be audible but recording functionality can be disabled, such that the media content cannot be recorded. These presentation stoppages are collectively shown as step 751 of FIG. 7C.

If the rules, in accordance with CCM 300, are enforced, the codec/decoder 303 retrieves a subsequent portion of the media content that is stored locally in client computer system 210. The newly retrieved portion of the media file is then presented by the client's media player application. While the newly retrieved portion is presented, CCM 300 then again checks that the rules are enforced, and retrieves an additional portion of the media file or suspends presentation of the media file if the rules are not being enforced. These operations are performed repeatedly throughout the playback of the media file, in a loop environment, until the media file's contents have been presented in their entirety. Advantageously, by constantly monitoring during playing of media files, CCM 300 can detect undesired activities and enforces those rules as defined by CCM 300.

Figure 5A:
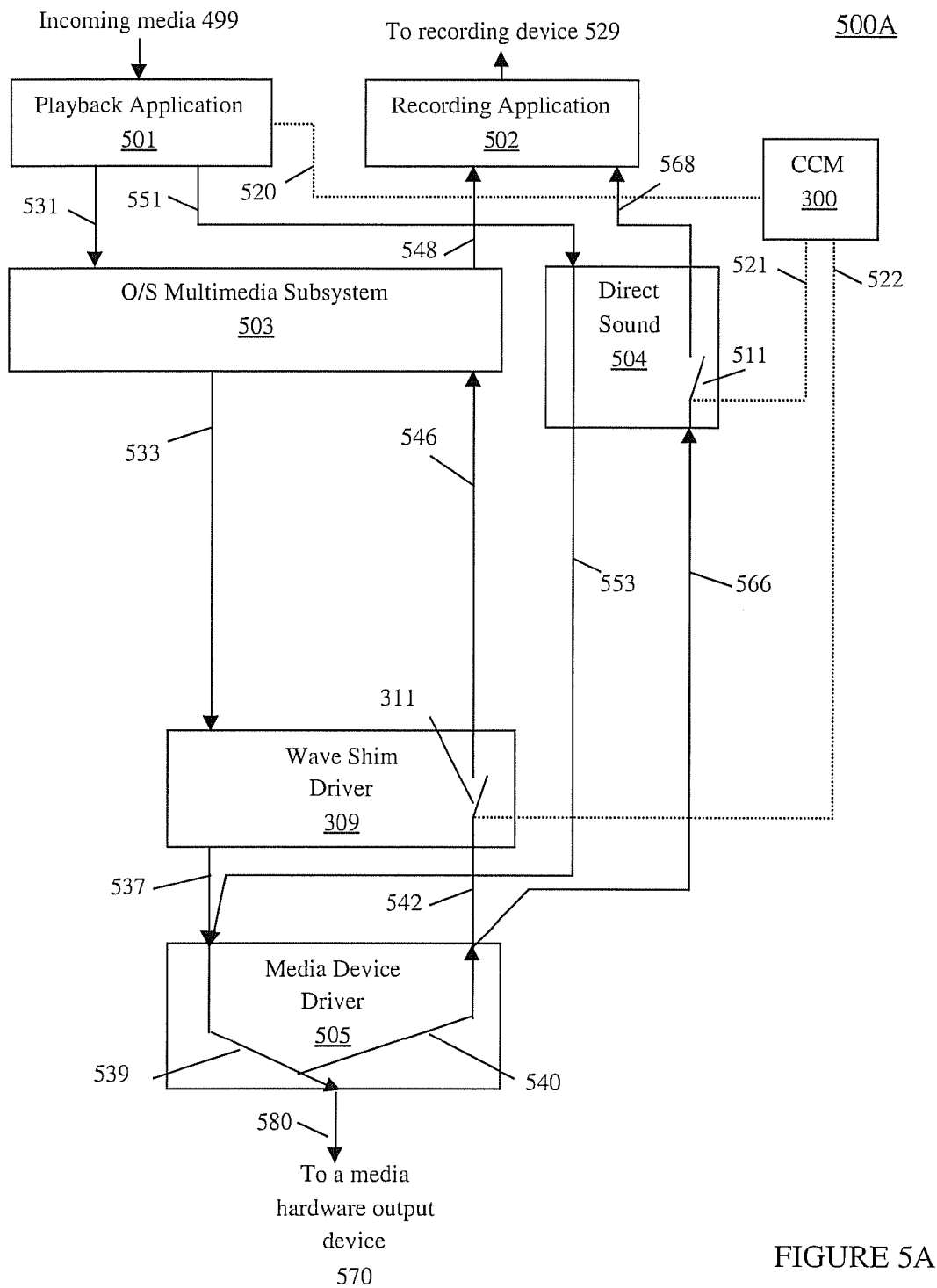
FIG. 5A is a data flow block diagram showing an implementation of a copyright compliance mechanism for preventing unauthorized recording of media files, in accordance with one embodiment of the present invention.
Figure 5B:
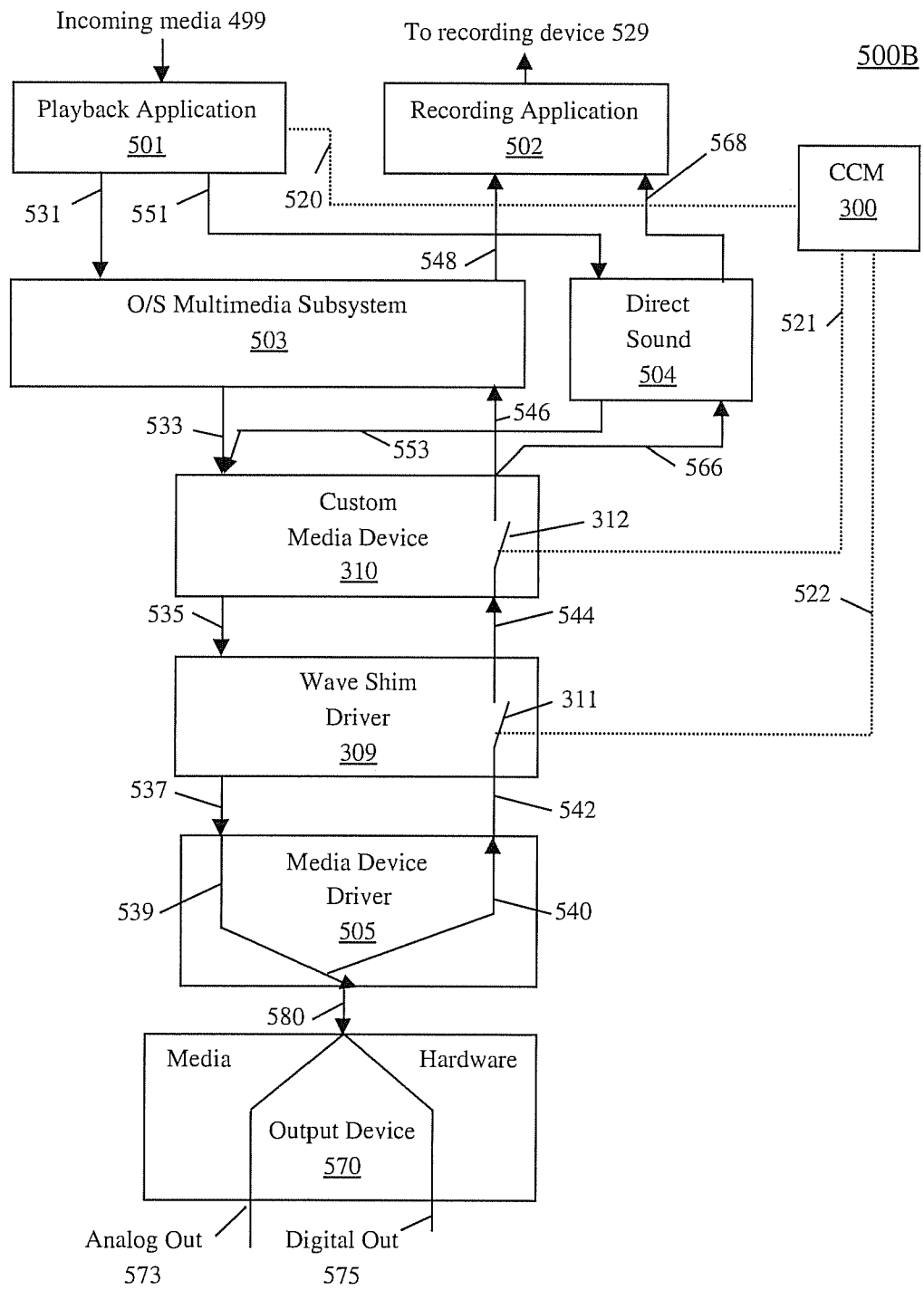
FIG. 5B is a data flow block diagram showing an implementation of a component of a copyright compliance mechanism for preventing unauthorized recording of media files, in accordance with another embodiment of the present invention.

FIG. 5A is an exemplary logic/bit path block diagram 500A showing utilization of a wave shim driver, (e.g., wave shim driver 309 of FIG. 3), in conjunction with copyright compliance mechanism 300, for selectively controlling recording of copyrighted media received by a client computer system, (e.g., system 210), in one embodiment of the present invention. Copyright compliance mechanism 300 is, in one embodiment, installed and operational on client system 210 in the manner described herein.

In one embodiment, a copyright compliance mechanism 300 is shown as being communicatively coupled with a media playback application 501 via coupling 520. Therefore, CCM 300 is enabled to communicate with playback application 501. In one embodiment, CCM 300 can be integrated into a media playback application. CCM 300 is also coupled to and controls a selectable switch 311 in wave shim driver 309 (as described in FIG. 3) via coupling 522. CCM 300 is further coupled to and controls a selectable switch 511 in direct sound 504 via coupling 521. Depending upon the copyright restrictions and licensing agreements applicable to an incoming media file, (e.g., 499), CCM 300 controls whether switches 311 and 511 are open (shown), thus preventing incoming media 499 from reaching a media recording application, or closed (not shown) to allow recording of incoming media 499.

For example, incoming media 499 may originate from a content server, (e.g., 251, coupled to system 210). In another example, incoming media 499 may originate from a personal recording/electronic device, (e.g., a MP3 player/recorder or similar device, coupled to system 210). Alternatively, incoming media 499 may originate from a magnetic, optical or alternative media storage device inserted into a media device player coupled to system 210, (e.g., a CD or DVD inserted into a CD or DVD player), a hard disk in a hot swappable hard drive, an SD (secure digital card) inserted into a SD reader, and the like. In yet another example, incoming media 499 may originate from another media player application or media recording application. Incoming media 499 may also originate from, but is not limited to, a satellite radio feed (e.g., XM radio), a personal communication device (e.g., a mobile phone), a cable television radio input ,(e.g., DMX (digital music express)), a digital distribution and/or a public presentation source via a network, Internet or other communication connection, pay-per-view and/or pay-per-play system, or a set-top box. It is noted that incoming media 499 can originate from nearly any source that can be coupled to system 210. However, regardless of the source of incoming media 499, embodiments of the present invention, described herein, can prevent unauthorized recording of the media 499.

FIG. 5A shows a media playback application 501, (e.g., an audio, video, or other media player application), operable within system 210 and configured to receive incoming media 499. Playback application 501 can be a playback application provided by an operating system, (e.g., Media Player for Windows™ by Microsoft), a freely distributed playback application downloadable from the Internet, (e.g., RealPlayer or LiquidAudio), a playback application provided by a webcaster, (e.g., PressPlay), or a playback application commercially available.

Media device driver 505 which, in one embodiment, may be a software driver for a sound card coupled to system 210 having a media output device 570, e.g., speakers or headphones, coupled therewith for media files having audio content. In another implementation, media device driver 505 may be a software driver for a video card coupled with a display device, (e.g., 105), for displaying media files having alphanumeric and/or graphical content, and so on. With reference to audio files, it is well known that a majority of recording applications assume a computer system, (e.g., 210), has a sound card disposed therein, providing full-duplex sound functionality to system 210. This means media output driver 505 can simultaneously cause playback and recording of incoming media files 499. For example, media device driver 505 can playback media 499 along wave-out line 539 to media output device 570 (e.g., speakers for audible playback) via wave-out line 580 while outputting media 499 on wave-out line 540 to eventually reach recording application 502.

For purposes of FIGS. 5A, 5B, 5C, and 5D, the terms wave-in line and wave-out line are referenced from the perspective of media device driver 505. Additionally, for the most part, wave-in lines are depicted downwardly and wave-out lines are depicted upwardly in FIGS. 5A, 5B, 5C, and 5D.

Continuing with FIG. 5A, playback application 501 is coupled with an operating system (O/S) multimedia subsystem 503 and direct sound 504 via wave-in lines 531 and 551 respectively. O/S multimedia subsystem 503 is coupled to a wave shim driver 309 via wave-in line 533 and wave-out line 546. O/S multimedia subsystem 503 is also coupled to a recording application 502 via wave-out line 548. Operating system (O/S) multimedia subsystem 503 can be any O/S multimedia subsystem, e.g., a Windows™ multimedia subsystem for system 210 operating under a Microsoft O/S, a QuickTime™ multimedia subsystem for system 210 operating under an Apple O/S, and so on. Playback application 501 is also coupled with direct sound 504 via wave-in line 551.

Direct sound 504, in one embodiment, may represent access to a hardware acceleration feature in a standard audio device, enabling lower level access to components within media device driver 505. In another embodiment, direct sound 504 may represent a path that can be used by a recording application, (e.g., Total Recorder), that can be further configured to bypass the default device driver, (e.g., media device driver 505), to capture incoming media 499 for recording. For example, direct sound 504 can be enabled to capture incoming media 499 via wave-in line 551 and unlawfully output media 499 to a recording application 502 via wave-out line 568, as well as media 499 eventually going to media device driver 505, the standard default driver.

Still referring to FIG. 5A, wave shim driver 309 is coupled with media device driver 505 via wave-in line 537 and wave-out line 542. Media device driver 505 is coupled with direct sound 504 via wave-in line 553 which is shown to converge with wave-in line 537 at media device driver 505. Media device driver 505 is also coupled with direct sound 504 via wave-out line 566.

Wave-out lines 542 and 566 are shown to diverge from wave-out line 540 at media device driver 505 into separate paths. Wave-out line 542 is coupled to wave shim driver 309 and wave-out line 566 is coupled to direct sound 504. When selectable switch 311 and 511 are open (shown), incoming media 499 cannot flow to recording application 502, thus preventing unauthorized recording of it.

For example, incoming media 499 is received at playback application 501. Playback application 501 activates and communicates to CCM 300 regarding copyright restrictions and/or licensing agreements applicable to incoming media 499. If recording restrictions apply to media 499, CCM 300 can, in one embodiment, open switches 311 and 511, thereby blocking access to recording application 502 to effectively preventing unauthorized recording of media 499. In one embodiment, CCM 300 can detect if system 210 is configured with direct sound 504 selected as the default driver to capture incoming media 499, via wave-in line 551, or a recording application is detected and/or a hardware accelerator is active, such that wave driver shim 309 can be bypassed by direct sound 504. Upon detection, CCM 300 can control switch 511 such that the output path, wave-out line 568, to recording application 502 is blocked. It is further noted that CCM 300 can detect media recording applications and devices as described herein, with reference to FIG. 3.

Alternatively, if media device driver 505 is selected as the default driver, incoming media 499 is output from playback application 501 to O/S multimedia subsystem 503 via wave-in line 531. From subsystem 503, media 499 is output to wave shim driver 309 via wave-in line 533. The wave shim driver 309 was described herein with reference to FIG. 3. Media 499 is output from wave shim driver 309 to media device driver 505 via wave-in line 537. Once received by media device driver 505, media 499 can be output via wave-out line 539 to a media output device 570 coupled therewith via wave-out line 580. Additionally, media device driver 505 can simultaneously output media 499 on wave-out line 540 back to wave shim driver 309. Dependent upon recording restrictions applicable to media 499, CCM 300 can, in one embodiment, close switch 311 (not shown as closed), thereby allowing media 499 to be output from wave shim driver 309 to subsystem 503 (via wave-out line 546) and then to recording application 502 via wave-out line 548. Alternatively, CCM 300 can also open switch 311, thereby preventing media 499 from reaching recording application 502.

It is particularly noted that by virtue of CCM 300 controlling both switches 311 and 511, and therefore controlling wave-out line 548 and wave-out line 568 leading into recording application 502, incoming media files, (e.g., media 499), can be prevented from being recorded in an unauthorized manner in accordance with applicable copyright restrictions and/or licensing agreements related to the incoming media 499. It is also noted that embodiments of the present invention in no way interfere with or inhibit the playback of incoming media 499.

FIG. 5B is an exemplary logic/bit path block diagram 500B of a client computer system, (e.g., 210), configured with a copyright compliance mechanism 300 for preventing unauthorized recording of copyrighted media according to an embodiment of the present invention. Copyright compliance mechanism 300 is, in one embodiment, coupled with and operational on client system 210 in the manner described herein with reference to FIGS. 4, 5A, 5C, 5D, 6, and 7.

Diagram 500B of FIG. 5B is similar to diagram 500A of FIG. 5A, with a few changes. Particularly, diagram 500B includes a custom media device 310 communicatively interposed between and coupled to O/S multimedia subsystem 503 and wave shim driver 309. Custom media device 310 is coupled to O/S multimedia subsystem via wave-in line 533 and wave-out line 546. Custom media device 310 is coupled with wave shim driver 309 via wave-in line 535 and wave-out line 544. Additionally, custom media device 310 is coupled with direct sound 504 via wave-in line 553 which converges with wave-in line 533 and wave-out line 566 which diverges from wave-out line 546, in one embodiment.

Diagram 500B also includes a media hardware output device 570 that is coupled to media device hardware driver 505 via line 580. Media hardware output device 570 can be, but is not limited to, a sound card for audio playback, a video card for video, graphical, alphanumeric, etc, output, and the like.

In one embodiment, CCM 300 is communicatively coupled with playback application 501 via coupling 520, waveform driver shim 309 via coupling 522, and custom media device 310 via coupling 525. CCM 300 is coupled to and controls a selectable switch 311 in waveform driver shim 309 via coupling 522. CCM 300 is also coupled to and controls a selectable switch 312 in custom audio device 310 via coupling 525. Depending upon the copyright restrictions and licensing agreements applicable to an incoming media file, (e.g., media 499), CCM 300 controls whether switches 311 and 312 are open (shown), thus preventing the incoming media 499 from reaching a recording application, or closed (not shown) so as to allow recording of the incoming media 499.

Continuing with FIG. 5B, direct sound 504 is shown coupled with custom media device 310 via wave-in line 553, instead of being coupled with media device driver 505 (FIG. 5A). In one embodiment, custom audio device 310 mandates explicit selection through system 210, meaning that custom audio device 310 needs to be selected as a default driver of system 210. By virtue of having the selection of custom media device 310 as the default driver of system 210, the data path necessary for direct sound 504 to capture the media content can be selectively closed.

For example, incoming media 499 originating from nearly any source described herein with reference to FIG. 5A is received by media playback application 501 of system 210. Playback application 501 communicates to CCM 300, via coupling 520, to determine whether incoming media 499 is protected by any copyright restrictions and/or licensing agreements. Playback application 501 communicates with CCM 300 to control switch 311 and 312 accordingly. For example, if recording of incoming media 499 would violate applicable restrictions and/or agreements, and therefore switch 312 is in an open position (as shown), such that the output path to recording application 502, (e.g., wave-out line 548 and/or wave-out line 568), is effectively blocked, thereby preventing unauthorized recording of media 499.

Alternatively, if media device driver 505 is selected as the default driver, incoming media 499 continues from O/S multimedia subsystem 503, through custom media device 310, wave driver shim 309, and into media device driver 505 where media 499 can be simultaneously output to media output device 570 via line 580, and output on wave-out line 540 and outputted by media device driver 505 to wave shim driver 309 on wave-out line 542. However, by virtue of CCM 300 controlling switch 311, wave-out line 544 which eventually leads to recording application 502 is blocked, thus effectively preventing unauthorized recording of media 499.

It is particularly noted that by virtue of CCM 300 controlling both switches 311 and 312 and therefore controlling wave-out line 548 and wave-out line 568, any incoming media files, e.g., incoming media 499, can be prevented from being recorded in an unauthorized manner in accordance with applicable copyright restrictions and/or licensing agreements related to the incoming media 499.

Still referring to FIG. 5B, it is further noted that custom media device 310 allows for unfettered playback of incoming media 499. Additionally, at any time during playback of media 499, custom media device 310 can be dynamically activated by CCM 300.

Figure 5C:
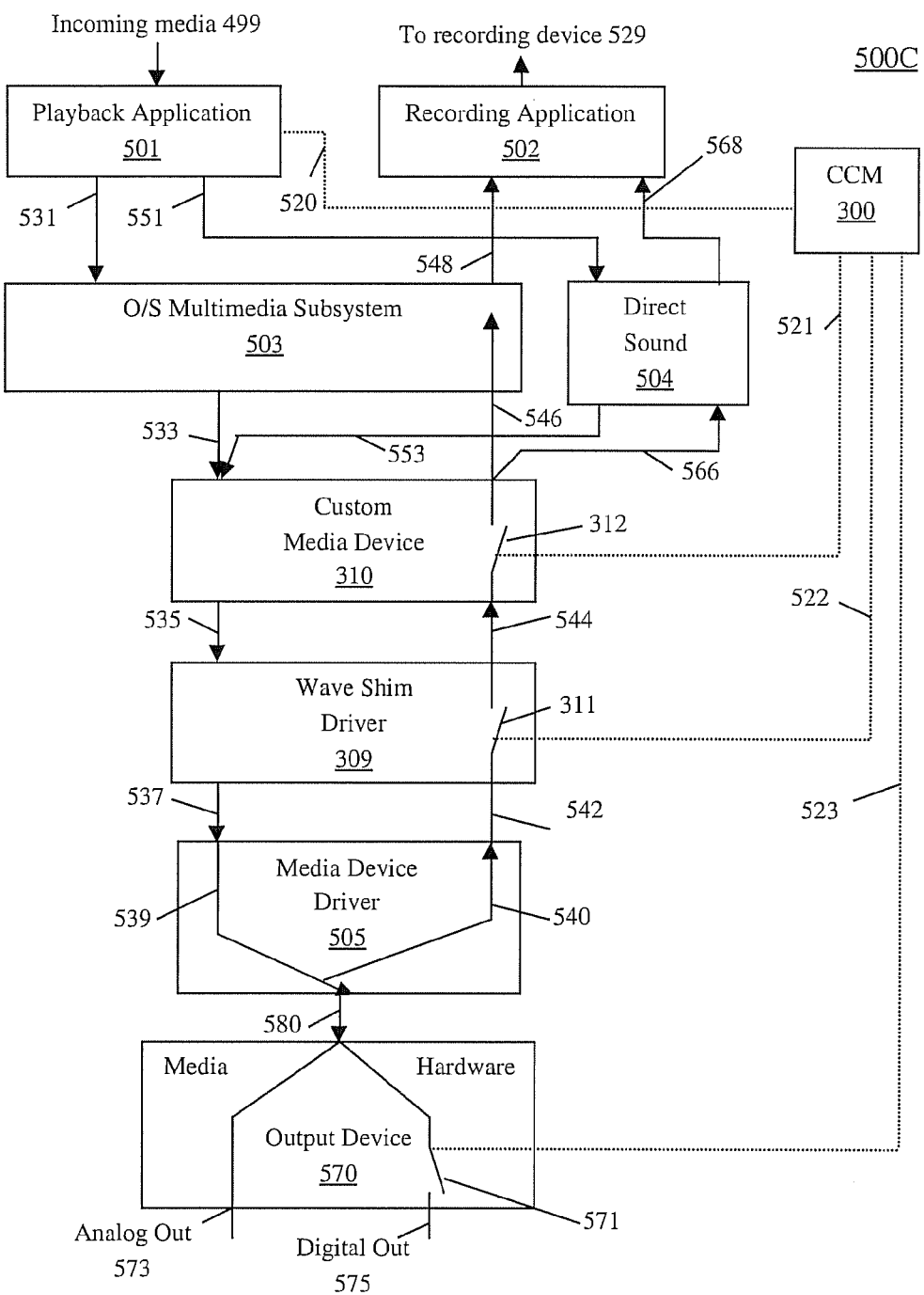
FIG. 5C is a data flow block diagram showing an implementation of a copyright compliance mechanism for preventing unauthorized output of media files, in accordance with one embodiment of the present invention.

FIG. 5C is an exemplary logic/bit path block diagram 500C of a client computer system, (e.g., 210), configured with a copyright compliance mechanism 300 for preventing unauthorized output and unauthorized recording of copyrighted media according to an embodiment of the present invention. Copyright compliance mechanism 300 is, in one embodiment, coupled with and operational on client system 210 in the manner described herein with reference to FIGS. 4, 5A, 5B, 5D, 6, and 7.

Diagram 500C of FIG. 5C is similar to diagram 500B of FIG. 5B, with a few changes. Particularly, media hardware output device 570 that is coupled with a media device driver 505. In one embodiment, media hardware output device 570 is shown to include a switch 571 controlled by CCM 300 via communication line 523, similar to switches 311 and 312, for controlling output of incoming media 499. Diagram 500C includes media hardware output device 570 that is coupled with media device driver 505. In one embodiment media hardware output device 570 can be a S/PDIF (Sony/Phillips Digital Interface) card for providing multiple outputs, (e.g., an analog output 573 and a digital output 575). An alternative media hardware output device providing similar digital output can also be implemented as device 570 including, but not limited to, a USB (universal serial bus) output device and/or an externally accessible USB port located on system 210, a FireWire (IEEE1394) output device and/or an externally accessible FireWire port located on system 210, with wireline or wireless communication functionality.

In one embodiment, CCM 300 is communicatively coupled with playback application 501 via coupling 520, waveform driver shim 309 via coupling 522, custom media device 310, via coupling 525, and media hardware output device 570 via coupling 523. CCM 300 is coupled to and controls a selectable switch 311 in waveform driver shim 309 via coupling 522. CCM 300 is also coupled to and controls a selectable switch 312 in custom audio device 310 via coupling 525. CCM 300 is further coupled to and controls a selectable switch 571 in media hardware output device 570 via connection 523. Depending upon the copyright restrictions and licensing agreements applicable to an incoming media file, (e.g., media 499), CCM 300 controls whether switches 311 and 312 are open (shown), thus preventing the incoming media 499 from reaching a recording application, or closed (not shown) so as to allow recording of the incoming media 499. Additionally, CCM 300 controls whether switch 571 is open (shown), thus preventing incoming media 499 from being output from digital output 575 of media hardware output device 570, or closed (not shown) to allow incoming media 499 to be output from media hardware output device 570.

By controlling media hardware output device 570, copyright compliance mechanism 300 can prevent unauthorized output of incoming media 499 to, e.g., a digital recording device that may be coupled with digital output 575 of media hardware output device 570. Accordingly, in one embodiment, CCM 300 is enabled to also detect digital recording devices that may be coupled to a digital output line, e.g., 575, of a media hardware output device, (e.g., 570). Examples of a digital recording device that can be coupled to media hardware output device 570 includes, but is not limited to, mini-disc recorders, MP3 recorders, personal digital recorders, digital recording devices coupled with multimedia systems, personal communication devices, set-top boxes, and/or nearly any digital device that can capture an incoming media 499 being output from a media hardware output device 570, (e.g., a sound card, a video card, etc.).

Within FIG. 5C, direct sound 504 is shown coupled with custom media device 310 via wave-in line 553, instead of being coupled with media device driver 505 (FIG. 5A). In one embodiment, custom audio device 310 mandates explicit selection through system 210, meaning that custom audio device 310 is needs to be selected as a default driver of system 210. By virtue of having the selection of custom media device 310 as the default driver of system 210, the data path necessary for direct sound 504 to capture the media content can be selectively closed.

For example, incoming media 499 originating from nearly any source with reference to FIG. 5A is received by media playback application 501 of system 210. Playback application 501 communicates to CCM 300, via coupling 520, to determine whether incoming media 499 is protected by any copyright restrictions and/or licensing agreements. Playback application 501 communicates with CCM 300 to control switch 311, 312, and 571 accordingly. In the present example, recording of incoming media 499 would violate applicable restrictions and/or agreements and therefore switch 312 is in an open position, such that the output path to recording application 502, (e.g., wave-out line 548 and/or wave-out line 568), is effectively blocked, thereby preventing unauthorized recording of media 499.

Alternatively, if media device driver 505 is selected as the default driver, incoming media 499 continues from O/S multimedia subsystem 503, through custom audio device 310, wave driver shim 309, and into media device driver 505 where media 499 can be simultaneously output to media output device 570 via line 580, and output on wave-out line 540 to wave-and outputted by media device driver 505 to wave shim driver 309 on wave-out line 542. However, by virtue of CCM 300 controlling switch 311, wave-out line 544 which eventually leads to recording application 502 is blocked, thus effectively preventing unauthorized recording of media 499.

It is noted that by virtue of CCM 300 controlling both switches 311 and 312 and therefore controlling wave-out line 548 and wave-out line 568, any incoming media files, (e.g., incoming media 499), can be prevented from being recording in an unauthorized manner in accordance with applicable copyright restrictions and/or licensing agreements related to the incoming media.

Still referring to FIG. 5C, it is particularly noted that although CCM 300 can prevent unauthorized recording of incoming media 499 by controlling switches 311 and 312, thus preventing incoming media 499 from reaching recording application 502, controlling switches 311 and 312 do nothing to prevent incoming media 499 from being captured by a peripheral digital device, (e.g., a mini-disc recorder), etc., coupled to a digital output 575 of device 570. Thus, by also controlling the output, via digital output 575 of media hardware output device 570, through control via switch 571, CCM 300 can prevent unauthorized capturing of incoming media 499 from output 575, (e.g., on a sound card for audio files, a video card for video and/or graphical files), regardless of whether incoming media 499 is received in a secure and encrypted manner. However, when switch 571 is in a closed position, incoming media 499 may be played back in an unfettered manner. Additionally, at any time during playback of media 499, switch 312 of custom media device 310, switch 311 of media device driver 309, and/or switch 571 of media hardware output device 570 can be dynamically activated by CCM 300.

Figure 5D:
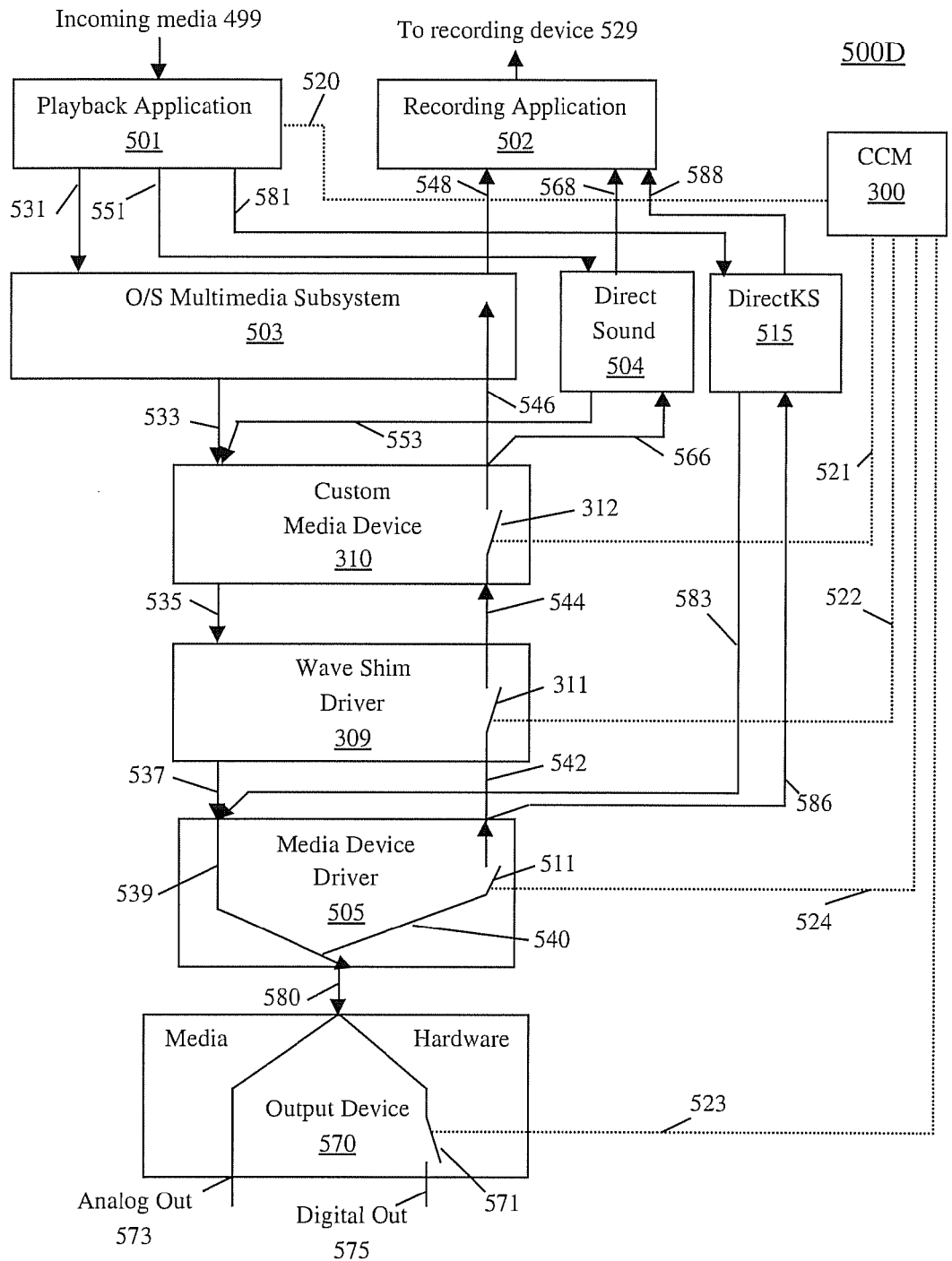
FIG. 5D is a data flow block diagram showing an implementation of a copyright compliance mechanism for preventing unauthorized output of media files through media file capture at a kernel level, in accordance with one embodiment of the present invention.

FIG. 5D is an exemplary logic/bit path block diagram 500D of a client computer system, (e.g., 210), configured with a copyright compliance mechanism 300 for preventing unauthorized kernel based output and unauthorized recording of copyrighted media according to an embodiment of the present invention. Copyright compliance mechanism 300 is, in one embodiment, coupled with and operational on client system 210 in the manner described herein with reference to FIGS. 4, 5A, 5B, 5C, 6, and 7.

Diagram 500D of FIG. 5D is similar to diagram 500C of FIG. 5C, with some changes. Particularly, diagram 500D includes a kernel streaming mechanism 515, (e.g., DirectKS), that is coupled with a media device driver 505. In one embodiment, DirectKS 515 can be used for establishing a direct connection with media device driver 505. In the present embodiment, media device driver 505 is shown to include a switch 511 controlled by CCM 300 via communication line 524, that is similar to switches 311, 312, and 571, for controlling output of incoming media 499.

In one embodiment, CCM 300 is communicatively coupled with playback application 501 via coupling 520, waveform driver shim 309 via coupling 522, custom media device 310, via coupling 525, and media device driver 505 via coupling 524. Specifically, CCM 300 is coupled to and controls a selectable switch 311 of waveform driver shim 309 via coupling 522. CCM 300 is also coupled to and controls a selectable switch 312 of custom audio device 310 via coupling 521. CCM 300 is further coupled to and controls a selectable switch 511 in media device driver 505 via coupling 524. Depending upon the copyright restrictions and/or licensing agreements applicable to an incoming media file, e.g., (e.g., media 499), CCM 300 controls whether switches 311 and 312 are open (shown), thus preventing the incoming media 499 from reaching a recording application, or closed (not shown) so as to allow recording of the incoming media 499. Additionally, CCM 300 controls whether switch 511 is open (shown), thus preventing incoming media 499 from being returned from media device driver 505 to DirectKS 515 which can capture incoming media 499 and redirect it to recording application 502 to create an unauthorized copy or recording of incoming media 499. CCM 300 can also control whether switch 511 is closed (not shown) to allow DirectKS 515 to capture and redirect incoming media 499 to recording application 502.

DirectKS 515, in one embodiment, may represent a kernel streaming mechanism that is adapted to establish a direct connection with a media device driver 505 of an operating system operable on client computer system 210, enabling kernel level access to media device driver 505. A kernel streaming mechanism can be implemented for the purpose of precluding utilization of standard audio APIs (application programming interfaces) to play or record media content, with particular attention paid to those playback applications with low latency requirements. DirectKS 515 can bypass existing APIs and communicate with media device driver 505. DirectKS 515 can be readily adapted to work in conjunction with a playback application, (e.g., 501), via coupling 581 to capture and redirect incoming media 499 and redirect it to driver 505 via coupling 583 and then to recording application 502, via wave-out line 588. Accordingly, DirectKS 515 can be implemented to create unauthorized media recordings.

By controlling media device driver 505, copyright compliance mechanism 300 can prevent unauthorized output of incoming media 499 to, e.g., a digital recording device 529 that may be coupled with recording application 502. In one embodiment, media device driver 505 is configured through the kernel mixer (not shown) to control the data path. Additionally, in one embodiment, CCM 300 is enabled to also detect a kernel streaming mechanism 515 (e.g., DirectKS) that may be operable on client computer system 210, as described herein with reference to FIG. 3.

In one embodiment, custom media device 310 mandates explicit selection through system 210, meaning that custom media device 310 is selected as a default driver of system 210. By virtue of having the selection of custom media device 310 as the default driver of system 210, the data path necessary for direct sound 504 to capture the media content is selectively closed.

For example, incoming media 499 originating from nearly any source described herein with reference to FIG. 5A is received by media playback application 501 of system 210. Playback application 501 communicates to CCM 300, via connection 520, to determine whether incoming media 499 is protected by any copyright restrictions and/or licensing agreements. Playback application 501 communicates with CCM 300 to control switches 311, 312, 571, and 511, accordingly. In the present example, recording of incoming media 499 would violate applicable restrictions and/or agreements and therefore switch 511 is in an open position, such that the output path to recording application 502, (e.g., wave-out line 548 and/or wave-out line 568 and/or wave-out line 588), is effectively blocked, thereby preventing unauthorized recording of media 499.

Still referring to FIG. 5D, it is particularly noted that although CCM 300 can prevent unauthorized recording of incoming media 499 by controlling switches 311, 312, and 571, thus preventing incoming media 499 from reaching recording application 502, controlling switches 311, 312, and 571, do nothing to prevent incoming media 499 from being returned to recording application 502 by a kernel streaming mechanism 515 (e.g., DirectKS), which enables capturing and redirecting of incoming media 499 to recording application 502, via wave-out line 588. Thus, by also controlling switch 511 of media device driver 505, CCM 300 can prevent kernel streaming mechanism 515 from returning incoming media 499 to recording application 502, thereby preventing incoming media 499 from being captured and redirected to recording application 502 in an attempt to create and unauthorized copy and/or recording of incoming media 499. However, when switch 511 is in a closed position, incoming media 499 may be returned to a recording application 502, such that recording could be possible, provided recording does not violate copyright restrictions and/or licensing agreements applicable to incoming media 499. Additionally, at any time during playback of media 499, switch 312 of custom media device 310, switch 311 of wave shim driver 309, and/or switch 511 of media device driver 505 can be dynamically activated by CCM 300.

Figure 6A:
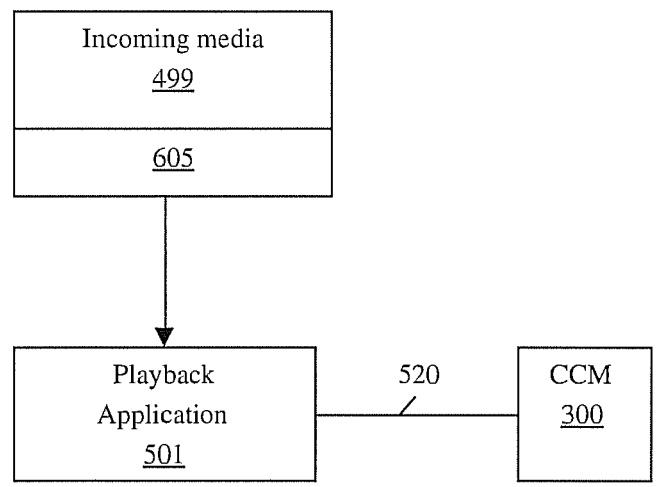
FIG. 6 is a block diagram of an environment for preventing unauthorized copying of a media file, in accordance with one embodiment of the present invention.

FIG. 6A is an block diagram of a media file, (e.g., incoming media 499), adapted to be received by a playback application, (e.g., 501 of FIGS. 5A, 5B, 5C, and 5D), configured with an indicator 605 for enabling incoming media 499 to comply with rules according to the SCMS (serial copy management system). When applicable to a media file, (e.g., 499), the SCMS allows for one copy of a copyrighted media file to be made, but not for copies of copies to be made. Thus, if incoming media 499 can be captured by a recording application, (e.g., 502 of FIGS. 5A, 5B, 5C, and/or 5D), and/or a recording device, (e.g. 529), and/or a peripheral recording device and/or a recording application coupled to a digital output of a media hardware output device, (e.g., digital output 575 of media hardware output device 570 of FIGS. 5B, 5C), and 5D, and/or a kernel streaming mechanism 515, (e.g., DirectKS of FIG. 5D), unauthorized copying and/or recording may be accomplished.

Playback application 501 is coupled with CCM 300 via communication line 520 in a manner analogous to FIGS. 5A, 5B, 5C, and/or 5D. Although not shown in FIG. 6, it is noted that CCM 300 is also coupled to switches 311 and 511 as shown in FIG. 5A, switches 311 and 312 in FIG. 5B, switches 311, 312, and 571 in FIG. 5C, and switches 312, 311, 571, and 511, in FIG. 5D.

In one embodiment, an indicator 605 is attached to incoming media 499 for preventing unauthorized copying or recording in accordance with the SCMS. In one embodiment, indicator 605 can be a bit that may be transmitted prior to beginning the delivery of incoming media 499 to playback application 501. In another embodiment, indicator 605 may be placed at the beginning of the bit stream of incoming media 499. In yet another embodiment, indicator 605 may be placed within a frame period of incoming media 499, (e.g., every fifth frame), or any other desired frame period. In another embodiment, indicator 605 may be transmitted at a particular time interval or intervals during delivery of the media file, (e.g. incoming media 499). Thus, indicator 605 may be placed nearly anywhere within or attached to the bit stream related to incoming media 499.

Within FIG. 6, indicator 605 may be comprised of various indicators, (e.g., a level 0 indicator, a level 1 indicator, and a level 2 indicator), in one embodiment of the present invention. In the present embodiment, a level 0 indicator may be for indicating to CCM 300 that copying is permitted without restriction, (e.g., incoming media 499 is not copyrighted or that the copyright is not asserted). In the present embodiment, a level 1 indicator may be for indicating to CCM 300 that one generation of copies of incoming media 499 may be made, such that incoming media 499 is an original copy and that one copy may be made. In the present embodiment, a level 2 indicator may be for indicating to CCM 300 that incoming media 499 is copyright protected and/or a copy thereof, and as such no digital copying is permitted.

For example, incoming media 499 is received by playback application 501. Application 501 detects an indicator 605 attached therewith, in this example, a level 2 bit is placed in the bit stream for indicating to CCM 300 that copying is not permitted. As such, when CCM 300 is configured in system 210 such as that shown in FIG. 5A, in response to a level 2 indicator bit, CCM 300, while controlling the audio path, then activates switches 311 and 511 to prevent any recording of incoming media 499.

However, CCM 300 is configured in system 210 such as that shown in FIG. 5B, in response to a level 2 indicator bit, CCM 300, while controlling the media path, then activates switches 311 and 312 to prevent any recording of incoming media 499.

Alternatively, when CCM 300 is configured in system 210 such as that shown in FIG. 5C, in response to a level 2 indicator bit, CCM 300, while controlling the media path, then activates switches 311, 312, and 571 to prevent any recording of incoming media 499.

It is noted that CCM 300 can activate or deactivate switches coupled therewith, as described herein with reference to FIGS. 5A-5D, thereby funneling incoming media 499 through the secure media path, in this instance the audio path, to prevent unauthorized copying of incoming media 499. It is further noted that CCM 300 can detect media recording applications and devices as described herein, with reference to FIG. 3.

Figure 7A:
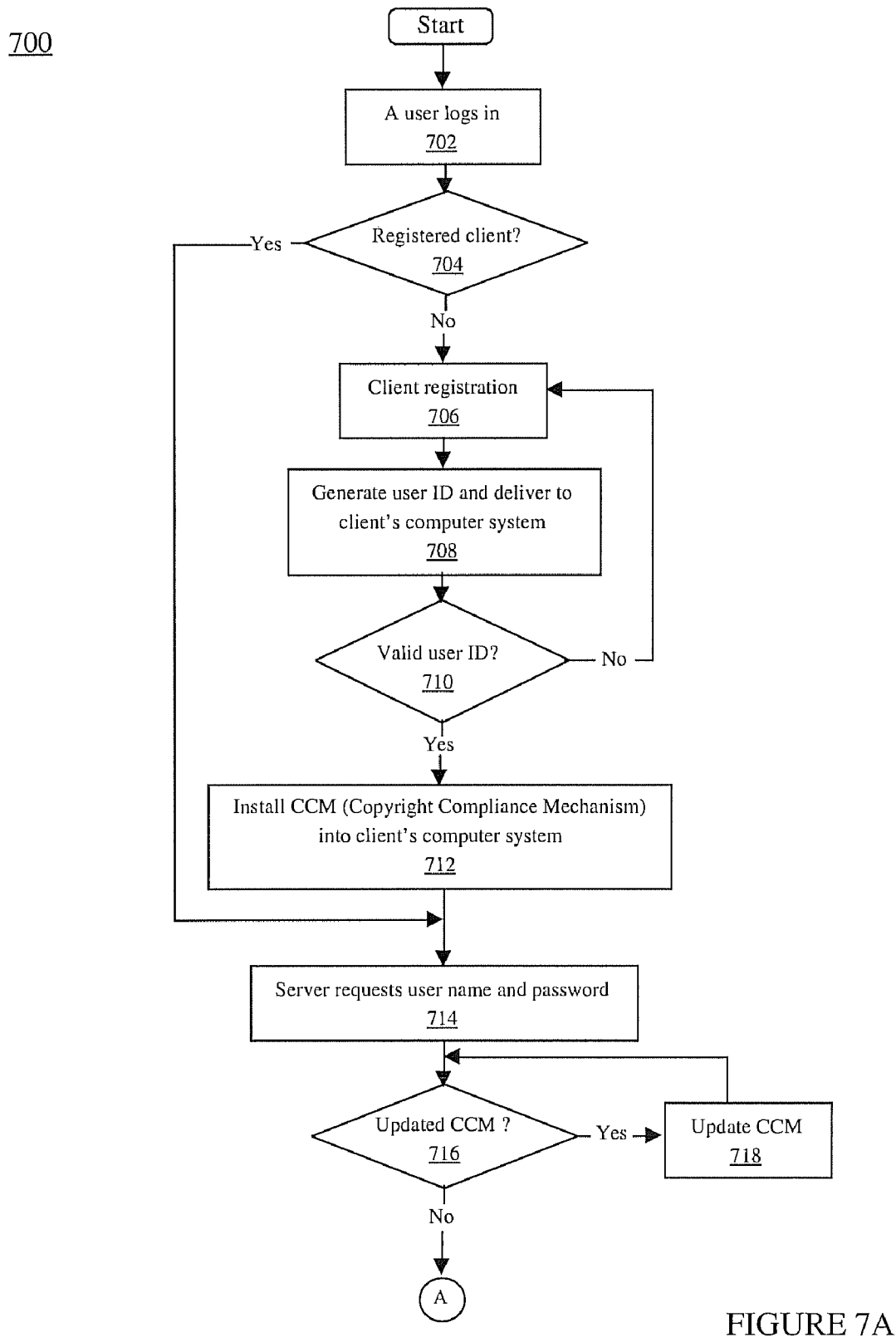
FIGS. 7A, 7B, and 7C are a flowchart of steps performed in accordance with an embodiment of the present invention for providing a copyright compliance mechanism to a network of client and server computer systems.
Figure 7B:
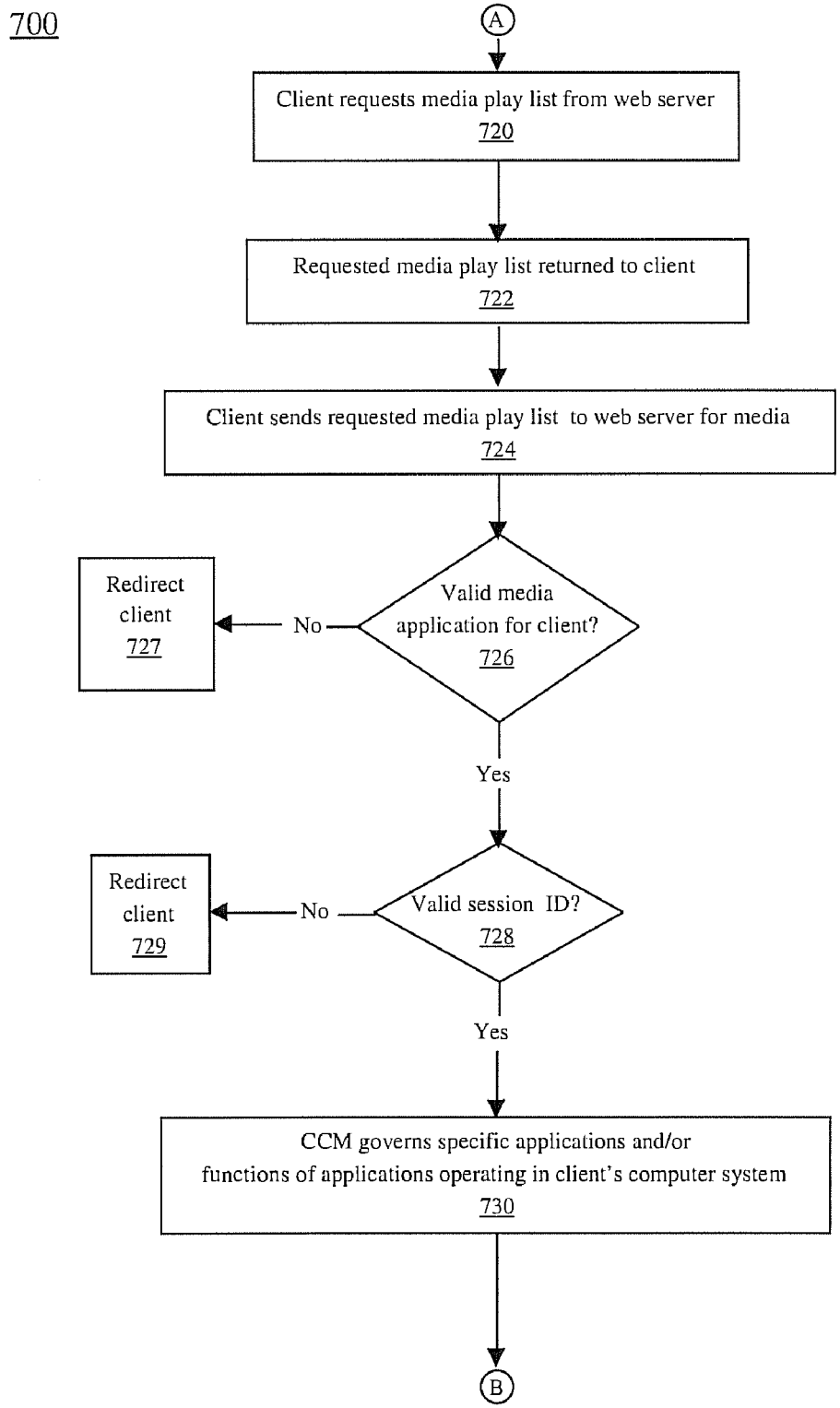
Figure 7C:
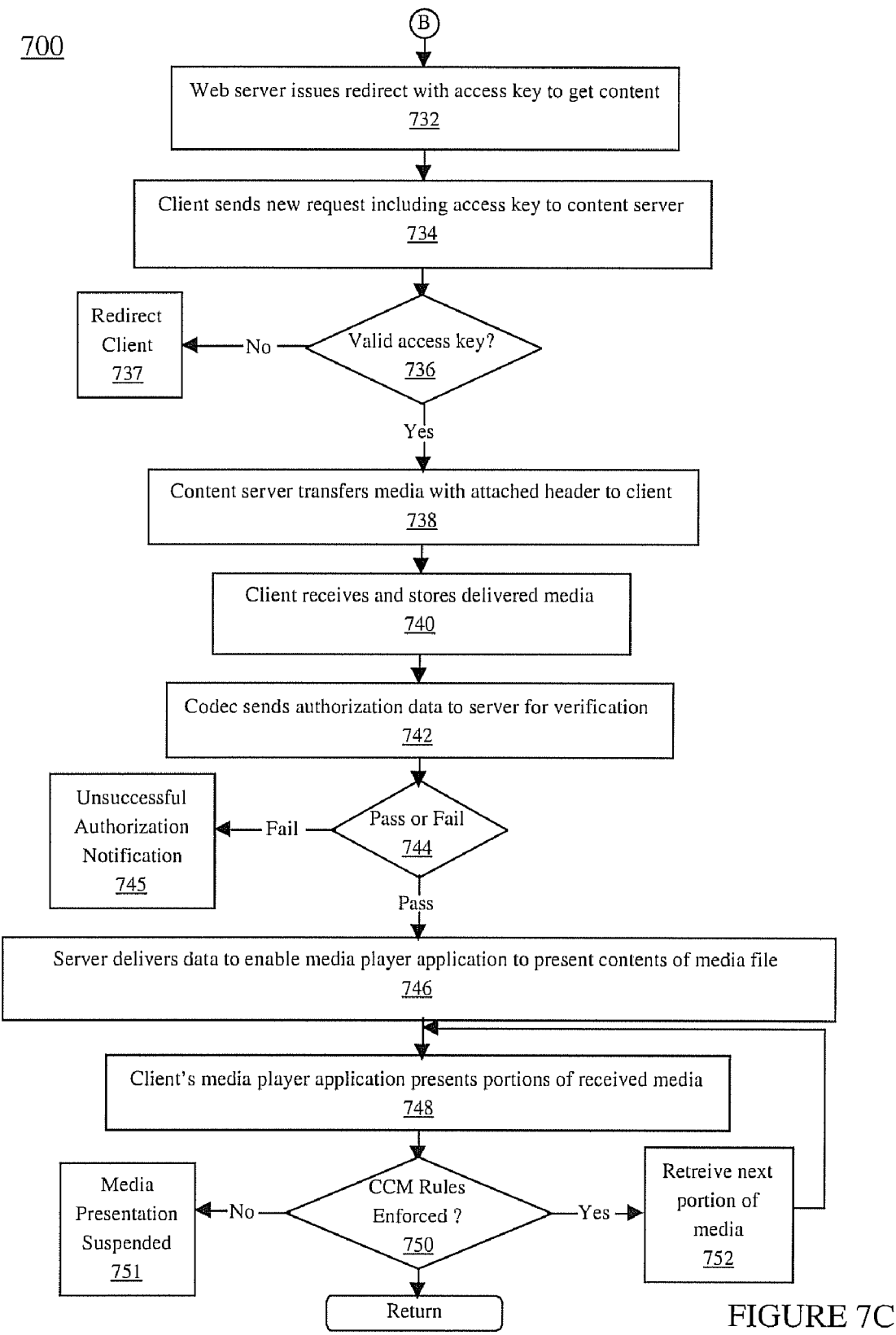

FIGS. 7A, 7B, and 7C, are a flowchart 700 of steps performed in accordance with one embodiment of the present invention for controlling end user interaction of delivered electronic media. Flowchart 700 includes processes of the present invention which, in some embodiments, are carried out by processors and electrical components under the control of computer readable and computer executable instructions. The computer readable and computer executable instructions reside, for example, in data storage features such as computer usable volatile memory 104 and/or computer usable non-volatile memory 103 of FIG. 1. However, the computer readable and computer executable instructions may reside in any type of computer readable medium. Although specific steps are disclosed in flowchart 700, such steps are exemplary. That is, the present embodiment is well suited to performing various other steps or variations of the steps recited in FIGS. 7A, 7B, and 7C. Within the present embodiment, it should be appreciated that the steps of flowchart 700 may be performed by software, by hardware or by any combination of software and hardware.

The present embodiment provides a method for restricting recording of high fidelity media content delivered via one or more communication networks. The present embodiment delivers the high fidelity media content to registered clients while preventing unauthorized clients from directly receiving media content from a source database. Once the client computer system receives the media content, it can be stored in hidden directories and/or custom file systems that may be hidden to prevent subsequent unauthorized sharing with others. It is noted that various functionalities can be implemented to protect and monitor the delivered media content. For example, the physical address of the media content can be hidden from media content recipients. Alternatively, the directory address of the media content can be periodically changed. Additionally, an access key procedure and rate control restrictor can also be implemented to monitor and restrict suspicious media content requests. Furthermore, a copyright compliance mechanism, (e.g., CCM 300), can be installed in the client computer system 210 to provide client side compliance with licensing agreements and/or copyright restrictions applicable to the media content. By implementing these and other functionalities, the present embodiment restricts access to and the distribution of delivered media content and provides a means for copyrighted media owner compensation.

It is noted that flowchart 700 is described in conjunction with FIGS. 2, 3, 4, and 5A-5D, in order to more fully describe the operation of the present embodiment. In operation 702 of FIG. 7A, a user of a computer system, (e.g., 210), causes the computer to communicatively couple to a web server, (e.g., 250), via one or more communication networks, (e.g., Internet 201), and proceeds to attempt to log in. It is understood that the log in process of operation 702 can be accomplished in a variety of ways in accordance with the present invention.

In operation 704 of FIG. 7A, web server 250 accesses a user database, (e.g., 450), to determine whether the user and the computer system 210 logging in are registered with it. If the user and computer system 210 are registered with web server 250, the present embodiment proceeds to operation 714. However, if the user and computer system 210 are not registered with web server 250, web server 250 can initiate a user and computer system 210 registration process at operation 706.

In operation 706, registration of the user and computer system 210 is initiated. The user and computer system registration process can involve the user of computer system 210 providing personal information including, but not limited to, their name, address, phone number, credit card number, online payment account number, biometric identification (e.g., fingerprint, retinal scan, etc.), and the like. Web server 250 can verify the accuracy of the information provided. Web server 250 can also acquire information regarding the user's computer system 210 including, but not limited to, identification of media players disposed and operable on system 210, a unique identifier corresponding to the computer system, etc. In one embodiment, the unique identifier corresponding to the computer system can be a MAC address. Additionally, web server 250 can further request that the user of computer system 210 to select a username and password.

In operation 708 of FIG. 7A, subsequent to the completion of the registration process, web server 250 generates a unique user identification (ID) or user key associated with the user of client computer system 210. The unique user ID, or user key, is then stored by web server 250 in a manner that is associated with that registered user. Furthermore, one or more cookies containing that information specific to that user and the user's computer system 210, is installed in a non-volatile memory device, (e.g., 103 and/or data storage device 108 of computer system 210). It is noted that the user ID and cookie can be stored in a hidden directory within one or more non-volatile memory devices within computer system 210, thereby preventing user access and/or manipulation of that information. It is further noted that if the unique user ID, or user key, has been previously generated for the user and computer 210 that initially logged-in at operation 702, the present embodiment proceeds to operation 714

In operation 710, web server 250 verifies that the user ID and the cookie(s) are properly installed in computer system 210 and verifies the integrity of the cookie(s) and the user ID, thereby ensuring no unauthorized alterations to the user ID or the cookie(s) has occurred. If the user ID is not installed and/or not valid, web server 250 can re-initiate the registration process at operation 706. Alternatively, web server 250 can decouple computer system 210 from the network, thereby requiring a re-log in by the user of computer 210. If the cookie(s) and user ID are valid, the present embodiment proceeds to operation 712.

In operation 712 of FIG. 7A, web server 250 can install a version of a copyright compliance mechanism, (e.g., 300), onto one or more non-volatile memory devices of computer system 210. Installing CCM 300 into user's computer system 210 can facilitate client side compliance with licensing agreements and copyright restrictions applicable to specific delivered copyrighted media content. At operation 712, the components of CCM 300, such as instructions 301, coder/decoder (codec) 303, agent programs 304, system hooks 305, skins 306, and custom media device drivers 307 (e.g., custom media device 310 of FIGS. 5B-5D), are installed in computer system 210, such as that shown in FIGS. 5A-5D. In one embodiment, a hypertext transfer protocol file delivery system can be utilized to install CCM 300 into computer system 210. However, operation 712 is well suited to install CCM 300 on computer system 210 in a wide variety of ways in accordance with the present embodiment. For example, CCM 300 can be installed as an integrated component within a media player application, media recorder application, and/or media player/recorder applications. Alternatively, CCM 300 can be installed as a stand-alone mechanism within a client computer system 210. Additionally, CCM 300 can be installed as a stand-alone mechanism and/or as part of a bundled application from a media storage device, (e.g., a CD, a DVD, an SD), and/or as part of an installation package. In another embodiment, CCM 300 can be installed in conjunction with a presentation of desired media content, (e.g., listening to an audio file on a music CD, reading a document, viewing a video, etc.). It is noted that, in one embodiment, CCM 300 may be installed on client system 210 in a clandestine manner, relative to a user.

In operation 714, web server 250 can request the previously established username and password of the user of client computer system 210. Accordingly, the user of client computer system 210 causes it to transmit to web server 250 the previously established username and password. Upon the receipt thereof, web server 250 may access a user database, (e.g., 450), to determine their validity. If the username and password are invalid, web server 250 refuses access wherein flowchart 700 may be discontinued (not shown). Alternatively, if the username and password are valid, the present embodiment proceeds to operation 716.

In operation 716 of FIG. 7A, web server 250 can access media file database 450 to determine if copyright compliance mechanism 300 has been updated to reflect changes made to the DMCA (Digital Millennium Copyright Act) and/or to the interactive/non-interactive licensing agreements recognized by the DMCA. It is noted that alternative licensing agreements can be incorporated into copyright compliance mechanism 300. Advantageously, by providing a copyright compliance mechanism that can be readily updated to reflect changes in existing copyright restrictions and/or the introduction of other types of licensing agreements, and/or changes to existing media player applications, and/or the development of new media player applications, copyright compliance mechanism 300 can provide compliance with current copyright restrictions associated with the media content.

Continuing with operation 716, if web server 250 determines that CCM 300, or components thereof, of computer 210 has not been updated, web server 250 initiates installation of the newer components and/or the most current version of CCM 300 into computer system 210, shown as step 718. If web server 250 determines that the current version of CCM 300 installed on system 210 does not have to be updated, the present embodiment proceeds to operation 720 of FIG. 7B.

In operation 720 of FIG. 7B, the user of client computer system 210 causes it to transmit to web server 250, (e.g., via Internet 201), a request for a play list of available media files. It is noted that the play list can contain all or part of the media content available from a content server, (e.g., 251).

In operation 722, in response to web server 250 receiving the play list request, web server 250 transmits to client computer system 210 a media content play list together with the unique user ID associated with the logged-in user. The user ID, or user key, can be attached to the media content play list in a manner invisible to the user. It is noted that the media content in content server 251 can be, but is not limited to, high fidelity music, audio, video, graphics, multimedia, alphanumeric data, software applications, and the like. The media content play list of operation 720 can be implemented in diverse ways. In one example, web server 250 can generate a media content play list by combining all the available media content into a single play list. Alternatively, all of the media content titles, or different lists of titles, can be loaded from content server 251 and passed to a CGI (common gateway interface) program operating on web server 250 where the media titles, or differing lists of titles, can be concatenated into a single dimensioned array that can be provided to client computer system 210. It is understood that the CGI can be written in nearly any software computing language.

In operation 724 of FIG. 7B, the user of client computer system 210 can utilize the received media content play list in conjunction with a media player application in order to cause client computer system 210 to transmit a request to web server 250 for delivery of desired media content, and wherein the user ID is automatically included therewith. The media content play list provided to client computer system 210 by web server 250 can enable the user to create one or more customized play lists by the user selecting desired media content titles. It is noted that a customized media play list can establish the media content that will eventually be delivered to client computer system 210 and the order in which the content will be delivered. Additionally, the user of client computer system 210 can create one or more customized play lists and store those play lists in system 210 and/or within web server 250. It is noted that a customized play list does not actually contain the desired media content titles, but rather the play list includes one or more identifiers associated with the desired media content that can include, but is not limited to, a song, an audio clip, a video clip, a picture, a multimedia clip, an alphanumeric document, or particular portions thereof In another embodiment, the received media content play list can include a random media content delivery choice that the user of client computer system 210 can transmit to web server 250, with the user ID, to request delivery of the media content in a random manner.

In operation 726, upon receiving the request for media content from client computer system 210, web server 250 determines whether the requesting media application operating on client computer system 210 is a valid media application. One of the functions of a valid media application is to be a player of media content as opposed to an application that downloads media content in an unauthorized or unregulated manner. If web server 250 determines that the media application operating on system 210 is not a valid media application, the present embodiment proceeds to operation 727 which in one embodiment, redirects client computer system 210 to a web site where the user of system 210 can download a valid media player application or to a software application which can identify client computer system 210, log system 210 out of web server 250 and/or prevent future logging-in for a defined period of time, (e.g., 15 minutes, an hour, a day, a week, a month, a year, or any specified amount of time). If web server 250 determines that the media application operating on system 210 is a valid media application, the present embodiment proceeds to operation 728.

In operation 728 of FIG. 7B, the present embodiment causes web server 250 to determine whether the user ID (or user key) that accompanied the media delivery request sent by client computer system 210 is valid. If web server 250 determines that the user ID is invalid, the present embodiment proceeds to operation 729 where client computer system 210 can be logged off web server 250 or client computer system 210 can be returned to step 706 (of FIG. 7A) to re-register and to have another unique user ID generated by web server 250. It is noted that the order in which operations 726 and 728 are performed can be altered such that operation 728 can be performed prior to operation 726. If web server 250 determines that the user ID is valid, the present embodiment proceeds to operation 730.

In operation 730, prior to web server 250 authorizing the delivery of the redirect and access key for the requested media file content, shown as operation 732, CCM 300 governs certain media player applications and/or functions thereof that are operable on client computer system 210. These governed functions can include, but are not limited to, pause, stop, progress bar, save, etc. It is noted that, in one embodiment, CCM 300 can utilize system hooks 305 to accomplish the functionality of operation 730.

In operation 732 of FIG. 7C, the present embodiment causes web server 250 to transmit to client computer system 210 a redirection command along with a time sensitive access key (e.g., for that hour, day or for any defined period of time) thereby enabling client computer system 210 to receive the requested media content. The redirection command can include a time sensitive address of the media content location within content server 251. The address is time sensitive because, in one embodiment, the content server 251 periodically renames some or all of the media address directories, thereby making previous content source addresses obsolete. Alternatively, the address of the media content is changed. In another embodiment, the location of the media content can be changed along with the addresses. Regardless, unauthorized users and/or applications are restricted from directly retrieving and/or copying the media content from content server 251. Therefore, if someone with inappropriate or unlawful intentions is able to find where the media content is stored, subsequent attempts will fail, as the previous route no longer exists, thereby preventing future unauthorized access.

It is noted that in one embodiment of the present invention, the addresses (or routes) of content server 251 that are actively coupled to one or more client computer systems (e.g., 210-230) are maintained while future addresses, or routes, are being created for new client devices. It is further noted that as client computer systems are uncoupled from the media content source of content server 251, that directory address, or link, can be immediately changed, thereby preventing unauthorized client system or application access.

In another embodiment, the redirection of client computer system 210 to content server 251 can be implemented by utilizing a server network where multiple servers are content providers, (e.g., 251), or by routing a requesting client computer system (e.g., 210, 220, or 230) through multiple servers. In yet another embodiment, the delivery of media content from a central content provider (e.g., 251) can be routed through one or more intermediate servers before being received by the requesting client computer system, (e.g., 210).

The functionality of operation 732 is additionally well suited to provide recordation of the Internet Protocol (IP) addresses of the client computer systems, (e.g., 210), the media content requested and its transfer size, thereby enabling accurate monitoring of royalty payments, clock usage and transfers, and media content popularity.

In operation 734 of FIG. 7C, upon receiving the redirection command, the present embodiment causes the media playback application 501 (FIGS. 5A-5D) operating on client computer system 210 to automatically transmit to content server 251 a new media delivery request which can include the time sensitive access key and the address of the desired media content.

In operation 736 of FIG. 7C, content server 251 determines whether the time sensitive access key associated with the new media delivery request is valid. If content server 251 determines that the time sensitive access key is valid, the present embodiment proceeds to operation 738 of FIG. 7C. However, if content server 251 determines that the time access key is not valid, the present embodiment proceeds to operation 737, a client redirect.

In operation 737, content server redirects client computer 210 to operation 732 (not shown) where a new access key is generated. Alternatively, operation737 causes the present embodiment to return to operation 704 of FIG. 7A. In yet another embodiment, operation 737 can cause client computer system 210 to be disconnected from content server 251.

In operation 738 of FIG. 7C, content server 251 transmits the requested high fidelity media content to client computer system 210. It is noted that each media content file delivered to client computer system 210 can have a header attached thereto, prior to delivery, as described herein with reference to FIG. 4. It is further noted that both the media content and the header attached thereto can be encrypted. In one embodiment, the media content and the header can be encrypted differently. Alternatively, each media content file can be encrypted differently. In another embodiment, groups of media files are analogously encrypted. It is noted that public domain encryption mechanisms, (e.g., Blowfish), and/or non-public domain encryption mechanisms can be utilized.

Still referring to operation 738, content server 251 can transmit the requested media content in a burst load (in comparison to a fixed data rate), thereby transferring the content to client computer system 210 as fast as the network transfer rate allows. Further, content server 251 can have its download rate adapted to be equal to the transfer rate of the network to which it is coupled. In another embodiment, the content server 251 download rate can be adapted to equal the network transfer rate of the client computer system 210 to which the media content is /being delivered. For example, if client computer system 210 is coupled to Internet 201 via a T1 connection, then content server 251 transfers the media content at transmission speeds allowed by the Ti connection line. As such, once the requested media content is transmitted to client computer system 210, content server 251 is then able to transmit requested media content to another client computer system, (e.g., 220 or 230). Advantageously, this provides an efficient means to transmit media content, in terms of statistical distribution over time and does not overload the communication network(s).

It is noted that delivery of the requested media content by content server 251 to client computer system 210 can be implemented in a variety of ways. For example, an HTTP (hypertext transfer protocol) file transfer protocol can be utilized to transfer the requested media content as well as a copyright compliance mechanism 300 to client 210. In this manner, the copyright compliance mechanism as well as each media content file/title can be delivered in its entirety. In another embodiment, content server 251 can transmit to client computer system 250 a large buffer of media content, (e.g., audio clips, video clips, and the like).

In operation 740 of FIG. 7C, upon receiving the requested high fidelity media content from content server 251, the present embodiment causes client computer system 210 to store the delivered media content in a manner that is ready for presentation, (e.g., playback). The media content is stored in client computer system 210 in a manner that restricts unauthorized redistribution. For example, the present embodiment can cause the high fidelity media content to be stored in a volatile memory device (e.g., 103), utilizing one or more hidden directories and/or custom file systems that may be hidden, where it may be cached for a limited period of time. Alternatively, the present embodiment can cause the high fidelity media content to be stored in a non-volatile memory device, (e.g., 104) or data storage device (e.g., 109). It is noted that the manner in which each of the delivered media content file(s) is stored, volatile or non-volatile, can be dependent upon the licensing restrictions and/or copyright agreements applicable to each media content file. It is further noted that in one embodiment, when a user of client computer system 210 turns the computer off or causes client computer system 210 to disconnect from the network, the media content stored in a volatile memory device is typically deleted therefrom.

Still referring to operation 740, in another embodiment, the present embodiment can cause client computer system 210 to store the received media content in a non-volatile manner within a media application operating therein, or within one of its Internet browser applications (e.g., Netscape Communicator™, Microsoft Internet Explorer™, Opera™, Mozilla™, and the like) so that delivered media content can be used in a repetitive manner. Further, the received media content can be stored in a manner making it difficult for a user to redistribute in an unauthorized manner, while allowing the user utilization of the received media content, (e.g., by utilizing one or more hidden directories and/or custom file systems that may also be hidden). It is noted that by storing media content with client computer system 210 (when allowed by applicable licensing agreements and/or copyright restrictions), content server 251 does not need to redeliver the same media content to client computer system 210 each time its user desires to experience (e.g., listen to, watch, view, etc.) the media content file.

In operation 742 of FIG. 7C, the received media content file is then fed into a media player application (e.g., playback application 501 of FIGS. 5A-5D), which then runs it through a codec, (e.g., coder/decoder 303 of CCM 300), in one embodiment. In response, coder/decoder 303 sends an authorization request to the content server, (e.g., 251), with attached authorization data, as described herein. In response to receiving codec's 303 authorization request, content server 251 compares the received authorization data with that stored in server 251, and subsequently, the present embodiment proceeds to operation 744.

In operation 744, the content server 251 responds with a pass or fail authorization. If server 251 responds with a fail, such that the received authorization data is invalid, the present embodiment can proceed to operation 745, where server 251 can, in one embodiment, notify the user of client system 210, (e.g., by utilization of skin 306), that there was an unsuccessful authorization of the requested media content file. It is noted that alternative messages having similar meanings may also be presented to the user of client computer system 210, thereby informing the user that the delivery failed. However, if the authorization data passes, the present embodiment proceeds to operation 746.

In operation 746, server 251 transmits certain data back to the media player application enabling the media player application to present the contents of the media file via media playback application 501 of FIGS. 5A-5D. In one embodiment, a decryption key can be included in the transmitted data to decrypt the delivered media content file. In another embodiment, an encryption/decryption key can be included in the transmitted data to allow access to the contents of the media file. The present method then proceeds to operation 748.

In operation 748 of FIG. 7C, subsequent to media file decryption, the media file may be passed through CCM 300, (e.g., a codec 303), to a media player application operating on client computer system 210, (e.g., playback application 501 of FIGS. 5A-5D), which can then access and utilize the delivered high fidelity media content, enabling its user(s) to experience the media content, (e.g., listen to it, watch it, view it, or the like). In one embodiment of the present invention, a specialized or custom media player may be involved in order to experience the media content, (e.g., skin 306 of FIG. 3). Skin 306 may be implemented when CCM 300 cannot modify an industry standard media player application to comply with copyright restrictions and/or licensing agreements in accordance with the DMCA. Alternatively, a specialized or custom media player may not be needed to experience the media content. Instead, an industry standard media player can be utilized by client computer system 210 to experience the media content. Typically, many media player applications are available and can include, but are not limited to, Windows™ Media Player™ for PCs (personal computers), iTunes™ Player or QuickTime™ for Apple computers, and XMMS player for computers utilizing a Linux operating system. Regardless of the media player application utilized, while the media file is passed to the media player application, (e.g., in a frame by frame basis or in a buffer by buffer basis), coder/decoder 303 will repeatedly ensure that CCM 300 rules are being enforced at any particular moment during media playback, shown as operation 750.

In operation 750, as the media file content is delivered to the media player application, (e.g., media player application 501 of FIGS. 5A-5D), periodically, (e.g., after a specified number of frames, after a defined period of time, or any desired time or data period), coder/decoder 303 repeatedly determines whether or not all the rules are enforced, in accordance with rules as defined by CCM 300. If the rules are not enforced, (e.g., change due to a user opening up a recording application (e.g., Total Recorder or alternative application)) the present method proceeds to operation 751. If the rules, in accordance with CCM 300, are enforced, the present embodiment then proceeds to operation 752.

In operation 751 of FIG. 7C, if the rules according to CCM 300 are not enforced, the presentation of the media content is, in one embodiment, suspended or halted. In one embodiment, CCM 300 of FIG. 5A can selectively control switches 311 and 511 to prevent output of incoming media 499 (FIGS. 5A, 5B, 5C, and 5D) to a recording application 502 (FIGS. 5A, 5B, and 5C, via wave shim driver 309 and direct sound 504 respectively, thus preventing unauthorized recording of incoming media 499. In another embodiment, CCM 300 of FIG. 5B can selectively control switches 311 and 312 to prevent output of incoming media 499 to recording application 502 via wave shim driver 309 and custom media device 310, thus preventing unauthorized recording of incoming media 499. In yet another embodiment, CCM 300 of FIG. 5C can selectively control switches 311, 312, to not only prevent incoming media 499 from being recorded in an unauthorized manner but can also selectively control switch 571 to prevent unauthorized output of incoming media 499 via digital output 575 of media hardware output device 570. In yet another embodiment, CCM 300 of FIG. 5D can selectively control switches 311, 312, 571, and 511 to a prevent kernel streaming mechanism 515, (e.g., DirectKS) which can establish a connection with media device driver 505 of FIG. 5D, from capturing incoming media content and returning it to a recording application (e.g., 502) to create an unauthorized recording of the media content. In one embodiment, incoming media 499 may not be output from digital output 575. In another embodiment, incoming media 499 may be output via digital output 575 but in an inaudible manner, (e.g., silence). In yet another embodiment, incoming media 499 can be audible but recording functionality can be disabled, such that the media content cannot be recorded.

In operation 752, if the rules are enforced in accordance with CCM 300, codec 303 retrieves a subsequent portion of the media content that is stored locally in client computer system 210. The newly retrieved portion of the media file is then presented by the client's media player application, shown in the present method as step 748. While the newly retrieved portion is presented, embodiments of the present method then again perform step 750, then step 752 or 751, then step 748, then 750, etc., in a continual loop until the media file contents are presented in their entirety. Advantageously, by constantly monitoring playing media files, CCM 300 can detect undesired activities and enforce those rules defined by CCM 300.

Figure 8:
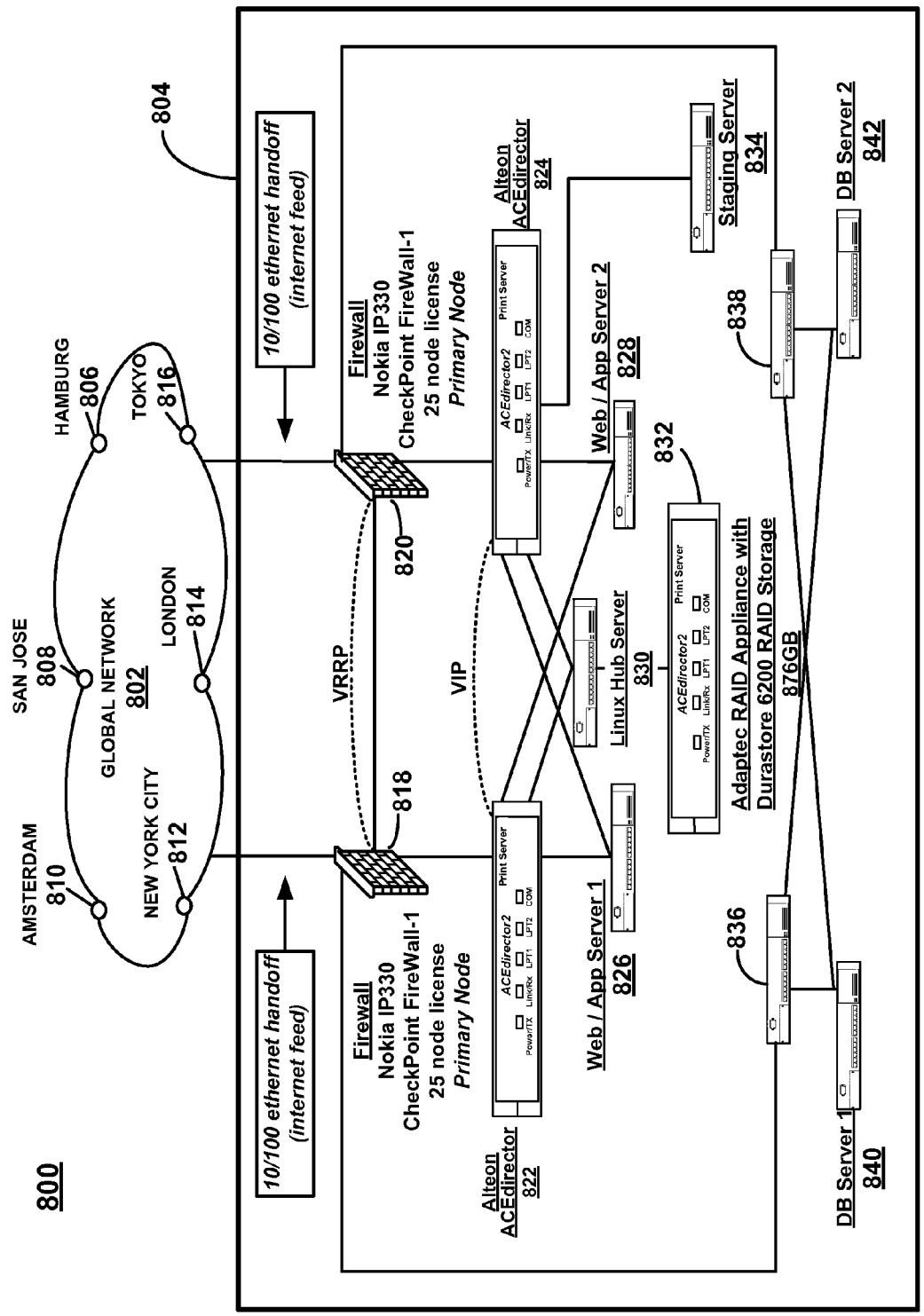
FIG. 8 is a diagram of an exemplary global media delivery system in which a copyright compliance mechanism can be implemented in accordance with an embodiment of the present invention.

FIG. 8 is a diagram of an exemplary high-speed global media content delivery system 800, in accordance with an embodiment of the present invention. In one embodiment, system 800 can be utilized to globally deliver media content, e.g., audio media, video media, graphic media, multimedia, alphanumeric media, etc., to one or more client computer systems, (e.g., 210, 220, and/or 230), in conjunction with a manner of delivery similar to that described herein. In one embodiment, system 800 includes a global delivery network 802 that can include multiple content servers, (e.g., 804, 806, 808, 810, 812, 814, and 816), that can be located throughout the world and which may be referred to as points of presence or media delivery point(s). Each of content server 804-816 can store a portion, a substantial portion, or the entire contents of a media content library that can be delivered to client computer systems via one or more networks, (e.g., Internet 201, or a WAN (wide area network)). Accordingly, each of content server 804-816 can provide media content to of client computer systems in its respective vicinity of the world. Alternatively, each content server can provide media content to a substantial number of client computer systems For example, a media delivery point (MDP) 816, located in Tokyo, Japan, is able to provide and deliver media content from the media content library stored in its content database, (e.g., 451), to client computer systems within the Asiatic regions of the world while a media delivery point 812, located in New York City, N.Y., USA, is able to provide and deliver media content from its stored media content library to client devices within the Eastern United States and Canada. It is noted that each city name, (e.g., London, Tokyo, Hamburg, San Jose, Amsterdam, or New York City), associated with one of the media delivery points 804-816 represents the location of that particular media delivery point or point of presence. However, it is further noted that these city names are exemplary because media delivery points 804-816 can be located anywhere within the world, and as such are not limited to the cities shown in global network 802.

Still referring to FIG. 8, it is further noted that global system 802 is described in conjunction with FIGS. 2, 3, 4, 5A-D, and 6, in order to more fully describe the operation of embodiment. Particularly, subsequent to a client computer system, e.g., client computer system 210 of FIG. 2, interacting with a web server, (e.g., web server 250 of FIG. 2), as described herein, web server (e.g., 250 of FIG. 2), in one embodiment, can redirect client computer system 210 to receive the desired media content from an MDP (e.g., 804-816) based on one or more differing criteria.

For example, computer system 210 may be located in Brattleboro, Vermont, and its user causes it to log-in with a web server 250 which can be located anywhere in the world. It is noted that operations 702-730 of FIGS. 7A and 7B can then be performed as described herein such that the present embodiment proceeds to operation 732 of FIG. 7C. At operation 732, the present embodiment can determine which media delivery points, (e.g., 804, 806, 808, 810, 812, 814, or 816), can subsequently provide and deliver the desired media content to client computer system 210.

Still referring to FIG. 8, one or more differing criteria can be utilized to determine which media delivery point to select for delivery of the desired media content. For example, the present embodiment can base its determination upon which media delivery point is in nearest proximity to client computer system 210, (e.g., media delivery point 816). This can be performed by utilizing the stored registration information, (e.g., address), provided by the user of client computer system 210. Alternatively, the present embodiment can base its determination upon which media delivery point provides media content to the part of the world in which client computer system is located. However, if each of the media delivery points (e.g., 804-816) stores differing media content, the present embodiment can determine which one can actually provide the desired media content. It is noted that these are exemplary determination criteria and the embodiments of the present invention are not limited to such implementation.

Subsequent to determination of which media delivery point is to provide the media content to client computer system 210 at operation 732, web server 250 transmits to client computer system 210 a redirection command to a media delivery point/content server (e.g., 812) along with a time sensitive access key, also referred to as a session key, (e.g., for that hour, day, or any defined time frame) thereby enabling client computer system 210 to eventually receive the requested media content. Within system 800, the redirection command can include a time sensitive address of the media content location within media delivery point 812. Accordingly, the New York City media delivery point 812 can subsequently provide and deliver the desired media content to client computer system 210. It is noted that operations 732-742 can be performed by media delivery point 812 in a manner similar to content server 251 described herein.

Advantageously, by utilizing multiple content servers, (e.g., media delivery point 804-816), to provide high fidelity media content to client computer systems, (e.g., 210-230), located throughout the world, communication network systems of the Internet 201 do not become overly congested. Additionally, global network 802 can deliver media content to a larger number of client computer systems (e.g., 210-230) in a more efficient manner. Furthermore, by utilizing communication technology having data transfer rates of up to 320 Kbps (kilobits per second) or higher, embodiments of the present invention provide for rapid delivery of the media content in a worldwide implementation.

Referring still to FIG. 8, it is noted that media delivery points/content servers 804-816 of global network 802 can be coupled in a wide variety of ways in accordance with the present embodiment. For example, media delivery point 804-816 can be coupled utilizing wired and/or wireless communication technologies. Further, it is noted that media delivery points 804-816 can be functionally coupled such that if one of them fails, another media delivery point can take over and fulfill its functionality. Additionally, one or more web servers similar to web server 250 can be coupled to global network 802 utilizing wired and/or wireless communication technologies.

Within system 800, content server/media delivery point 804 includes a web infrastructure that, in one embodiment, is a fully redundant system architecture. It is noted that each of the MDP/content server 806-816 of global network 802 can be implemented to include a web infrastructure in a manner similar to the implementation shown in MDP 804.

Specifically, the web infrastructure of media delivery point 804 includes firewalls 818 and 820 which are each coupled to global network 802. Firewalls 818 and 820 can be coupled to global network 802 in diverse ways, (e.g., utilizing wired and/or wireless communication technologies). Particularly, firewalls 818 and 820 can each be coupled to global network 702 via a 10/100 Ethernet handoff. However, system 800 is not limited in any fashion to this specific implementation. It is noted that firewalls 818 and 820 are implemented to prevent malicious users from accessing any part of the web infrastructure of media delivery point 804 in an unauthorized manner. Additionally, firewall 818 can include a device 836, (e.g., a router or other switching mechanism), coupled therewith and a DB (database) server 840 coupled to device 836 while firewall 820 includes a device 838, (e.g., a router or other switching mechanism), coupled therewith and a DB (database) server 842 coupled to device 838. Furthermore, DB server 840 is coupled with device 838 and DB server 842 is coupled with device 836.

Still referring to FIG. 8, and within media delivery point 804, firewall 818 is coupled to a director device 822 which is coupled to internal web application server 826 and 828, and a hub server 830. Firewall 820 is coupled to a director 824 which is coupled to internal web application servers 826 and 828, and hub server 830. Hub server 830 can be implemented in a variety of ways including, but not limited to, as a Linux hub server. Hub server 830 is coupled to a data storage device 832 capable of storing media content. Data storage device 832 can be implemented in a variety of ways, e.g., as a RAID (redundant array of inexpensive/independent disks) appliance.

It is noted that media delivery points 804-816 can be implemented in any manner similar to content server 250 described herein. Additionally, media delivery points 804-816 of the present embodiment can each be implemented as one or more physical computing devices, (e.g., computer system 100 of FIG. 1).

Figure 10:
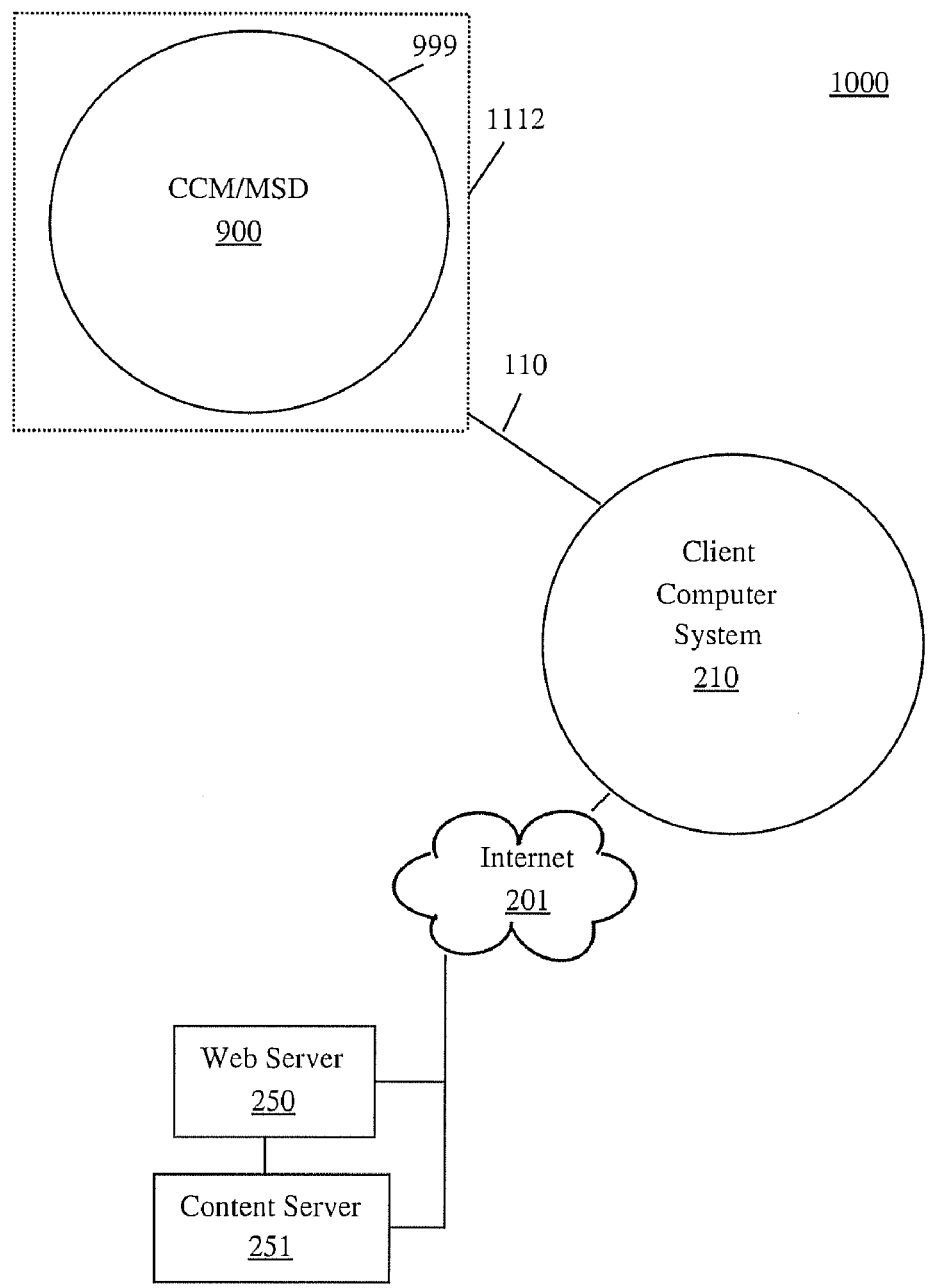
FIG. 10 is a block diagram of a communicative environment for controlling unauthorized reproduction of protected media files disposed on a media storage device, in accordance with one embodiment of the present invention.
Figure 11:
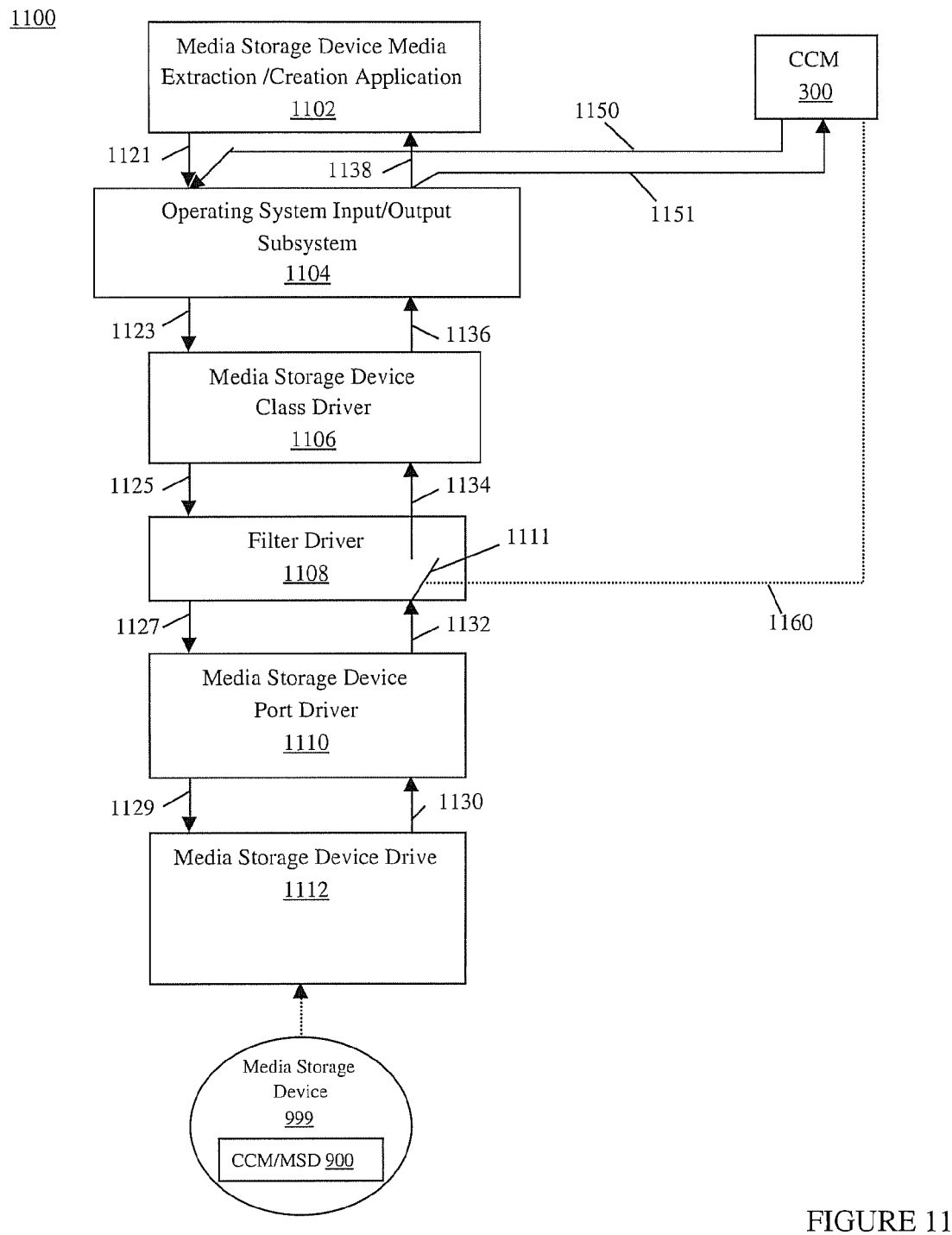
FIG. 11 is a data flow block diagram showing an implementation of a copyright compliance mechanism for preventing unauthorized reproduction of a protected media file located on a media storage device, in accordance with one embodiment of the present invention.

In another embodiment, CCM 300 can be adapted to be disposed on a media storage device, (e.g., media storage device 999 of FIGS. 10 and 11). Media storage device 999 can be, but is not limited to, a CD, a DVD, or other optical or magnetic storage device. By virtue of disposing a version of CCM 300 on a media storage device 999, embodiments of the present invention can provide copy protection for audio, video, multimedia, graphics, information, data, software programs, and other forms of media that may contain copyrighted material and which may be disposed on a media storage device. Alternatively, CCM 300 can be adapted to be installed on a computer system, (e.g., 210), via a media storage device 999 upon which it may be disposed.

Figure 9:
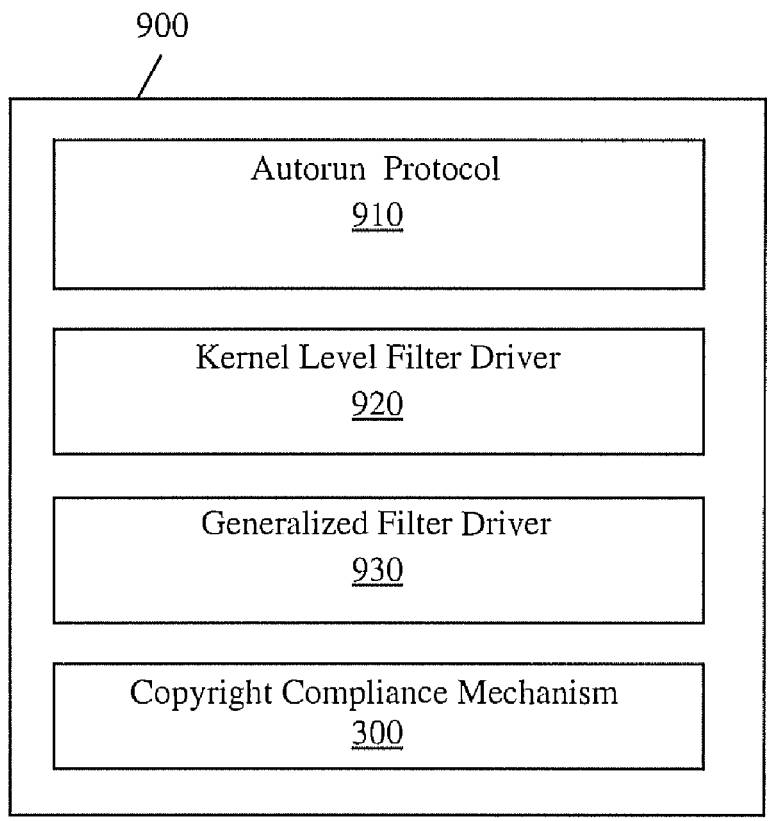
FIG. 9 is a block diagram of a copyright compliance mechanism installable from a media storage device in accordance with one embodiment of the present invention.

FIG. 9 is a block diagram of a copyright compliance mechanism/media storage device (CCM/MSD) 900, a version of CCM 300 adapted to be disposed on a media storage device, (e.g., media storage device 999 of FIGS. 10 and 11) in accordance with an embodiment of the present invention. It is noted that CCM 300 in CCM/MSD 900 is analogous to CCM 300 as described in FIGS. 3, 4, 5A-D, 6A and 7A-C. Further, CCM/MSD 900 can be readily updated in accordance with global delivery system 800, as described in FIGS. 7A-C, and FIG. 8.

In one embodiment, CCM/MSD 900 is adapted to provide stand-alone compliance with copyright restrictions and/or licensing agreements applicable to media files that may be disposed on a media storage device, (e.g., media storage device 999). In another embodiment, CCM/MSD 900 is adapted to be installed on a computer system, (e.g., 210), to provide compliance with copyright restrictions and licensing agreements applicable to media files as described in FIGS. 3, 4, 5A-D, 6A and 7A-C.

Referring to FIG. 9, CCM/MSD 900 includes an autorun protocol component 910 for invoking automatic installation of CCM 300. To deter users from attempts at defeating various features inherent to CCM 300, (e.g., the autorun feature), CCM 300's monitoring program, agent program 304, verifies that those features that are to be operational are operational, and if not, CCM 300 prohibits the user from experiencing the contents of the media storage device.

If a user somehow defeats the autorun feature, and the user attempts to utilize an application to capture an image of the content, the application will make an image of the content on the media storage device, which also images the copyright protection contained thereon. As such, when the image is played, CCM 300 recognizes the copy protection is present, and CCM 300 will only allow the user to experience the content when authorized, once CCM 300 is installed.

By virtue of the protections as described above provided by CCM 300, users will be able to experience the content of the media storage device in the content's original high quality format, thereby obviating the need to compress the media file used on client system 210.

Advantageously, the user will no longer need to suffer through poor quality output as a result of severely compressed media files.

It is noted that when adapted to be implemented in conjunction with a secure file format, meaning that the format of the file is, without proper authorization, non-morphogenic, embodiments of the present invention also provide effective compliance with copyright restrictions and/or licensing agreements with secure files formats. CCM 300 can control the types of file formats into which the media file can be transformed, (e.g., .wav, .mp3, etc.).

In one embodiment, the autorun feature associated with a media storage device drive (e.g., 1112 of FIG. 10) of client system 210 is activated and operational. Alternatively, a notice of required autorun activation within client system 210 may be displayed on the media storage device and/or the case in which the media storage device is stored.

In another embodiment, if CCM 300 is present or if the user is coupled to a server, then messages containing instructions on how to activate the autorun feature of client system 210 may be presented to the user.

In one embodiment autorun protocol component 910 can detect media storage device drives resident on a computer system, (e.g., 210).

The following C++ source code is an exemplary implementation of a portion of autorun protocol component 910 for detecting media storage device drives residing and operable on client computer system 210, according to one embodiment of the present invention.

```
if ( (dwRetVal = GetLogicalDrives( ))
    != (DWORD) 0)
{
    /* initialize variables */
    dwMask = (DWORD) 1;
    /* initialize path to root of current drive */
    _tcscpy(szDrive, _T("A:\\"));
    for (nIndex = 0, dwMask = (DWORD) 1;
        dwMask != (DWORD) 0;
        nIndex++, dwMask <<= 1)
    {
```

```
        if ((dwRetVal & dwMask) != 0)
        {
            /* construct path to root of drive */
            szDrive[0] = (TCHAR) 'A' + nIndex;
            if (GetDriveType(szDrive) == DRIVE_CDROM)
            {
                MessageBox((HWND) 0,
                    _T("CD-ROM drive found."),
                    szDrive,
                    MB_OK);
            }
            else
            {
                /* clear bit at current position */
                dwRetVal &= (~dwMask);
            }
        }
    }
}
```

In another embodiment, autorun protocol component 910 can detect whether a media storage device containing media files has been inserted into a media storage device drive coupled with client computer system 210, (e.g., drive 1112 of FIG. 10). In another embodiment, CCM 300 can include instructions for monitoring media storage device drive 1112, and upon detection of drive activation, CCM 300 determines what type of media storage device has been inserted therein. Subsequently, CCM 300 can detect various triggers on the media storage device to invoke its protection, (e.g., a hidden file on newer media storage devices and/or the copyright indicator bit on legacy media storage devices), obviating the need for autorun. Upon detection, CCM 300 can invoke the appropriate protection for the associated media file.

The following C++ source code is an exemplary implementation of a portion of autorun protocol component 910 for detecting a media storage device inserted in a media storage device drive residing and operable on client computer system 210, according to one embodiment of the present invention.

```
/* set error mode for operation */
uiErrMode = SetErrorMode(SEM_FAILCRITICALERRORS);
/* initialize path to root of current drive */
_tcscpy(szDrive, _T("A:\\"));
for (nIndex = 0, dwMask = (DWORD) 1;
     dwMask != (DWORD) 0;
     nIndex++, dwMask <<= 1)
{
    if ((dwCDROMMask & dwMask) != 0)
    {
        /* construct path to root of drive */
        szDrive[0] = (TCHAR) 'A' + nIndex;
        if ( GetDiskFreeSpace(szDrive,
                    &dwSectors,
                    &dwBytes,
                    &dwClustersFree,
                    &dwClusters)
            != 0)
```

```
        {
            /* add bit for drive to mask */
            dwRetVal |= dwMask;
        }
    }
}
/* restore original error mode */
SetErrorMode(uiErrMode);
```

Additionally, autorun protocol component 910 can also detect changes in media, (e.g., insertion of a different media storage device 999). Further, other media changes can be detected subsequent to adaptation of the source code including, but not limited to, detecting a previously accessed media file and/or detecting a previously inserted media storage device.

The following C++ source code is an exemplary implementation of a portion of autorun protocol component 910 for detecting a change in media, according to one embodiment of the present invention.

```
/* initialize path to root of current drive */
_tcscpy(szDrive, _T("A:\\"));
for (nIndex = 0, dwMask = (DWORD) 1;
     dwMask != (DWORD) 0;
     nIndex++, dwMask <<= 1)
{
    /* check for presence of CD-ROM media in drive */
    if ((dwCurrMask & dwMask) != 0)
    {
        /* check if media previously in drive */
        if ((dwPrevMask & dwMask) == 0)
        {
            /* construct path to root of drive */
            szDrive[0] = (TCHAR) 'A' + nIndex;
            /* check for presence of marker on drive */
            if (IsMPBMarkerPresent(szDrive) != 0)
            {
                /* process autorun information present on drive */
                nRetVal = ProcessAutorun(szDrive);
            }
        }
    }
}
```

Still referring to FIG. 9, CCM/MSD 900 also includes a kernel level filter driver 920 for controlling a data input path of an operating system coupled with and operable on client computer system 210.

CCM/MSD 900 also includes a generalized filter driver 930 for controlling ripping and "burning" applications, (e.g., Nero, Roxio, Exact Audio Copy, and others), thereby preventing such activities.

The following C++ source code is an exemplary implementation of a portion of generalized filter driver 930 for controlling ripping and burning applications that may be residing on and operable within client computer system 210, in accordance with one embodiment of the present invention.

```
bool    bDisabled;      /* flag indicating CD reads disabled */
        /* initialize variables */
        bDisabled = false;
        if (bProtected == true)
        {
            if (type == IRP_MJ_DEVICE_CONTROL)
            {
                ULONG ulIoControlCode = stack-
```

```
>Parameters.DeviceIoControl.IoControlCode;
                if (ulIoControlCode == IOCTL_SCSI_PASS_THROUGH)
                {
                    SCSI_PASS_THROUGH * pspt = (SCSI_PASS_THROUGH *)
Irp->AssociatedIrp.SystemBuffer;
                    if (  (pspt != NULL)
                        && (pspt->Cdb[0] == SCSIOP_READ_CD))
                    {
                        pspt->DataTransferLength = 0;
                        pspt->ScsiStatus = 0;
                        bDisabled = true;
                    }
                }
                else if (ulIoControlCode == IOCTL_SCSI_PASS_THROUGH_DIRECT)
                {
                    SCSI_PASS_THROUGH_DIRECT * psptd =
(SCSI_PASS_THROUGH_DIRECT *)
Irp->AssociatedIrp.SystemBuffer;
                    if (  (psptd != NULL)
                        && (psptd->Cdb[0] == SCSIOP_READ_CD))
                    {
                        psptd->DataTransferLength = 0;
                        psptd->ScsiStatus = 0;
                        bDisabled = true;
                    }
                }
            }
        }
        if (bDisabled == true)
        {
            /* complete current request */
            status = CompleteRequest(Irp, STATUS_SUCCESS, 0);
        }
        else
        {
            /* pass request down without additional processing */
            status = IoAcquireRemoveLock(&pdx->RemoveLock, Irp);
            if (!NT_SUCCESS(status))
                return CompleteRequest(Irp, status, 0);
            IoSkipCurrentIrpStackLocation(Irp);
            status = IoCallDriver(pdx->LowerDeviceObject, Irp);
            IoReleaseRemoveLock(&pdx->RemoveLock, Irp);
        }
```

Still referring to FIG. 9, CCM/MSD 900 includes a CCM 300, analogous to CCM 300 of FIG. 3, that is adapted to be installed in client computer system 210 in one or more ways described herein.

In one embodiment, kernel level filter driver 920, generalized filter driver 930 and CCM 300 of CCM/MSD 900 are automatically installed on client computer system 210, subsequent to insertion of media storage device 999 into a media storage device drive, (e.g., media storage device drive 1112 of FIGS. 10 and 11). Autorun protocol component 910, as described above, detects insertion of media storage device 999 into an appropriate drive, and initiates installation of the components, (e.g., CCM 300, driver 920 and driver 930). In one embodiment, drivers 920 and 930 may be temporarily installed and may be deleted upon removal of media storage device 999 from media storage device drive 1112. In yet another embodiment, drivers 920 and 930 may be installed in hidden directories and/or files within client computer system 210. In another embodiment, some components of CCM 300 can remain installed on client system 210, (e.g. the monitoring program (agent program 304)). In still another embodiment, other components, (e.g., the kernel level filter driver 920), can be dynamically loaded and unloaded as necessary in accordance with copyright restrictions and/or licensing agreements applicable to the media file.

Embodiments of the present invention utilize software, (e.g., CCM/MSD 900), that is placed on media storage device 999, in conjunction with controlling software CCM 300 installed on client computer system 210, and web server 250 and/or content server 251, wherein each component is communicatively coupled with the other via the Internet, thereby enabling dynamic updating of CCM 300 in the manner as described with reference to FIG. 4, and operations 716 and 718 of FIGS. 7A-C.

In the present embodiment, CCM/MSD 900 provides a stand-alone DRM that is far more sophisticated than existing DRM solutions. This is because CCM/MSD 900 goes into the data pathway of the operating system operable on client computer system 210 and obtains control of the data pathway, (e.g., filter driver 1108 of FIG. 11), rather than exploiting inefficiencies or errors in the computer system.

FIG. 10 is a block diagram of a communicative environment 1000 for controlling unauthorized reproduction of protected media files disposed on a media storage device in accordance with an embodiment of the present invention. Included in communicative environment 1000 is a media storage device drive 1112 coupled with a client computer system 210 via a data/address bus 110. Client computer system 210 is coupled with web server 250 and content server 251 via Internet 201. A media storage device 999, upon which a CCM/MSD 900 may be disposed, can be inserted in media storage device drive 1112. As such, autorun protocol component 910 detects the insertion and automatically invokes installation of CCM 300, kernel level filter driver 920 and generalized filter driver 930 from media storage device 999 into client computer system 210. Subsequent to installation, CCM 300 initiates a dynamic update with web server 250 and/or content server 251, via Internet 201. By installing CCM 300 on client computer system, agent program 304 (FIG. 3) of CCM 300 is able to control the integrity of the software associated with CCM/MSD 900. Additionally, by conferring with servers 250 and/or 251 via Internet 201 online, the CCM 300 software version on media storage device 999 and installed on client computer system 210 can be updated when circumventions occur and/or kept current from platform to platform.

Advantageously, the monitoring mechanism of agent program 304 enables constant morphing of the version of CCM 300 disposed on media storage device 999 by communicating with server 250 and/or 251 and utilizing the dynamic update capabilities of global network 800 to readily update that which has been installed on client computer system 210, via media storage device 999.

In one embodiment, the installation is performed clandestine with respect to the user and is initiated by inserting media storage device 999 into an appropriate media storage device drive, (e.g. a magnetic/optical disk drive or alternative device drive coupled with client system 210). If the user is not registered with CCM 300, as described herein with reference to FIG. 4 and FIGS. 7A-7C, once installed, CCM 300 initiates an update process with web server 250 and/or content server 251 to readily include updates that have been invoked subsequent to release of the media file on media storage device 999. By virtue of the dynamic update capabilities of CCM 300, regardless of the version of CCM 300 on media storage device 999, CCM 300 provides compliance with copyright restrictions and/or licensing agreements applicable to the media file on media storage device 999. Advantageously, enabling dynamic adaptability of CCM 300 provides for continued interoperability with new and updated operating systems, advancements in electronic technology, communication technologies and protocols, and the like, ensuring the effectiveness of CCM 300 into the future.

In another embodiment, if the user is a registered user with global delivery system 800, CCM 300 can detect which version is most current. Accordingly, when the version existing on client system 210 is more current that the version (for install) on media storage device 999, CCM 300 can bypass the install process and present the contents contained on media storage device 999 to the user for them to experience.

Further advantageous, this technology is backward compatible with media storage device drives manufactured subsequent to and including the year 1982. Additionally, CCM 300 is compatible with media storage devices having a copyright indicator bit disposed thereon. The copyright indicator bit has been included on all CDs released since the year 1982.

In the present embodiment of FIG. 10, the media content is not encrypted on media storage device 999. In one embodiment, if the media content is encrypted on computer 210, it can be decrypted on the computer 210. However, home players and/or stand alone media playing devices rarely include a decryption mechanism, and to experience the music on a home machine, the music is conventionally not encrypted.

In one embodiment, an additional component of CCM 300 is that the trigger for agent program 304 may be the copyright bit indicator. This means when the copyright indicator bit is detected by CCM 300, the functions of CCM 300 are initiated. Alternatively, in another embodiment, when the copyright bit indicator is not detected, CCM 300 may remain in an un-invoked or idle state. If CCM 300 can detect the copyright bit indicator, CCM 300 can provide the appropriate compliance with regard to copyright restrictions and/or licensing agreements applicable to the media files.

In an alternative embodiment, a trigger control in the table of contents of a media storage device 999 includes instructions for triggering autorun protocol 910 of CCM/MSD 900 and can utilize the copyright indicator bit or alternative implementation to trigger the technology. In this manner, CCM 300 can control copyrighted works while public domain material can be experienced and reproduced at a user's discretion. Because autorun can be problematic for media storage device manufacturers, embodiments of CCM/MSD 900 can include alternative autorun programs that perform analogous to autorun.

In another embodiment, CCM 300 can invoke its own proprietary player, (e.g., custom media device 310) as described with reference to FIG. 3, thus enabling increased control of copyright restrictions and/or licensing agreements applicable to the media. By invoking custom media device 310, CCM 300 enables user experience of the media while providing protection against unauthorized reproduction of the media disposed on media storage device 999.

In an alternative embodiment, the media files and the CCM/MSD 900 disposed on a media storage device 999 are encrypted. This implementation is particularly advantageous for demonstration (demo) versions of media files, beta test versions, and the like that may be disposed on media storage device 999. It is noted that the present embodiment is operable in an online environment, meaning that client computer system 210 is communicatively coupled with web server 250 and/or content server 251 to enable a user experience of the content on a demo version of media storage device 999. In this implementation, CCM 300 allows for specific plays for specific users, which can be controlled via a network, (e.g., network 1000 of FIG. 10), and server 250 and/or 251.

In another embodiment, CCM 300 can be implemented for demo and/or pre-release protection. In this embodiment, CCM 300 utilizes sophisticated encryption technology to encrypt the table of contents and CCM 300 with an associated decrypted key located on client computer system 210. Encrypting CCM 300 can also deter nefarious attempts to reverse engineer CCM 300. Decryption can be performed using an associated decryption key. Alternatively, decryption can be performed by a proprietary or custom media player application resident on demo media storage device, (e.g., 999).

The content of media storage device 999 is encrypted, using various levels of encryption to provide protection levels commensurate with copyright holders desires and required protection. For example, media storage device 999 is delivered to a user or critic for the purposes of review, the user inserts media storage device 999 into the appropriate storage device reader or connector coupled with the journalist's computer (e.g., 210), and CCM 300 is installed on client system 200 in a manner clandestine to the user. Once installed, CCM 300 initiates a communication session with web server 250/content server 251, where content server 251 can provide authorization for the user to experience the media on media storage device 999.

Accordingly, if the user, to whom demo media storage device 999 had been released, had demo media storage device 999 stolen, or if the user allowed alternative parties to experience the content of media storage device 999, the unauthorized party would have to try to crack the encryption keys and the encryption of the actual content of media storage device 999, consuming non-trivial amounts of time.

Thus, CCM 300 is able to control which users receive authorization to experience the media of media storage device 999, how many times the user may experience the media, and CCM 300 may also define a period of time until the media may no longer be accessible. This may enable copyright holders to release the content on an authorized media storage device, (e.g., 999), prior to "pirated" copies flooding the market.

Accordingly, a demo media storage device 999 may be configured such that a first user may get a copy, a second user may get a copy, and if it is known that the second user will share the demo with a third and a fourth user, then the known users would be enabled to experience the media. Advantageously, by virtue of defining which users can access and experience the media, any unauthorized sharing of the media by one of the authorized users can be readily detected, and further sharing or experiencing of the media may be halted. Additionally, because the authorized user shared the media in an unauthorized manner, in a worse case scenario, criminal charges could be filed against that user.

It is noted that placing CCM/MSD 900 on a media storage device, (e.g., 999), so as to enable installation of CCM 300 on client system 210 is one manner in which CCM 300 can be installed on client system 210. An alternative manner in which CCM 300 can be installed on client computer system 210 is through "cross-pollination." For example, webcasters broadcast the media file to the user. The media file has a CCM 300 coupled with the media file, and upon downloading the media file onto client computer system 210, embodiments of the present invention enable the installation of CCM 300 onto client computer system 210. In another manner, CCM 300 is incorporated into and becomes part of an operating system operational on client system 210. Alternatively, laws are passed that mandate the inclusion of CCM 300 on each client computer system 210.

FIG. 11 is an exemplary logic/bit path block diagram 1100 of a client computer system, (e.g., 210), configured with a copyright compliance mechanism (CCM) 300 for preventing unauthorized reproduction of copyrighted media according to an embodiment of the present invention. Copyright compliance mechanism 300 is, in one embodiment, coupled with and operational on client system 210 in any manner similar to that described herein with reference to FIGS. 4, 5A-5D, 6A, and 7A-7C, 9, and 10.

Diagram 1100 of FIG. 11 includes a media storage device media extraction/creation application 1102 communicatively coupled to operating system input/output subsystem 1104 via wave in line 1121 and wave out line 1138. Operating system input/output subsystem 1104 is coupled with media storage device class driver 1106 via wave in line 1123 and wave out line 1136. Media storage device class driver 1106 is coupled with filter driver 1108 via wave in line 1125 and wave out line 1134. Filter driver 1108 is coupled with media storage device port driver 1110 via wave in line 1127 and wave out line 1132. Filter driver 1108 is shown to include a switch 1111, controlled by CCM 300 via coupling 1160. Media storage device port driver 1110 is coupled with media storage device drive 1112 via wave line in 1129 and wave line out 1130. Media storage device 999, shown to include CCM/MSD 900 is receivable by media storage device drive 1112. Additionally, CCM 300 is coupled with operating system input/output subsystem 1104 via wave in line 1150 and wave out line 1151.

In one embodiment, CCM 300 is coupled to and controls selectable switch 1111 in filter driver 1108. Depending upon the copyright restrictions and/or licensing agreements applicable to a media file disposed on media storage device 999, CCM 300 controls whether switch 1111 is open (shown), thus preventing the media file from reaching media extraction/creation application 1102, or closed (not shown) so as to allow reproduction of the protected media file. Media extraction/creation application 1102 can be a "ripping" or "burning" application such as Nero, Roxio, Exact Audio Copy, or other readily available application.

Continuing with FIG. 11, media storage device 999 is received by media storage device drive 1112. CCM 300 determines whether media storage device 999 or media disposed thereon is protected by any copyright restrictions and/or licensing agreements, e.g., via detection of a copyright indicator bit. CCM 300 communicates with filter driver 1108 to control switch 1111 accordingly. In the present example, reproducing media storage device 999, and/or the contents thereon, would violate applicable restrictions and/or agreements and therefore switch 1111 is in an open position such that the output path, (e.g., wave-out line 1138), to media extraction/creation application 1102 is effectively blocked thereby preventing unauthorized reproduction of media storage device 999.

It is particularly noted that by virtue of CCM 300 controlling switch 1111, and therefore controlling wave-out line 1138, any incoming copyright protected media disposed on a media storage device 999 can be prevented from being reproduced in an unauthorized manner in accordance with applicable copyright restrictions and/or licensing agreements related to the incoming media.

Advantageously, as new secure or proprietary file formats are developed, CCM 300 can be readily adapted to be functional therewith. Further, CCM/MSD 900 can prevent users from making unauthorized reproductions of media files, (e.g., recording, copying, ripping, burning, etc.). By using kernel level filter drivers, (e.g., filter driver 1108), and getting to a low enough level within the operating system (OS) on client system 210, CCM 300 can detect particular applications and when they request media storage device drive 1112 to poll the media file for copying, ripping, etc., and disable the data input path. CCM 300, in this embodiment, deals with the input pathway.

In one embodiment, alternative applications that monitor the state of client computer system 210 can enable the autorun functionality of client computer system 210 or alternatively, invoke an automatic mechanism similar to autorun to ensure invocation of CCM 300 for compliance of copyright restrictions and/or licensing agreements applicable to media storage device 999 and/or the copyright protected media disposed thereon.

In one embodiment, CCM 300 can invoke a proprietary media player from media storage device 999, or activate a proprietary media player resident and operable on client computer system 210, or an alternative authorized media player resident on client computer system 210, in a manner similar to that described herein with reference to FIG. 3.

When media storage device 999 is a multisession device, e.g., a compact disk having a data session and a music session (audio tracks), and it is inserted into or communicatively coupled with media storage device drive 1112 such that its content is accessible, CCM 300 views the contents of the media storage device 999, and in some operating systems the audio tracks will not be displayed. Instead, the data session is shown, as is an autorun file, (e.g., autorun protocol component 910), and upon clicking, invokes a player application. CCM 300 can have a data session and files to which a user may not have access unless a player application is invoked.

In one embodiment, the player application could deposit a monitoring portion (e.g., agent program 304) on client system 210, which in one embodiment may reside on client computer system 210 subsequent to removal or decoupling of media storage device 999 from media storage device drive 1112.

By virtue of content in a multisession media storage device 999, which may not be directly accessible to most player applications, at some point the player application can be invoked which can then install the CCM 300 into client system 210, according to one embodiment of the present invention.

In one embodiment, a proprietary media player application is stored on media storage device 999. However, it may not be automatically invoked. Upon some user intervention, e.g., inserting media storage device 999 into media storage device drive 1112, the media player application is loaded onto client system 210 which has CCM 300 integrated therewith. Thus, CCM 300 is launched regardless of autorun being activated or de-activated, and mandates the user to utilize the proprietary media player application to experience the content of the media, (e.g., media files) on the media storage device 999.

In an alternative embodiment, client computer system 210 has autorun turned off, wherein it is common for the user to be unable to play a media file unless a proprietary media player application is invoked. Activating the proprietary media player application can initiate an installation of those components of CCM 300 that are bypassed when autorun is not active.

Advantageously, by providing a copyright compliance mechanism, (e.g., 300), which can be easily and readily installed on a client computer system, (e.g., 210), one or more embodiments of the present invention can be implemented to control access to, the delivery of, and the user's experience with media content subject to copyright restrictions and/or licensing agreements, for example, as defined by the DMCA. Additionally, by closely associating a client computer system, (e.g., 210), with the user thereof and the media content they received, embodiments of the present invention further can provide for accurate royalty recording.

Figure 12:
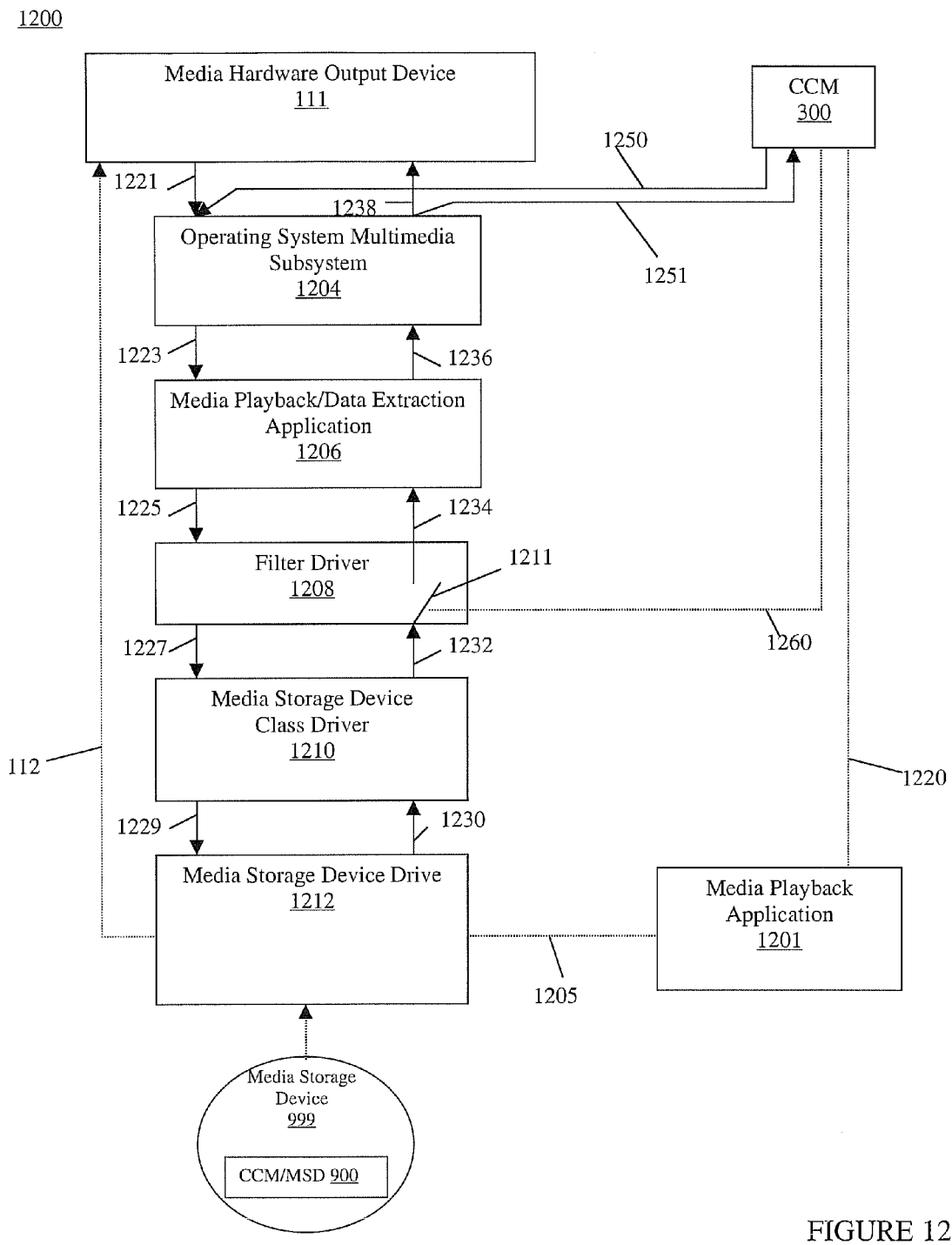
FIG. 12 is a data flow block diagram showing an implementation of a copyright compliance mechanism for preventing unauthorized recording of media files, in accordance with one embodiment of the present invention.

FIG. 12 is an exemplary logic/bit path block diagram 1200 of a client computer system, (e.g., 210), configured with a copyright compliance mechanism (CCM) 300 for selectively controlling access to copyrighted media in accordance with an embodiment of the present invention. Copyright compliance mechanism 300 is, in one embodiment, coupled with and operational on client system 210 in a manner similar to that described herein with reference to FIGS. 4, 5A-5D, 6A, and 7A-7C, 9, 10, and 11.

Diagram 1200 of FIG. 12 includes a media hardware output device 111 communicatively coupled to operating system multimedia subsystem 1204 via wave in line 1221 and wave out line 1238. Operating system multimedia subsystem 1204 is coupled with media playback/data extraction application 1206 via wave in line 1223 and wave out line 1236. Additionally, CCM 300 is coupled with operating system multimedia subsystem 1204 via wave in line 1250 and wave out line 1251. Media playback/data extraction application 1206 can be a ripping or burning application such as Nero, Roxio, Exact Audio Copy, or other readily available application that allows transformation of the data on media storage device 999. Media playback/data extraction application 1206 is coupled with filter driver 1208 via wave in line 1225 and wave out line 1234. Filter driver 1208 is coupled with media storage device class driver 1210 via wave in line 1227 and wave out line 1232. Filter driver 1208 is shown to include a switch 1211, controlled by CCM 300 via coupling 1260.

Figure 13:
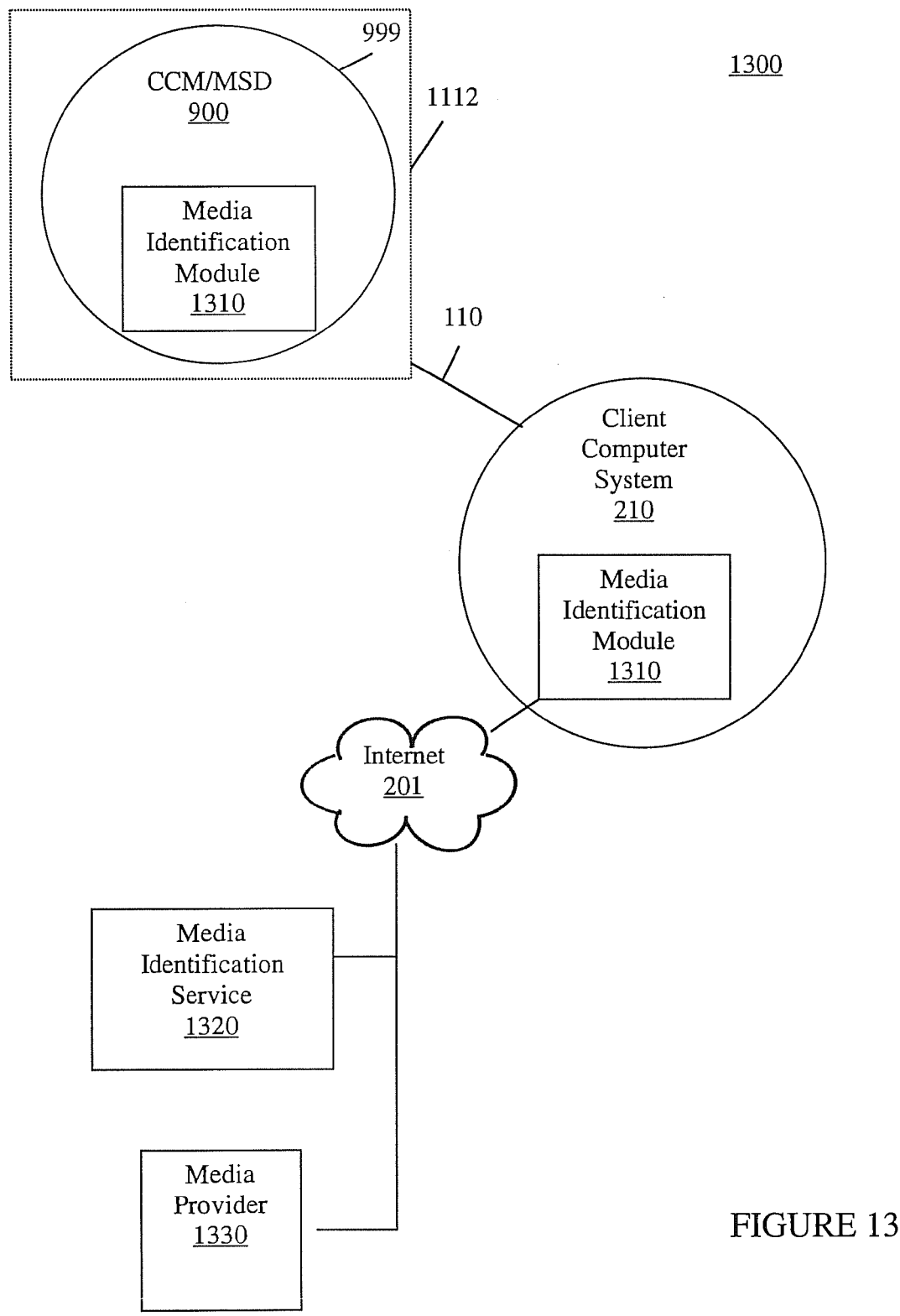
FIG. 13 is a block diagram of a communicative environment for identifying media disposed on a media storage device in accordance with embodiments of the present invention.

Media storage device class driver 1210 is coupled with media storage device drive 1212 via wave line in 1229 and wave line out 1230. Media storage device 999, shown to include CCM/MSD 900, is receivable by media storage device drive 1212. Media player application 1201 is communicatively coupled with media storage device drive 1212 via connection 1205 and is communicatively coupled with CCM 300 via connection 1220. In the embodiment of FIG. 13, media storage device drive 1212 is communicatively coupled with media hardware output device 111 via a coupling (e.g., signal path 112 of FIG. 1). Using signal path 112, media storage device drive 1212 can output an analog signal directly to media hardware output device 111. As described herein with reference to FIG. 1, this allows accessing media disposed on media storage device 999 while bypassing data bus 101 of client computer system 210.

In one embodiment, CCM 300 is coupled with and controls selectable switch 1211 in filter driver 1208. Depending upon the copyright restrictions and/or licensing agreements applicable to a media file disposed on media storage device 999, CCM 300 controls whether switch 1211 is open (shown), thus preventing the media file from reaching media playback/data extraction application 1206, or closed (not shown) so as to allow reproduction of the protected media file.

Continuing with FIG. 12, media storage device 999 is received by media storage device drive 1212. CCM 300 determines whether media storage device 999 or media disposed thereon is protected by any copyright restrictions and/or licensing agreements, e.g., via detection of a copyright indicator bit. In an embodiment of the present invention, an agent program of CCM 300 accesses configuration information contained in a table of contents or other configuration file on media storage device 999. In an embodiment, this allows individually determining whether the copyright indicator bit is set for each file stored on media storage device 999. Alternatively, the copyright indicator bit can convey that the content of the entire CD is protected by copyright restrictions and/or licensing agreements. CCM 300 communicates with filter driver 1208 to control switch 1211 accordingly. In the present embodiment, reproducing media storage device 999 or a particular file stored on media storage device 999 would violate applicable restrictions and/or agreements and therefore switch 1211 is in an open position such that the digital data pathway to media playback/data extraction application 111, (e.g., wave-out line 1238), is effectively blocked thereby preventing unauthorized access of the protected media file stored on media storage device 999. As a result, digital access of the media files that have their respective copyright indicator bits set is prevented. In an embodiment, a data access command to operating system multimedia subsystem 1204 triggers CCM 300 of open switch 1211, thus blocking the digital data pathway of system 1200. However, commands for controlling media storage device drive (e.g., play, pause, skip, etc.) from media playback application 1201 are allowed to permit accessing audio tracks stored on media storage device 999. While the present embodiment recites audio information stored upon media storage device 999, embodiments of the present invention are well suited for protecting other copyright protected media as well such as multimedia presentations as well.

It is particularly noted that by virtue of CCM 300 controlling switch 1211, and therefore controlling wave-out line 1234, copyright protected media disposed on a media storage device 999 can be prevented from being digitally accessed in an unauthorized manner in accordance with applicable copyright restrictions and/or licensing agreements by client computer system 210. However, the copyright protected media can be accessed via signal path 112 and media hardware output device 111.

As an example, when media storage device 999 is placed into media storage device drive 1212, the table of contents is read by a monitoring agent (e.g., agent 304 of FIG. 3). While the present embodiment recites reading the table of contents specifically, embodiments of the present invention are well suited to using other methods to determine whether media disposed upon media storage device is protected by copyright restrictions and/or licensing agreements. For example, a hidden file on media storage device 999 may convey this information. Alternatively, a separate application disposed on media storage device 999 may convey information regarding copyright restrictions and/or licensing agreements in embodiments of the present invention. In one embodiment, this information is represented as a song or song title to discourage accessing and/or altering this information file. The monitoring agent determines that media storage device has 10 music tracks disposed thereupon and that the copyright indicator bit is set for tracks 1-8. When media playback application 1201 receives a request to read any of tracks 1-8, it causes media storage device drive 1212 to access the requested music track. However, CCM 300 opens switch 1211 when the copyright protected tracks are being accessed and thus prevents digitally accessing those tracks by client computer system 210. The music tracks can still be accessed via signal path 112 and media hardware output device 111. Thus, a user can listen to and enjoy the copyrighted music tracks, but is prevented from digitally accessing the music. This hinders attempts to reproduce the music tracks in an unauthorized manner while still permitting the user to enjoy the media in accordance with applicable copyright restrictions and/or licensing agreements related to the media. Attempts to create a digital copy of the protected media via media hardware output device 111 can be prevented as described herein with reference to FIGS. 5A-5D. For example, a user may couple signal path 112 with a waveform input of media hardware output device 111 in an attempt to circumvent switch 1211. However, CCM 300 may open switches 312, 311, and/or 511 concurrent with opening switch 1211 to prevent digitally accessing the protected media.

Advantageously, as new secure or proprietary file formats are developed, CCM 300 can be readily adapted to be functional therewith. Further, CCM/MSD 900 can prevent users from making unauthorized reproductions of media files, (e.g., recording, copying, ripping, burning, etc.). By using kernel level filter drivers, (e.g., filter driver 1208), CCM 300 can detect unauthorized attempts to digitally access copyright protected media, and disable the digital data path.

As described herein with reference to FIG. 11, alternative applications that monitor the state of client computer system 210 can enable the autorun functionality of client computer system 210 or alternatively, invoke an automatic mechanism similar to autorun to ensure invocation of CCM 300 for compliance of copyright restrictions and/or licensing agreements applicable to media storage device 999 and/or the copyright protected media disposed thereon.

In one embodiment, CCM 300 can invoke a proprietary media player from media storage device 999, or activate a proprietary media player resident and operable on client computer system 210, or an alternative authorized media player resident on client computer system 210, as described herein with reference to FIG. 3.

For example, when media storage device 999 is a multisession device, e.g., a compact disk having a data session and a music session (e.g., audio tracks), and it is inserted into media storage device drive 1212, CCM 300 looks at the contents of the media storage device 999, and in some operating systems the audio tracks will not be displayed. Instead, the data session is shown, as is an autorun file, (e.g., autorun protocol component 910), and upon clicking an icon, invokes a player application. CCM 300 can have a data session and files to which a user may not have access unless a player application is invoked.

In one embodiment, the player application could deposit a monitoring portion (e.g., agent program 304) on client system 210, which in one embodiment may reside on client computer system 210 subsequent to removal of media storage device 999 from media storage device drive 1212.

By virtue of content in a multisession media storage device 999, which may not be directly accessible to most player applications, at some point the player application will be invoked which can then install the CCM 300 into client system 210, according to one embodiment of the present invention.

In one embodiment, a proprietary media player application is stored on media storage device 999. However, it is not automatically invoked. Upon some user intervention, e.g., inserting media storage device 999 into media storage device drive 1212, the media player application is loaded onto client system 210 which has CCM 300 integrated therewith. Thus, CCM 300 is launched regardless of autorun being activated or not activated, and mandates the user to utilize the proprietary media player application to experience the content of the media files on the media storage device. 999.

In an alternative embodiment, client computer system 210 has autorun off, wherein it is common for the user to be unable to play a media file unless a proprietary media player application is invoked. Activating the proprietary media player application can initiate an installation of those components of CCM 300 that are bypassed when autorun is not active.

Advantageously, by providing a copyright compliance mechanism, e.g., 300, which can be easily and readily installed on a client computer system, (e.g., 210), embodiments of the present invention can be implemented to control access to, the delivery of, and the user's experience with media content subject to copyright restrictions and/or licensing agreements, for example, as defined by the DMCA. Additionally, by closely associating a client computer system, e.g., 210, with the user thereof and the media content they receive, embodiments of the present invention further provide for accurate royalty recording.

FIG. 13 is a block diagram of a communicative environment 1300 for identifying media in accordance with embodiments of the present invention. Included in communicative environment 1300 is a media storage device drive 1112 coupled with a client computer system 210 via a data/address bus 110. A media identification module 1310 is disposed on client computer system 210. Client computer system 210 is further coupled with media identification service 1320 and/or media provider 1330 via Internet 201.

In embodiments of the present invention, a media identification module 1310 is used to identify the media files disposed on media storage device 999. Currently, many CDs do not contain descriptive information, e.g., song titles, artist and album names, etc. As a result, when accessing the tracks on the CD the playback device only identifies a track number, e.g., "Disk 1, Track 1." However, there are services available via the Internet which allow a user to identify and/or manage their media files. One such service is the Gracenote CDDB® Music Recognition ServiceSM. Using the Gracenote service, a user inserts a music CD into their computer and uses a software application to contact the Gracenote database server which then identifies the artist, title, tracklist, and other information about the CD and displays the information on the user's computer.

In one embodiment, media identification module 1310 sends data to media identification service 1320 such as the number of songs on media storage device 999, the length of each of those songs, and the order in which they are accessed. Using this information, media identification service 1320 performs a database search until it finds media release (e.g., an album) having similar characteristics. Upon finding a match, media identification service 1320 can identify the album, artist, playlist, and other information applicable to media storage device 999 and send that information to client computer system 210. A similar public domain service can be accessed at the following web address: http://www.freedb.org.

In an embodiment of the present information, client computer system 210 then contacts media provider 1330 to determine whether any of the tracks disposed upon media storage device 999 are copyright protected material. Using the information provided by media information service 1320, media provider 1330 can identify which of the tracks disposed upon media storage device 999 are copyright protected material and send this information back to client computer system 210. Using the information, provided by media provider 1330, CCM 300 can selectively allow access to tracks on media storage device 999, either allowing/denying digital access to media storage device 999 as a whole, or on a track-by-track basis. Additionally, a user can be permitted to make a given number of copies of the media disposed upon media storage device 999, or may be permitted to access the copyright protected material for a given period of time in accordance with an end user agreement. In another embodiment, the database of media identification service 1320 may also provide copyright information about the tracks disposed upon media storage device 999 to client computer system 210.

In another embodiment, media identification module 1310 sends waveform data and/or text data to media identification service 1320 to identify the media disposed upon media storage device 999. For example, the Gracenote MusicIDSM service uses waveform analysis to identify music tracks for service subscribers. In an embodiment of the present invention, music identification module 1310 sends waveform data of tracks being accessed from media storage device 999 to media identification service 1320. In one embodiment, this waveform data is captured by a sampling buffer (not shown) that is in the data path between, for example, media storage device drive 1212 and media storage device class driver 1210 of FIG. 12. While the present embodiment describes placing the sampling buffer in this portion of the data path, embodiments of the present invention are well suited for placing the sampling buffer in another portion of the data path as well, e.g., between media storage device class driver 1210 and filter driver 1208 of FIG. 12. The Gracenote MusicIDSM service also uses text-based recognition in conjunction with the waveform analysis to provide a higher degree of certainty in identifying the music tracks. Upon identifying the media disposed upon media storage device 999, media identification module 1310 can contact media provider 1330 to determine whether any of the media is copyright protected material. Alternatively, the waveform and/or text data may be sent directly to media provider 1330 to determine whether any of the tracks disposed upon media storage device 999 are copyright protected material.

In one embodiment, media identification module 1310 samples the data as it passes through the sample buffer and creates an abstraction of the data which is sent to media identification service 1320 or media provider 1330. Media identification module 1310 then performs a fast Fourier transform of the sampled data and sends the result to either media identification service 1320 or media provider 1330 to identify the media disposed upon media storage device 999. While the present embodiment recites performing a fast Fourier transform of the sampled data, embodiments of the present invention are well suited for performing other transformations of the sampled data before sending it to media identification service 1320 or media provider 1330.

In one embodiment, media identification module 1310 is disposed upon media storage device 999. In one embodiment, the installation of media identification module 1310 onto client computer system 210 is performed clandestine with respect to the user and is initiated by inserting media storage device 999 into an appropriate media storage device drive, e.g. a magnetic/optical disk drive or alternative device drive coupled with client system 210.

The foregoing disclosure regarding specific embodiments of the present invention have been presented for purposes of illustration and description. They are not intended to be exhaustive or to limit the invention to the precise forms disclosed, and many modifications and variations are possible in light of above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for selectively controlling access to media disposed on a media storage device, said method comprising:
installing a compliance mechanism on a computer system, said compliance mechanism communicatively coupled with said computer system when installed thereon, said compliance mechanism for enforcing compliance with a usage restriction applicable to said media;
obtaining control of a data bus data pathway operable on said computer system, the data bus accessible by a processor of the computer system;
obtaining control of a sound card data pathway operable on said computer system;
accessing data disposed on said media storage device to determine said usage restriction; and
selectively preventing said computer system from digitally accessing said media via said data bus data pathway while enabling presentation of the media via said sound card data pathway, said sound card data pathway inaccessible to the processor of the computer system.

2. The method as recited in claim 1 wherein said usage restriction comprises a copyright restriction or a licensing agreement associated with said media.

3. The method as recited in claim 1 further comprising:
installing a filter driver on said computer system, said filter driver configured to be coupled with and operable in conjunction with said compliance mechanism and for controlling said data bus data pathway and said sound card data pathway.

4. The method as recited in claim 3 wherein said filter driver prevents digitally accessing said media.

5. The method as recited in claim 1 further comprising:
activating an autorun mechanism disposed on said media storage device in response to a device drive coupled with said computer system receiving said media storage device, said autorun mechanism for initiating said installing said compliance mechanism on said computer system.

6. The method as recited in claim 1 further comprising:
presenting said media using an analog sound rendering device communicatively coupled with said device drive via an analog signal path.

7. The method as recited in claim 5 wherein said autorun mechanism is activated in response to detection of a usage restriction indicator disposed on said media storage device, subsequent to said device drive receiving said media storage device.

8. The method as recited in claim 5 wherein said autorun mechanism is activated in response to detection of a selection of an icon representing said media.

9. The method as recited in claim 1 further comprising:
bypassing said installing said compliance mechanism on said computer system if an instance of said compliance mechanism is predisposed on said computer system.

10. The method as recited in claim 1 further comprising:
initiating a communication session between said computer system and a network to which said computer system is coupled and from which said compliance mechanism is available;
comparing said compliance mechanism present on said computer system and said compliance mechanism available from said network; and
updating said compliance mechanism on said computer system.

11. The method as recited in claim 1 further comprising:
deactivating said compliance mechanism upon detection of uncoupling of said media storage device from said computer system.

12. The method as recited in claim 1 further comprising:
uninstalling said compliance mechanism upon detection of uncoupling of said media storage device from said computer system.

13. The method as recited in claim 1 wherein said media storage device upon which said media is disposed is from a group of media storage devices consisting of a compact disk (CD), a mini CD, a digital versatile disk (DVD), a mini DVD, a compact flash card, a secure digital (SD) card, a memory stick, a digital audio tape (DAT), a digital video tape (DVT), a holographic storage object, a magneto-optical disk, a multi-layer fluorescent disk, an optical disk, and a magnetic disk.

14. The method as recited in claim 1 further comprising:
installing a media identification mechanism on said computer system;
utilizing said media identification mechanism to identify an instance of media disposed on said media storage device;
determining a usage restriction applicable to said instance of media; and
using said compliance mechanism to selectively control digitally accessing said instance of media based upon said determining.

15. The method as recited in claim 14 further comprising:
activating an autorun mechanism disposed on said media storage device in response to a device drive coupled with said computer system receiving said media storage device, said autorun mechanism for initiating installing said media identification mechanism on said computer system.

* * * * *